(12) United States Patent
Daniels, Jr. et al.

(10) Patent No.: US 12,494,131 B1
(45) Date of Patent: *Dec. 9, 2025

(54) QUANTITATIVE VISUAL TRANSLATION OF AIRCRAFT RADIO COMMUNICATIONS

(71) Applicant: Aerlogics LLC, Northlake, TX (US)

(72) Inventors: Mitchell Denning Daniels, Jr., Wilmington, NC (US); Robert Arbuckle Handley, III, Northlake, TX (US)

(73) Assignee: Aerlogics LLC, Northlake, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/082,406

(22) Filed: Mar. 18, 2025

Related U.S. Application Data

(63) Continuation of application No. 18/896,230, filed on Sep. 25, 2024, now Pat. No. 12,277,862.

(51) Int. Cl.
  *G10L 15/26* (2006.01)
  *G08G 5/26* (2025.01)

(52) U.S. Cl.
  CPC ............... *G08G 5/26* (2025.01); *G10L 15/26* (2013.01)

(58) Field of Classification Search
  None
  See application file for complete search history.

(56) References Cited

U.S. PATENT DOCUMENTS

| 10,535,351 | B2 * | 1/2020 | Gaston | G08G 5/26 |
| 11,289,094 | B2 * | 3/2022 | Baladhandapani | B64D 43/00 |
| 11,787,062 | B2 * | 10/2023 | Klemisch | A61B 5/6813 |
| | | | | 340/576 |
| 2009/0326738 | A1 * | 12/2009 | Ferro | G06F 11/2257 |
| | | | | 701/3 |
| 2016/0297543 | A1 * | 10/2016 | Li | G10L 15/22 |
| 2020/0027457 | A1 * | 1/2020 | Gelinske | G10L 15/22 |
| 2020/0151553 | A1 * | 5/2020 | Zhou | G05D 1/063 |

(Continued)

*Primary Examiner* — Neeraj Sharma
(74) *Attorney, Agent, or Firm* — Anton J. Hopen; Trenam Law

(57) ABSTRACT

The invention provides a method for systematically monitoring aircraft pilot and air traffic control (ATC) radio communications to detect predefined aviation-specific keywords indicative of operational conditions affecting flight safety or efficiency, such as turbulence, icing, or visibility constraints. Detected keywords and semantic equivalents from voice transmissions are transformed into structured data formats. These structured data are correlated with Automatic Dependent Surveillance-Broadcast (ADS-B) data, including precise aircraft position, altitude, heading, and speed. Leveraging this integrated data, the system generates automated, quantitative visualizations, such as condition-specific heatmaps or other graphical representations, illustrating spatial distributions of reported in-flight phenomena like turbulence, icing, or hazardous conditions. These visualizations enable air traffic controllers, pilots, and aviation stakeholders to rapidly assess and disseminate real-time observations and historical patterns of flight hazards, thereby significantly enhancing situational awareness, operational safety, and decision-making effectiveness without manual input or subjective interpretation, improving overall aviation operational efficiency and safety.

20 Claims, 29 Drawing Sheets

(56) References Cited

U.S. PATENT DOCUMENTS

| | | | | |
|---|---|---|---|---|
| 2020/0202733 A1* | 6/2020 | Staudinger | ............... | G06N 3/08 |
| 2021/0097058 A1* | 4/2021 | Skiles | ....................... | B64F 5/40 |
| 2022/0115008 A1* | 4/2022 | Pust | ....................... | B64C 19/00 |

* cited by examiner

Fig. 6

PilotLogBookApp

PILOT: Kevin

| | | | | | |
|---|---|---|---|---|---|
| Date | 2022-09-23 | 2022-09-23 | 2022-09-23 | 2022-09-23 | 2022-08-06 |
| Aircraft ID | N992MG | N992MG | N992MG | N992MG | N995GH |
| Origin | KMSO | KSUN | KVAL | KPSM | KOPF |
| Destination | KSN | | KMSO | KAVL | KOPF |
| Route | | | | | |
| Time Out | 00:17:00 | | 16:48:00 | 13:30:00 | |
| Time Off | 04:32:00 | | 16:49:00 | 13:36:00 | |
| Time On | 01:16:00 | | 20:36:00 | 15:21:00 | |
| Time In | 01:31:00 | | 20:51:00 | 15:27:00 | |
| On Duty | | | | | |
| Off Duty | | | | | |
| Total Time | 1.2 | 0 | 4 | 2 | 0.8 |
| PIC | 1.2 | 0 | 0 | 2 | |
| SIC | 0 | 0 | 0 | 0 | 0.8 |
| Night | | 0 | 0 | 0 | |
| Solo | 0 | 0 | 0 | 0 | |
| Cross Country | 1.2 | 0 | 4 | 2 | |
| NVG | 0 | 0 | 0 | 0 | |
| NVG Ops | | | | | |
| Distance | 0 | 0 | 0 | 0 | |
| Day Takeoffs | 1 | 0 | 1 | 0 | |
| Day Landings Full Stop | 1 | 0 | 1 | 1 | |
| Night Takeoffs | 0 | 0 | 0 | 0 | |

Fig. 7

| PilotLogBookApp | |
|---|---|
| Pilot Data | PILOT: Kevin |

```
{
  "ident": "N992MG",
  "ident_icao": null,
  "ident_iata": null,
  "actual_runway_off": "29",
  "actual_runway_on": "25",
  "fa_flight_id": "N992MG-1664065850-6-3-166",
  "operator": null,
  "operator_icao": null,
  "operator_iata": null,
  "flight_number": null,
  "registration": "N992MG",
  "atc_ident": null,
  "inbound_fa_flight_id": null,
  "codeshares": [],
  "codeshares_iata": [],
  "blocked": false,
  "diverted": false,
  "cancelled": false,
  "position_only": false,
  "origin_code": "KPWM",
  "origin_code_icao": "KPWM",
  "origin_code_iata": "PWM",
  "origin_code_lid": "PWM",
  "origin_timezone": "America/New_York",
  "origin_name": "Portland Intl Jetport",
  "origin_city": "Portland",
  "destination_code": "KSBA",
  "destination_code_icao": "KSBA",
  "destination_code_iata": "SBA",
  "destination_code_lid": "SBA",
  "destination_timezone": "America/Los_Angeles",
  "destination_name": "Santa Barbara Muni",
  "destination_city": "Santa Barbara",
  "departure_delay": 4607,
  "arrival_delay": 4787,
  "filed_ete": 19680,
  "scheduled_out": null,
  "started_out": null
}
```

| Column 1 | Column 2 | Column 3 |
|---|---|---|
| ☐ Toggle All Columns | ☑ actual_off | ☐ logbook_day_landings_full_stop |
| ☐ ident | ☐ scheduled_on | ☐ logbook_night_takeoffs |
| ☐ ident_icao | ☑ actual_on | ☐ logbook_night_landings_full_stop |
| ☐ ident_iata | ☐ scheduled_in | ☐ logbook_all_landings |
| ☐ actual_runway_off | ☐ estimated_in | ☐ logbook_actual_instrument |
| ☐ actual_runway_on | ☐ actual_in | ☐ logbook_simulated_instrument |
| ☐ fa_flight_id | ☐ progress_percent | ☐ logbook_hobbs_start |
| ☐ operator | ☐ status | ☐ logbook_hobbs_end |
| ☐ operator_icao | ☐ aircraft_type | ☐ logbook_tach_start |
| ☐ operator_iata | ☐ route_distance | ☐ logbook_tach_end |
| ☐ flight_number | ☐ filed_airspeed | ☐ logbook_holds |
| ☑ registration | ☐ filed_altitude | ☐ logbook_approach1 |
| ☐ atc_ident | ☐ route | ☐ logbook_approach2 |
| ☐ inbound_fa_flight_id | ☐ baggage_claim | ☐ logbook_approach3 |
| ☐ codeshares | ☐ seats_cabin_business | ☐ logbook_approach4 |
| ☐ codeshares_iata | ☐ seats_cabin_coach | ☐ logbook_approach5 |
| ☐ blocked | ☐ seats_cabin_first | ☐ logbook_approach6 |
| ☐ diverted | ☐ gate_origin | ☐ logbook_dual_given |
| ☐ cancelled | ☐ gate_destination | ☐ logbook_dual_received |
| ☐ position_only | ☑ logbook_date | ☐ logbook_simulated_flight |
| ☐ origin_code | ☐ logbook_aircraft_id | ☐ logbook_ground_training |
| ☑ origin_code_icao | ☑ logbook_origin | ☐ logbook_instructor_name |
| ☑ destination_code_icao | ☑ logbook_destination | ☐ logbook_instructor_comments |
| ☐ origin_code_iata | ☑ logbook_total_time | ☐ logbook_person1 |
| ☐ origin_code_lid | ☑ logbook_timeoff | ☐ logbook_person2 |
| ☐ origin_timezone | ☑ logbook_timeon | ☐ logbook_person3 |
| ☐ origin_name | ☐ logbook_timein | ☐ logbook_person4 |
| ☐ destination_code | ☐ logbook_timeout | ☐ logbook_person5 |
| ☐ destination_code_iata | ☐ logbook_on_duty | ☐ logbook_person6 |
| ☐ destination_code_lid | ☐ logbook_off_duty | ☐ logbook_flight_review |
| ☐ destination_timezone | ☐ logbook_pic | ☐ logbook_checkride |
| ☐ destination_name | ☐ logbook_sic | ☐ logbook_ipc |
| ☐ destination_city | ☐ logbook_night | ☐ logbook_nvg_proficiency |
| ☐ departure_delay | ☐ logbook_solo | ☐ logbook_faa_6158 |
| ☐ arrival_delay | ☐ logbook_cross_country | ☐ logbook_pilot_comments |
| ☐ filed_ete | ☐ logbook_nvg | ☐ logbook_pilot_name |
| ☐ foresight_predictions_available | ☐ logbook_nvg_ops | ☑ calculated_api_total_time |
| ☐ scheduled_out | ☐ logbook_distance | ☑ calculated_time_delta |
| ☐ estimated_out | ☐ logbook_day_takeoffs | |

Fig. 9

PilotLogBookApp

| Pilot Name | Total Logbook Time | API Total Time | Delta | Cust. Calc. |
|---|---|---|---|---|
| Kevin | 3.2 | 2.6 | 0.6 | 81.25 |
| 72 | 74 | 76 | 78 | 80 |

Found Logbooks | Missed Logbooks

|  | Logbook #1233 | Logbook #4421 |
|---|---|---|
| registration | N992MG | N992MG |
| origin_code_icao | KPSM | KMSO |
| destination_code_icao | KAVL | KMSO |
| actual_off | 2022-09-23T13:36:41 | 2022-09-24T00:19:10 |
| actual_on | 2022-09-23T15:21:29 | 2022-09-24T01:16:00 |
| logbook_date | 2022-09-23 | 2022-09-23 |
| logbook_origin | KPSM | KMSO |
| logbook_destination | KAVL | KSN |
| logbook_timeoff | 13:36:00 | 04:32:00 |
| logbook_timeon | 15:21:00 | 01:16:00 |
| logbook_total_time | 2 | 1.2 |

| PilotLogBookApp | | | | |
|---|---|---|---|---|
| Pilot Name | Total Logbook Time | API Total Time | Delta | Cust. Calc. |
| Kevin | 3.2 | 2.6 | 0.6 | 81.25 |
| 72 | 74 | 76 | 78 | 80 |

Found Logbooks | Missed Logbooks

|  | Logbook 3557 | Logbook 9247 | Logbook 3217 | Logbook 7752 | Logbook 1277 |
|---|---|---|---|---|---|
| Aircraft ID | N992MG | N992MG | N992MG | N992MG | N992GH |
| Origin | KSUN | KAVL | KAVL | KMSO | KOPF |
| Destination |  | KMSO |  |  | KOPF |
| Date | 2022-09-23 | 2022-09-23 | 2022-09-23 | 2022-09-23 | 2022-08-26 |
| Time Off |  | 16:49:00 |  |  |  |
| Time On |  | 20:36:00 |  |  |  |
| Total Time | 0 | 4 | 0 | 0 | 0.8 |
| Is Blocked | false | false | false | false | false |

|  | Logbook 4343 | Logbook 2733 | Logbook 8333 | Logbook 3458 |
|---|---|---|---|---|
| Aircraft ID | N992GH | N992GH | N7SB | N474ME |
| Origin | KPHX | KBVY | KDAL | KJYO |
| Destination | KPHX | KTEB | KTYS | KORL |
| Date | 2022-08-02 | 2022-07-20 | 2024-03-13 | 2023-05-20 |
| Time Off |  |  |  | 15:12:00 |
| Time On |  |  |  | 17:00:00 |
| Total Time | 5 | 1.3 | 1.6 | 2 |
| Is Blocked | false | false | true | true |

71

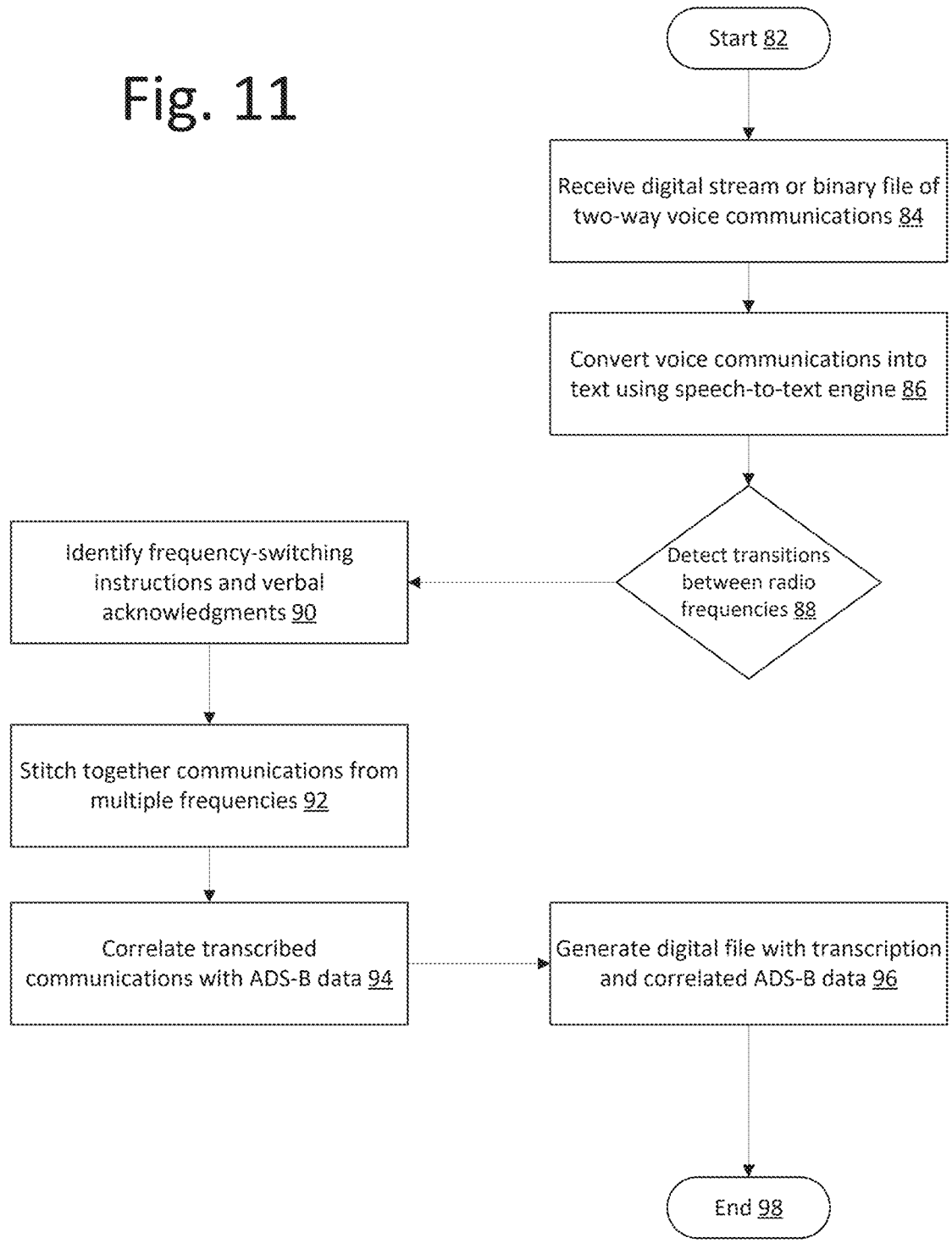

Fig. 12
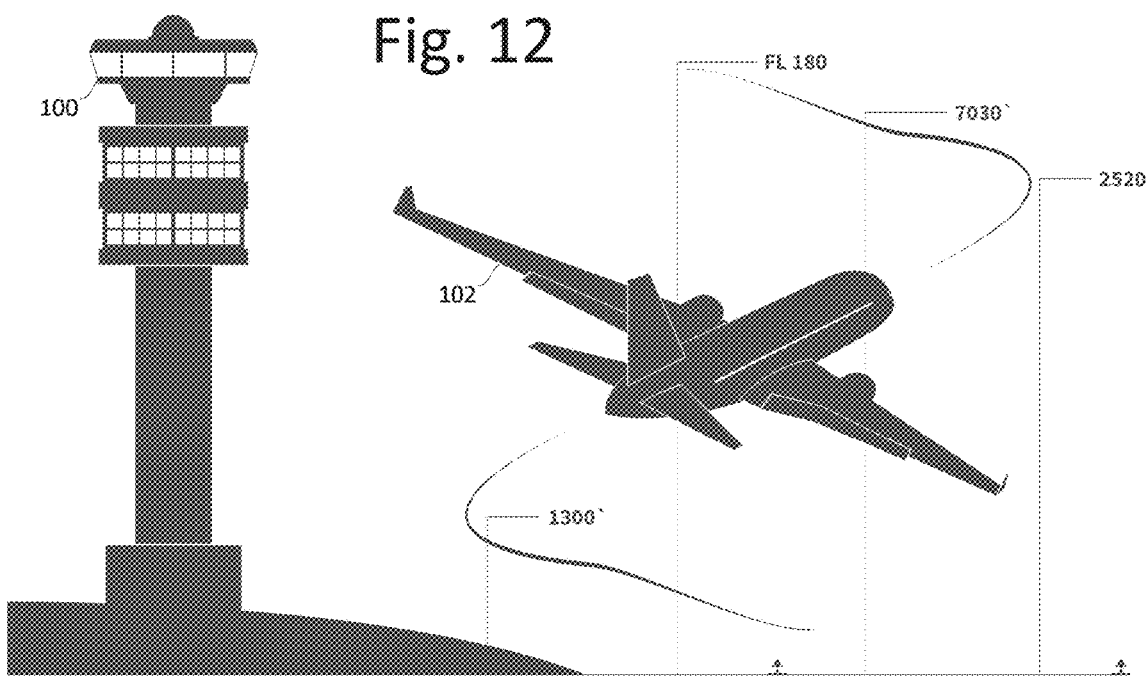
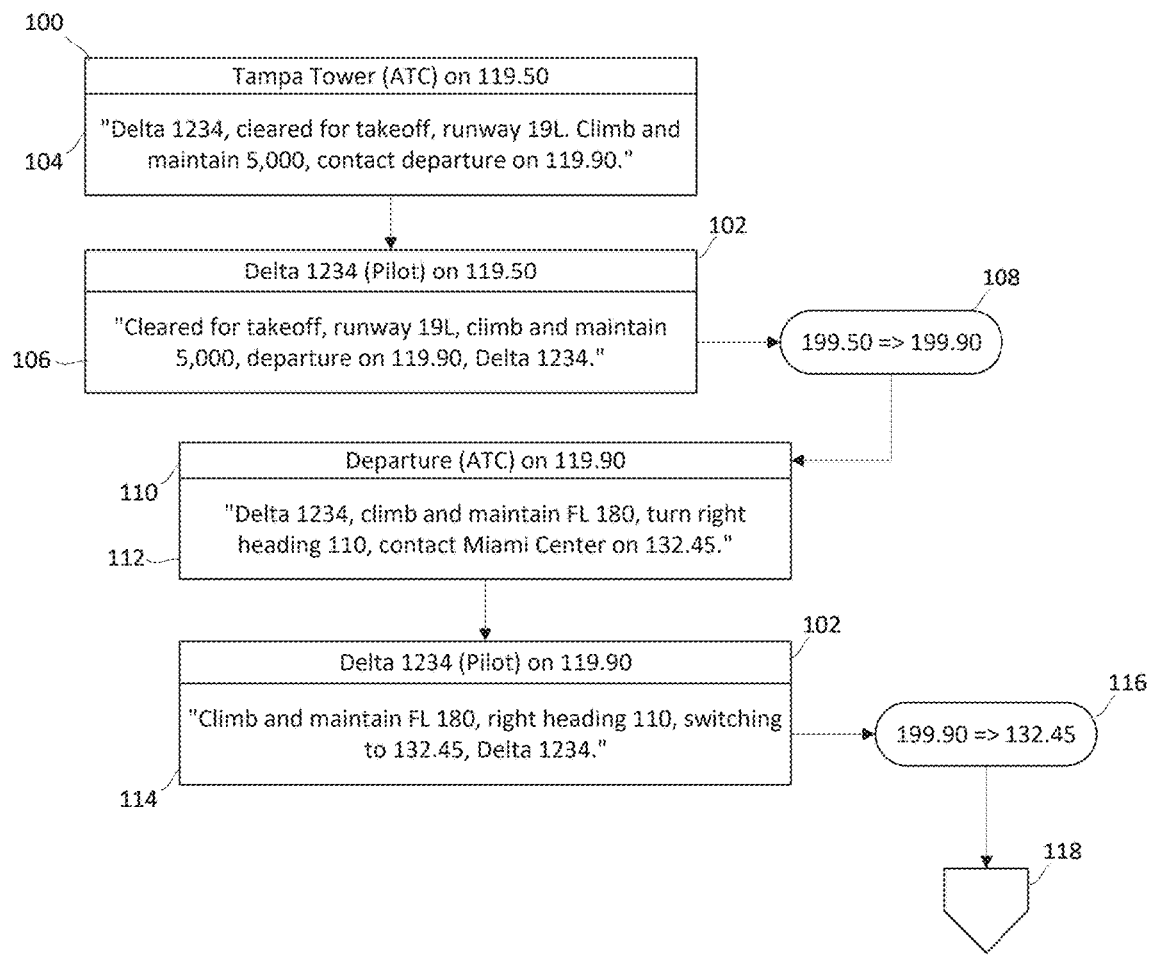

Fig. 13

```
{
  "timestamp": "2024-09-25T14:30:00Z",
  "atc": {
    "iata": "TPA",                          ⸺ 100
    "frequency": "119.50",
    "instructions": {
      "clearance": "cleared for takeoff",   ⸺ 104
      "runway": "19L",
      "altitude": 5000,
      "handoff": {
        "frequency": "119.90",
        "to": "Tampa Departure"
      }
    }
  },
    "timestamp": "2024-09-25T14:30:05Z"
  },
  "pilot": {
    "callsign": "Delta 1234",               ⸺ 102
    "frequency": "119.50",
    "acknowledgment": "Cleared for takeoff, runway 19L, climb and maintain 5,000, departure on 119.90.",
    "timestamp": "2024-09-25T14:30:08Z"
                                             106
  },
  "adsb": {
    "icao24": "A4F45B",
    "tailnumber": "N1234D",
    "origin": "KTPA",
    "destination": "KMIA",
    "groundspeed": 15,
    "altitude": 0,
    "heading": 190,
    "position": {
      "latitude": 27.9755,
      "longitude": -82.5333
    },
    "timestamp": "2024-09-25T14:30:10Z"
  }
}
```

QUANTITATIVE VISUAL TRANSLATION OF AIRCRAFT RADIO COMMUNICATIONS

CROSS REFERENCE TO RELATED APPLICATIONS

The present application claims the benefit of the filing date of U.S. Non-Provisional patent application Ser. No. 18/896,230 filed on Sep. 25, 2024 entitled "Flight Compliance System Integration of ATC Transcription and ADS-B Data."

BACKGROUND OF THE INVENTION

1. Field of the Invention

The embodiments described relate generally to aviation communication and data visualization systems. Specifically, the described embodiments relate to systems and methods for converting aircraft pilot voice communications into structured data formats, correlating these structured communications with Automatic Dependent Surveillance-Broadcast (ADS-B) data, and generating quantitative visual spatial representations of in-flight conditions for enhanced operational safety and situational awareness.

2. Description of the Related Art

As of September 2021, the United States had an estimated pilot population of approximately 664,000, distributed across various certification levels. The most common certification, held by approximately 167,000 individuals, was the private pilot certificate. Commercial pilots, licensed to receive remuneration for their aviation services, numbered around 130,000. Airline Transport Pilots (ATPs), those qualified to serve as the commanding pilot of commercial airline flights, represented about 170,000 of the total pilot population. Recreational pilots, who have fewer privileges compared to private pilots, accounted for around 6,000 individuals. Meanwhile, the aviation sector was also home to approximately 220,000 student pilots, in the process of becoming fully certified.

Despite the size of this pilot population, the civil aviation industry is plagued by a persistent and long-felt challenge: the lack of a rigorous and reliable system for validating pilot flight logs. The current system for recording and verifying pilot experience is antiquated, having remained largely unchanged for decades. This lack of innovation in flight log validation poses serious risks to aviation safety. Pilots, often under external pressures or personal motivations, may be incentivized to inflate their flight hours or otherwise manipulate their logbook entries. Such inaccuracies can lead to inflated experience figures, which contribute to increased aviation mishaps, undermining the safety of passengers, and causing approximately $4.6 billion in related annual costs. Without a reliable system for verifying these entries, the aviation industry largely depends on the honesty and integrity of individual pilots, which introduces significant risks into the operation of aircraft and the overall safety of the aviation sector.

Under the current FAA regulations, pilot logbooks are the primary tool for tracking a pilot's qualifications, experience, and adherence to required certifications. These records are used to certify that a pilot has met the necessary flight hours, received the requisite training, and performed under specific conditions. Pilots must log detailed information for each flight or instructional session, including the date, total flight duration, and departure and arrival locations, typically using three-letter airport identifiers. The aircraft's type, model, and registration number (commonly known as the N-number in the United States) must also be recorded. The role of the pilot during the flight—whether acting as Pilot in Command (PIC), Second in Command (SIC), or under dual instruction—must be clearly stated, and the flight's operational rules (e.g., whether it was conducted under Visual Flight Rules (VFR) or Instrument Flight Rules (IFR)) must be specified.

Additionally, pilots are required to log more granular details, such as the number of day and night takeoffs and landings, the types and numbers of instrument approaches conducted, and any time spent in simulators or training devices. For those in training, recording specific maneuvers or tasks practiced during the flight is critical. Flight instructors can also provide endorsements and observations in the logbook's comments section. Given the highly detailed nature of this record-keeping, logbook entries are susceptible to both inadvertent errors and intentional embellishments. The absence of a robust verification system allows for discrepancies in logbook data to go unchecked, potentially endangering aviation safety.

The aviation industry is further hindered by the lack of systems that integrate real-time data from Air Traffic Control (ATC) communications with recorded flight operations, such as those provided by Automatic Dependent Surveillance-Broadcast (ADS-B) systems. ATC communications play an essential role in providing instructions to pilots, guiding them through takeoffs, landings, altitude changes, and other critical maneuvers. These communications are typically conducted across multiple radio frequencies, as pilots transition between different airspace sectors such as ground control, tower control, departure, approach, and en-route control. Each of these sectors operates on its own designated frequency, and pilots are required to switch to the appropriate frequency as they move through the different phases of flight.

However, ATC communications are generally recorded as individual audio files, each tied to a specific frequency and controller. While these recordings are critical for post-flight analysis, investigations, and compliance with regulations, they do not provide a cohesive or continuous log of communication between pilots and ATC controllers, especially when multiple frequency changes occur. As a result, it is difficult to reconstruct the full conversation that takes place between ATC and a pilot during flight, particularly if the flight crosses multiple sectors of controlled airspace. Additionally, these recordings do not provide a real-time validation of pilot actions against ATC instructions.

The FAA mandates that all ATC communications be recorded for operational purposes and accident investigations, as specified in 14 CFR § 91.609(b). These recordings are generally retained for a minimum of 45 days, although certain legal or investigative cases may require extended retention periods. Modern Digital Voice Recording Systems (DVRS) are used to capture ATC communications, and these recordings are stored on secure servers in digital formats. While many systems record only the audio, some advanced systems capture additional metadata, which can provide valuable context during post-flight analysis.

Some of the more technologically advanced ATC recording systems, particularly those used at larger airports, store metadata alongside the audio recordings. This metadata may include time-stamps synchronized with Coordinated Universal Time (UTC), ensuring precise timing of each communication. Other metadata may include frequency information, identifying the specific radio frequency on which the communication took place, and in some cases, geolocation data linked to GPS coordinates of both the aircraft and the ATC facility at the time of the transmission. Communication context tags can also be recorded, which indicate whether the communication was initiated by the aircraft or ATC. Such metadata aids in the reconstruction of events, particularly in the event of a post-incident investigation.

Several commercial systems are currently in use to manage ATC recordings. For instance, NICE Systems provides voice recording solutions specifically tailored to air traffic management and is widely used by airports and ATC centers worldwide. These systems not only store audio data but also the associated metadata, with the ability to synchronize and playback multi-frequency communications, offering a more cohesive view of communication streams. COMSOFT offers a similar solution designed for recording, archiving, and retrieving ATC communications, fully compliant with International Civil Aviation Organization (ICAO) standards. In Europe, Eurocontrol maintains a centralized repository for ATC communication recordings, which are stored in compliance with Eurocontrol's Safety Regulatory Requirements (ESARR 6).

In addition to the recording of ATC communications, there is an increasing trend toward the automation of transcription of these communications into text. Speech-to-text platforms are being utilized to enhance post-flight analysis and make ATC communications more searchable and accessible. Systems such as those provided by NICE and Verint Systems incorporate Automatic Speech Recognition (ASR) algorithms that are specifically designed for aviation environments, ensuring accurate transcription of both pilot and controller communications. These platforms also offer the ability to cross-reference transcribed audio with real-time flight data from ADS-B, providing a more comprehensive analysis of flight operations.

Despite these advancements in the transcription and recording of ATC communications, there remains a significant gap in the ability to automatically cross-reference ATC instructions with the aircraft's actual performance. While ATC communications are vital for ensuring safe flight operations, they are typically disconnected from real-time flight data such as that provided by ADS-B. ADS-B is a surveillance technology that allows aircraft to determine their position via satellite navigation and periodically broadcast their location, velocity, altitude, and other metrics. ADS-B provides real-time tracking and enhances situational awareness, especially in areas with limited radar coverage.

One area where this disconnect between ATC instructions and flight data is especially problematic is in the verification of pilot actions. For example, when ATC provides an instruction to descend to a specific altitude, there is no real-time mechanism in place to verify whether the aircraft is actually following the given command. While systems like ADS-B can track altitude changes, they are not currently integrated with ATC transcription systems in a way that allows for automatic cross-checking of pilot compliance with ATC instructions. This limitation poses significant safety risks, as deviations from ATC commands may go undetected until it is too late to correct the error.

Another challenge that has not been fully addressed by existing systems is the need for a seamless, continuous log of ATC communications that maintains contextual integrity as pilots move between different frequencies. The current practice of archiving communications as segmented audio files tied to individual frequencies makes it difficult to track the full scope of a conversation as it progresses through different phases of flight. This lack of continuity can hinder post-flight investigations, where reconstructing the full communication between a pilot and ATC is critical.

Thus, there exists a long-standing need in the aviation industry for a system that can stitch together ATC communications across multiple frequencies, creating a unified record that is automatically cross-referenced with real-time flight data from ADS-B systems. Such a system would not only enhance post-flight analysis and investigations but would also provide real-time validation of aircraft operations against ATC instructions, thereby improving safety and compliance in civil aviation. The gap in the state of the art highlights the necessity of integrating ATC transcription with flight data in a meaningful and automated way to ensure a higher level of operational accuracy and safety in aviation.

BRIEF SUMMARY OF THE INVENTION

In modern aviation, the efficient and accurate logging of pilot flight hours, compliance with air traffic control (ATC) instructions, and the validation of flight operations remain essential but challenging aspects of flight operations. Current methods of logbook management are manual, prone to human error, and difficult to verify against independent data streams. Additionally, these manual processes often fail to provide cross-referenced validation with real-time data such as communications with ATC, geographic positioning, and performance metrics like altitude and speed.

The present invention provides a method and system to generate a continuous, unbroken transcription of two-way voice communications between ATC and an aircraft, supplemented with synchronized Automatic Dependent Surveillance-Broadcast (ADS-B) data. By doing so, this system addresses key gaps in the traditional pilot logbook system and brings new capabilities that automate transcription, validate logbook entries, optimize data storage, and ensure regulatory compliance in a reliable manner.

Speech-to-Text Processing for ATC Communications

The invention begins by receiving, through a digital communication system, a stream of two-way voice data between ATC entities and an aircraft in flight. This data is processed using a speech-to-text engine that is specifically trained on aviation-specific phraseology, which is a lexicon of specialized terms, phonetics, and language unique to ATC communications. Through advanced natural language processing (NLP) techniques, the system is able to effectively transcribe both ATC and pilot communications in real time.

The training of the speech-to-text engine on aviation phraseology is an essential aspect of the system's operation. ATC communications typically use a highly structured language that must be interpreted with precision to avoid errors. For example, aircraft call signs, ATC instructions for altitude or speed changes, and handoffs between different ATC sectors must all be identified accurately and attributed to the correct entity. The machine learning algorithms that underpin the system's speech-to-text engine are trained not just to recognize these terms, but also to understand the context in which they are used. The system also includes provisions for recognizing regional accents and variations in speech patterns among both pilots and ATC personnel, ensuring that the transcription is accurate even in challenging communication environments.

Stitching ATC Communications Across Frequencies

One of the key innovations of the system is its ability to stitch together ATC-pilot communications across multiple radio frequencies. In traditional aviation systems, ATC communications are often fragmented when the aircraft moves between different ATC sectors. For example, as an aircraft transitions from ground control to tower control, or from en-route control to approach control, the communications are typically recorded and stored in separate files, each tied to a specific frequency. This results in a fragmented communication log that is difficult to reconstruct after the fact.

The present system solves this problem by maintaining a continuous, unbroken transcript of the communication thread as the aircraft moves across different ATC sectors. When the system detects verbal instructions from ATC to switch frequencies, or when it recognizes the pilot's acknowledgment of such instructions, it identifies the frequency change and dynamically stitches together the communications from both the old and the new frequency. This allows the system to create a single, continuous transcript that spans the entire duration of the flight, even as the aircraft switches frequencies multiple times. This continuity is crucial for post-flight analysis, regulatory compliance, and real-time decision-making.

Handling Overlap and Transition Delays in Frequency Changes

Another important feature of the system is its ability to handle transition delays and overlaps during frequency changes. In real-world scenarios, the pilot and ATC may not switch frequencies at exactly the same time. For example, the pilot might be instructed to switch to a new frequency, but there may be a brief delay before the pilot actually switches, during which time the ATC may still be communicating on the old frequency. The system is designed to handle such delays by overlapping communications from adjacent frequencies, ensuring that no part of the conversation is lost or misattributed during the handoff.

This overlapping is accomplished by dynamically adjusting the time window during which communications from both the old and new frequencies are captured. The system tracks the timecode metadata associated with each communication and aligns the timestamps from both frequencies to ensure that the conversation is accurately stitched together. This ensures that communications are not prematurely cut off when a new frequency is introduced and allows the system to maintain the contextual integrity of the conversation as it spans multiple frequencies.

Integration of ADS-B Data

In addition to processing voice communications, the system also integrates real-time ADS-B data into the transcript. ADS-B is a critical technology in modern aviation that allows aircraft to broadcast their position, altitude, speed, and other operational metrics at regular intervals. This data is received by the system and correlated with the transcribed communications, allowing the system to verify the aircraft's compliance with ATC instructions in real time.

For example, when ATC instructs a pilot to descend to a specified altitude or adjust the aircraft's heading, the system can cross-reference these instructions with the ADS-B data to ensure that the aircraft is following the prescribed course of action. If a discrepancy is detected—such as the aircraft climbing when it was instructed to descend—the system can generate an alert to notify both the pilot and ATC of the deviation. This real-time cross-referencing adds an important layer of validation, ensuring that instructions are followed and providing a safeguard against potential miscommunication or human error.

ATC Instruction Correlation and ADS-B Validation

An aspect of the invention focuses on detecting verbal ATC instructions and monitoring aircraft actions by correlating ADS-B feedback, providing a comprehensive system for ensuring compliance with ATC instructions. This system uses a combination of semantic analysis of ATC-pilot communications and real-time or archived ADS-B data to validate aircraft performance. The method requires the model to understand specific ATC commands and correlate those with the expected aircraft response based on predefined parameters.

The ATC instructions that the system processes include a range of operational commands, such as climb and descent instructions, heading adjustments, speed management, frequency transitions, holding patterns, approach clearances, and missed approach procedures. These instructions are critical during different phases of flight, from takeoff and enroute operations to landing and missed approaches.

For example, when ATC gives a command to "Climb to 10,000 feet," the system monitors whether the aircraft adjusts its altitude as per the instruction. This involves checking the ADS-B data to confirm that the aircraft's altitude increases to 10,000 feet. Similarly, a command like "Turn left heading 270 degrees" would require the aircraft to change its heading, which the system verifies through the ADS-B data showing the aircraft's current and adjusted headings.

Speed adjustments are another critical instruction category, such as when ATC directs, "Reduce speed to 250 knots." The system compares this instruction with the ADS-B data to verify whether the aircraft's speed decreases as expected. By monitoring these real-time changes in speed, the system ensures that aircraft comply with instructions during various phases of flight, especially in congested airspace or during descent.

Frequency transitions, such as "Contact Departure on 123.45," signal the pilot to switch communication frequencies. The system ensures that these frequency changes are detected and logged correctly, verifying that the pilot has complied with the instruction. This ensures seamless communication between the pilot and ATC, even as the aircraft moves through different airspace sectors.

For holding patterns, such as "Hold at 5,000 feet, fly 10-mile legs," the system would expect to see the aircraft fly a specific loop or flight path. ADS-B data will show the repeated flight path or holding pattern, and the system validates whether the aircraft is maintaining the assigned altitude and following the prescribed flight pattern.

In cases of approach clearances, such as "Cleared for ILS Runway 22R," the system would monitor whether the aircraft begins the appropriate instrument approach procedure. The ADS-B data would reflect the aircraft's adherence to the approach path, descent rates, and headings, ensuring that it follows the correct flight profile to the assigned runway.

The system is also equipped to detect and monitor missed approach instructions such as, "Go around, climb to 3,000 feet, and contact Departure." In this case, the system expects to see a climb and appropriate heading adjustments, which would be verified using the ADS-B data to ensure that the aircraft is following the missed approach procedure as instructed.

To enable this level of real-time monitoring and validation, the invention incorporates a model that is trained on extensive datasets containing thousands of hours of labeled ADS-B data and ATC communications. These datasets are categorized based on whether the aircraft responded safely and proficiently to ATC commands or exhibited dangerous deviations. For example, the model might encounter a data set where the aircraft complied with all instructions and responded within an acceptable time window. Conversely, another data set might highlight a situation where the aircraft did not respond appropriately, such as failing to descend when instructed, which could indicate dangerous or non-compliant behavior.

Through continuous training on such datasets, the model learns to correlate verbal instructions with aircraft actions and evaluates operational safety in real-time. The model can be programmed to analyze each instruction and response against a pre-defined operational standard. Based on these standards, the model is able to determine whether an aircraft's performance falls within a safe and proficient range or if deviations have occurred that could be flagged as risky or dangerous. For example, when a climb instruction is issued, the model would anticipate a change in altitude in the ADS-B data and flag any delay or failure to comply.

In this process, the system also quantifies the aircraft's performance across a spectrum, ranging from complete compliance (100%) to dangerous behavior that requires immediate intervention. The highest level of compliance (100%) is achieved when the aircraft precisely follows the ATC commands, with real-time ADS-B data reflecting correct speed, heading, altitude, and other parameters. Deviations are categorized in different ranges. For instance, minor deviations, such as slightly delayed heading changes, would be categorized in the 75-99% range, signifying proficient but not perfect execution. More significant deviations, such as failure to change altitude or maintain speed, could fall within the 50-74% range, signaling the need for potential corrective action. Dangerous deviations, where the aircraft fails to follow critical instructions (e.g., climbing instead of descending), would fall below 50% and require immediate intervention to mitigate risks.

The model performs semantic analysis of ATC communications to anticipate the required aircraft actions and compare them to the actual operations observed through ADS-B data. By continuously monitoring and cross-referencing these data sources, the system can identify discrepancies in real-time and alert operators to any non-compliance or dangerous deviations. This process not only improves operational safety but also enhances post-flight analysis by providing a comprehensive log of the communication instructions and aircraft responses.

Additionally, the system uses real-time ADS-B data to generate alerts when a critical deviation occurs, such as the aircraft climbing when it should be descending or failing to adjust speed according to the instruction. The model detects these deviations and measures the degree of discrepancy, issuing real-time notifications to alert operators or ATC.

By training on large, labeled datasets and continuously refining its understanding of ATC instructions and aircraft responses, the system becomes increasingly adept at recognizing patterns of safe, proficient operation versus dangerous or non-compliant behavior. This method enables real-time monitoring, post-flight analysis, and compliance validation, providing a comprehensive system for ensuring the safety and efficiency of flight operations based on ATC communications and ADS-B data.

In addition to real-time applications, this model can process archived flight data. Archived communications and ADS-B records can be processed similarly to live data, allowing the system to validate historical flight activity for compliance and safety analysis. This functionality is especially useful for auditing past flight operations, investigating incidents, or training pilots based on real-world scenarios.

Dynamic Data Collection and Silent Period Trimming

The invention includes dynamic data collection capabilities, allowing it to adjust the rate of data collection based on the phase of the flight. For example, during critical phases such as takeoff, approach, and landing, the system increases the frequency of data collection to ensure that every communication and data point is captured with a high degree of accuracy. During these phases, the aircraft is typically interacting more frequently with ATC, making it essential to capture all relevant communications and performance metrics.

Conversely, during low-activity phases such as cruise flight, the system reduces the frequency of data collection and trims silent periods from the communication log. This optimization reduces the size of the generated file without losing any important data, making it more efficient to store, transmit, and process the file. Silent periods in the communications are detected through analysis of the audio stream, and the corresponding sections of the file are compressed, while still preserving the timecode metadata for ADS-B data and other relevant flight metrics. This ensures that even in periods of low activity, the system remains efficient while retaining all critical information.

Geographic Zone-Based Anticipation and Preloading

The system further enhances its capabilities by preloading upcoming ATC frequencies based on the aircraft's geographic location and flight plan. Using GPS data and the aircraft's pre-defined flight path, the system can anticipate which ATC frequencies will be required as the aircraft approaches new air traffic sectors. By preloading these frequencies, the system ensures that communication hand-offs occur seamlessly, without delays or interruptions.

This capability is particularly valuable in congested airspace, where maintaining uninterrupted communication with ATC is essential for safe flight operations. By anticipating and preloading the next set of frequencies, the system ensures that the pilot and ATC can maintain continuous communication even as the aircraft crosses into new geographic zones. If there is a deviation from the flight plan or an unanticipated change in the aircraft's route, the system dynamically adjusts the preloaded frequencies in real time, ensuring that communication continuity is preserved.

The following is a simple FAA-compliant flight plan from Tampa International Airport (KTPA) to Miami International Airport (KMIA) using the ICAO flight plan format, which is structured data commonly used for filing flight plans in the aviation industry:

```
(FPL-DAL1234-IS
-B738/M-SDE1FGHIJ1RWY/LB1
-KTPA1400
-N0450F350 DCT SRQ J41 PHK DCT KMIA
-KMIA0105 KMIA
-PBN/A1B1C1D1L1O1S2T1
-DOF/240925
-EET/KZMA0030
-REG/N1234D
-SEL/ABCD
-TYP/TCAS
-RMK/TCAS EQUIPPED
)
```

This example of an FAA-compliant flight plan describes a commercial flight from Tampa International Airport (KTPA) to Miami International Airport (KMIA) using the ICAO flight plan format. It begins with the flight plan header (FPL-DAL1234-IS), which indicates that this is the flight plan for Delta Airlines flight 1234, identified by the callsign DAL1234. The "IS" indicates that this is an Instrument Flight Rules (IFR) flight, meaning the flight is conducted in weather conditions that require the use of instruments rather than visual navigation.

The aircraft type is described as B738, indicating a Boeing 737-800. The string/M-SDE1FGHIJ1RWY/LB1 refers to the equipment onboard the aircraft. The aircraft is equipped for standard departure procedures, enroute operations, and terminal approach using GPS and RNAV capabilities, which provide precise navigation and reduce the need for ground-based navigation aids. The specific equipment codes reflect capabilities such as transponders, radar, GNSS, and RVSM (Reduced Vertical Separation Minimum), which allows for more efficient airspace utilization at high altitudes.

The flight is scheduled to depart from Tampa International (KTPA) at 14:00 UTC. The departure point is followed by the route, described as N0450F350 DCT SRQ J41 PHK DCT KMIA. This indicates a cruising speed of 450 knots at flight level 350, which corresponds to an altitude of 35,000 feet. The route takes the aircraft directly over the Sarasota VOR (SRQ), onto the J41 air route, over the Palm Beach VOR (PHK), and then directly to Miami (KMIA).

The flight is expected to arrive at Miami International (KMIA) at 15:05 UTC, with a total estimated enroute time of 1 hour and 5 minutes. This is noted as KMIA0105 in the plan. The aircraft's performance-based navigation (PBN) capabilities are further specified with the string PBN/A1B1C1D1L101S2T1, indicating the types of navigation and approach procedures the aircraft is certified to perform.

The Date of Flight (DOF) is specified as Sep. 25, 2024 (240925), and the Estimated Entry Time (EET) into Miami Center's (KZMA) airspace is calculated to be 30 minutes after departure, noted as KZMA0030. The aircraft is registered as N1234D, and its SELCAL code for selective calling is ABCD, allowing ground stations to call the aircraft without broadcasting to all other aircraft on the frequency. In addition, the aircraft is equipped with a Traffic Collision Avoidance System (TCAS), as indicated by the entry TYP/TCAS, with a further remark noting TCAS EQUIPPED. These details confirm that the aircraft is outfitted to detect and avoid mid-air collisions by tracking other aircraft in its vicinity.

The provision of a detailed flight plan, such as the one filed for a flight from Tampa International Airport (KTPA) to Miami International Airport (KMIA), assists the invention in identifying the subset of ATC frequencies likely to be used during different phases of the flight. Each airport, including KMIA, operates with a range of designated frequencies assigned to different ATC services such as Ground Control, Tower, Approach, Departure, and Clearance Delivery. By analyzing the flight plan, the system can correlate the aircraft's expected route, altitude, and waypoints with specific sectors of airspace controlled by different ATC entities, each utilizing its own frequencies.

In the case of KMIA, the frequency data provided by resources such as AIRNAV, details the operational frequencies for different ATC services. For example, Miami Ground Control operates on frequencies such as 121.8 MHz, Miami Tower uses 118.3 MHz for communications, and Miami Approach/Departure handles frequencies like 119.45 MHz for approach control. When the system detects that the aircraft is approaching KMIA, it can anticipate the frequency transitions by analyzing the flight plan's geographic waypoints and projected arrival times.

The system leverages the flight plan data to build a contextual map of the expected ATC frequency transitions throughout the flight. As the aircraft enters Miami airspace, the system narrows down the potential frequencies for communications handoffs based on the expected interaction with Miami Approach, Tower, and Ground Control. For instance, if the aircraft is cleared to land on Runway 12, the system knows that communications will likely involve frequencies like 118.3 MHz for Miami Tower.

In the event of ambiguities in the ATC or pilot communications—such as unclear frequency instructions or pilot miscommunication—the system can resolve these ambiguities by cross-referencing the subset of KMIA frequencies anticipated based on the flight plan and the current phase of the flight. For example, if the system detects a frequency handoff instruction that is incomplete or garbled, it can prioritize frequencies used by Miami Approach or Tower, reducing the set of possible frequencies and improving the reliability of the communication stitching.

This capability is especially valuable in environments where ATC instructions may be prone to noise, interference, or human error. By providing a subset of expected frequencies, the system can intelligently guess the most likely handoff instructions and ensure that the communications thread between ATC and the aircraft remains continuous, even when the pilot's acknowledgment is delayed or partially incomplete. This makes the entire process more reliable, ensuring that communication errors are minimized and the system can proactively handle unexpected situations.

By narrowing down the possible frequencies to those commonly used at KMIA and other relevant airspaces, the system significantly enhances the accuracy and reliability of the transcription and stitching process, ultimately improving real-time monitoring and post-flight analysis.

FAA SWIM Integration

By integrating FAA SWIM (System Wide Information Management) data, the system gains real-time access to a broader and more dynamic set of aviation information, further enhancing its ability to anticipate and preload ATC frequencies. SWIM provides near-real-time updates on airspace changes, flight plan amendments, and air traffic flow management, allowing the system to adjust dynamically in response to current airspace conditions. This capability becomes particularly important in situations where airspace congestion, rerouting due to weather, or temporary airspace restrictions might require deviations from the original flight plan.

For example, SWIM data could be used to track real-time flight plan updates if a controller issues a new routing or altitude change during flight. The system can immediately adjust its anticipated ATC frequency preloading based on these updates. By accessing SWIM's comprehensive dataset of air traffic flow and flight plan information, the system can accurately predict when and where frequency transitions will occur, even if the flight deviates from its originally filed route.

Moreover, SWIM's surveillance capabilities, which include data from radar and ADS-B, further support the system's ability to cross-check communication sequences against the real-time position and trajectory of the aircraft. In case of a flight path deviation or unexpected sector handoff, SWIM data enables the system to adapt its communication stitching algorithm, ensuring continuous tracking and accurate transcription, regardless of any mid-flight changes.

Additionally, SWIM's flight plan data allows the system to incorporate temporary flight restrictions (TFRs), NOTAMs (Notices to Airmen), and other airspace-related updates into its calculations, providing greater situational awareness. When TFRs are in effect, the system can anticipate changes in sector handoffs or frequencies, ensuring that communications remain smooth and uninterrupted even in restricted or complex airspace environments.

Finally, the use of SWIM data in the system provides enhanced post-flight analysis capabilities, offering a more comprehensive audit trail. By incorporating real-time data collected during the flight, including updated flight paths, sector transitions, and frequency handoffs, the system can provide a detailed post-flight record that is fully synchronized with FAA records. This not only improves the reliability of the communication stitching process but also ensures that the system's outputs are accurate and verifiable against FAA surveillance data.

SWIM Supplementing Subsets or Missing ADS-B Data

In certain scenarios, such as with military flights, ADS-B broadcasts may selectively exclude fields like altitude, speed, or identification, or may be turned off entirely to maintain operational security. Military aircraft, for example, may not operate in Mode 3, which is commonly used for civilian aircraft identification and tracking. In such cases, the system's ability to stitch together communications and data across sectors could be affected by incomplete information. This is where SWIM data, in combination with other surveillance data sources, becomes invaluable for filling in the gaps, both in real-time and post-flight analysis.

SWIM data provides access to various surveillance systems beyond just ADS-B, including radar tracks, primary radar data, and FAA flight data. These additional data sources can help supplement missing ADS-B information. For instance, in the event that a military aircraft such as a USAF T-38 trainer jet selectively excludes its altitude or turns off its ADS-B transmitter, SWIM's radar-based tracking data could still capture critical details about the aircraft's position and altitude. This data could be incorporated into the system's communication stitching algorithm, ensuring continuity even in the absence of full ADS-B coverage.

For example, a civilian pilot might encounter unidentified aircraft that do not display altitude on their cockpit displays due to missing ADS-B data. If the pilot communicates with air traffic control (ATC) and inquires about the unknown aircraft, ATC might respond that the aircraft are military jets operating at a specific altitude. SWIM data, which includes radar and surveillance feeds, can provide this missing information, thereby enabling the system to cross-check communications with real-time positional data and dynamically fill in the gaps. Even if the ADS-B broadcast is missing or incomplete, the system can accurately identify the aircraft's location and altitude using radar tracks, ensuring the stitched communication thread remains precise and reliable.

In post-flight analysis, SWIM data also offers enhanced retrospective capabilities. For example, during the post-flight review of an incident where the military aircraft's ADS-B transmission was turned off or limited, the system can backfill the missing data using archived radar tracks or other available SWIM data sources. By accessing FAA records that track aircraft in real-time using multiple surveillance technologies, the system can ensure a more comprehensive picture is created. This capability allows the system to accurately recreate the flight path and communication sequence, even for aircraft with partial or no ADS-B data, ensuring the integrity of the communication thread and associated flight data.

Furthermore, the system can log instances where communication handoffs involved aircraft with incomplete or missing ADS-B data, flagging these occurrences for further review. By utilizing SWIM's rich surveillance and flight data repositories, the system provides the user with a complete audit trail that accounts for both civilian and military aircraft, even in airspace where ADS-B is selectively disabled. This creates a highly reliable and accurate flight record that can be analyzed to detect anomalies, resolve communication ambiguities, and improve situational awareness during both real-time operations and post-flight auditing.

Anomaly Detection and Real-Time Alerts

In addition to monitoring compliance with ATC instructions, the system also includes an anomaly detection feature that identifies deviations from expected flight behavior. For example, if the aircraft deviates from its assigned flight path or fails to maintain the correct altitude during approach, the system can detect these anomalies by analyzing the ADS-B data and cross-referencing it with the flight plan and ATC instructions. If an anomaly is detected, the system generates a real-time alert, notifying both the pilot and ATC of the issue and allowing for corrective action to be taken.

Anomalies such as abnormal touchdown forces during landing, unauthorized altitude changes, or deviations from the prescribed approach path can also be flagged by the system. These alerts provide valuable feedback during flight operations and can be used to identify potential safety concerns or operational inefficiencies. The real-time notification system is designed to ensure that any deviations from standard operating procedures are detected and addressed promptly, reducing the likelihood of accidents or other safety incidents.

Integration with Pilot Logbooks and Blockchain-Based Storage

The digital file generated by the system, containing the transcribed communications and correlated ADS-B data, can be integrated into electronic pilot logbooks. This allows for automatic validation of the pilot's logbook entries by cross-referencing the logbook with real-time flight data. By ensuring that the logbook reflects the actual flight operations as recorded by the system, this integration reduces errors in manual entry and provides a more reliable record for regulatory compliance and post-flight audits. Furthermore, the system includes the option to store the generated file in a blockchain-based digital ledger. Blockchain technology provides a decentralized, tamper-proof storage solution, ensuring that the flight data remains secure and unaltered over time. This feature is particularly valuable for regulatory compliance, as it ensures that the logbook data can be audited and verified by third parties without the risk of data tampering or alteration.

Long-Term Data Storage and Post-Flight Analysis

The system's ability to record, store, and analyze both ATC communications and flight data in a secure and immutable format also makes it a valuable tool for post-flight analysis. Regulatory bodies, airlines, and safety investigators can use the data to conduct detailed reviews of flight operations, assess pilot performance, and identify areas for improvement. By providing a complete, unbroken transcript of communications and operational metrics provides a high level of transparency, enabling thorough investigations in the event of an incident or accident. The ability to store this data in a blockchain-based ledger further ensures the integrity of the records, providing an immutable log that can be relied upon for regulatory compliance, litigation, and safety reviews.

The long-term storage of flight data is optimized by the system's ability to trim silent communication periods and compress low-activity data, reducing the overall size of the stored files. This not only saves storage space but also allows the data to be transmitted more efficiently between systems, making it easier for airlines and regulatory authorities to manage large volumes of flight data across multiple aircraft.

Event Detection Based on ADS-B and Operational Data

The system's integration with ADS-B allows it to detect specific flight events that may be of interest to safety analysts, such as rapid altitude changes, abnormal rate of descent, or irregular landing patterns. By monitoring these metrics in real time, the system can generate reports that correlate these events with pilot-ATC communications, providing a clearer picture of the circumstances leading up to an event.

For example, during approach and landing, the system can track the aircraft's rate of descent and compare it with standard approach profiles for the destination airport. If the system detects that the aircraft is descending too rapidly or at an abnormal angle, it can flag this event and cross-reference it with the communications between the pilot and ATC to determine whether the issue was related to miscommunication or an operational deviation by the pilot.

Compliance with FAA and ICAO Standards

The invention has been designed to operate in compliance with both FAA and International Civil Aviation Organization (ICAO) standards. The system's ability to transcribe ATC communications and correlate them with real-time ADS-B data ensures that it meets the requirements for maintaining accurate flight records and ensuring compliance with ATC instructions. Additionally, by integrating with existing pilot logbook systems, the invention helps airlines and pilots meet their regulatory obligations for record-keeping and flight verification. FAA regulations require that pilots maintain detailed and accurate records of their flight hours and compliance with ATC instructions, and the present system addresses this requirement by automating the transcription and validation processes. The ability to cross-reference pilot logbook entries with actual flight data not only improves accuracy but also ensures that the records are verifiable by third parties, such as regulators or insurance companies.

Enhancing Training and Safety Programs

The system's detailed logs of ATC communications and flight performance can also be used for pilot training and safety programs. By reviewing the continuous transcript of communications alongside the aircraft's performance metrics, training programs can identify areas where pilots may need additional instruction or where operational procedures could be improved. For example, if the system detects that a pilot frequently deviates from assigned flight paths during approach or landing, this could indicate a need for additional training in flight path management or coordination with ATC. Similarly, if a pilot consistently takes longer than expected to respond to ATC instructions, this could be an area of focus for improving communication efficiency and reducing operational risks.

The system's ability to store this data securely over time ensures that airlines and regulatory authorities can maintain long-term records of pilot performance, which can be used to assess trends, evaluate training effectiveness, and make informed decisions about pilot certification and ongoing education.

In an embodiment, a computer-implemented method is used to generate a continuous transcription of communications between an aircraft and air traffic control (ATC). The system begins by receiving a digital stream or binary file of two-way voice communications between the ATC entity and the pilot. These communications are processed through a speech-to-text engine specifically trained on aviation terminology to convert the audio into structured text. This allows the system to capture key ATC instructions and pilot acknowledgments, transforming them into machine-readable data while filtering out irrelevant content.

The system further detects transitions between radio frequencies by identifying frequency-switching instructions within the transcribed text, along with the pilot's corresponding acknowledgment. As aircraft switch frequencies when moving between different airspace sectors, the system stitches together communications from these multiple frequency transitions to maintain the continuity of the communication thread throughout the flight. The system also accounts for overlap where the ATC and pilot may switch channels at different times, ensuring no communication is lost.

Once the communications have been transcribed and stitched together, the system correlates them with Automatic Dependent Surveillance-Broadcast (ADS-B) data. The ADS-B data provides real-time information on the aircraft's position, altitude, heading, and speed. Using timecode metadata, the system cross-references ATC instructions with the aircraft's operational status to verify compliance. For example, when ATC instructs the aircraft to climb to a specific altitude, the system compares the transcribed instruction with the corresponding ADS-B data to ensure the aircraft is following the directive.

In addition, the system segments transcribed text based on pauses in speech or detected punctuation, dynamically improving the accuracy of the transcriptions. This ensures that longer or more complex communications are clearly captured and can be mapped to aircraft data without confusion.

During flight, the system monitors the frequency transitions, checking for instances where the aircraft may switch to an incorrect or mismatched frequency. If a discrepancy is detected, the system generates an alert to notify the pilot or ATC of the issue, ensuring that communication between the aircraft and the proper ATC entity is maintained.

Silent communication periods are detected and trimmed from the final digital file, though the system preserves the ADS-B data and timecode metadata for those periods to maintain a complete flight record. This reduces the overall file size and optimizes the data for storage and transmission without losing essential information.

Additionally, the system dynamically adjusts the rate of ADS-B data collection during different phases of flight. During takeoff, landing, and approach phases—where high activity is expected—the system increases the frequency of data collection. Conversely, during level flight or periods of lower activity, the system reduces the sampling rate to optimize system performance and storage capacity while still maintaining operational accuracy.

The generated digital file, containing both the transcription of aircraft communications and correlated ADS-B data, can be integrated into formats compatible with electronic pilot logbooks. This allows for automatic cross-referencing and validation of pilot logbook entries based on actual ATC communications and flight data. Furthermore, the system supports storing the file in a blockchain-based ledger, ensuring that the data remains secure and tamper-proof for future access and auditing purposes.

In real-time scenarios, the system optimizes event tracking by dynamically adjusting the data collection and logging rate based on the flight phase. It can generate alerts when it detects that the aircraft is not complying with ATC instructions, comparing the real-time ADS-B data with the transcribed communications. If the system detects deviations in aircraft behavior, such as an incorrect heading or altitude, it can issue real-time notifications for corrective actions.

The system also incorporates training in its speech-to-text engine, enabling it to detect frequency changes and verbal cues related to channel switching. This ensures that critical transitions are accurately captured and logged, improving the overall reliability of the transcription process.

The system generates detailed reports that cross-reference transcribed ATC communications with ADS-B data and pilot logbook entries. These reports provide a comprehensive view of flight compliance and can be used to verify the accuracy of logbook entries, detect discrepancies, and ensure that operational standards are maintained. The system can also identify anomalies in flight behavior, such as deviations from assigned flight paths or non-compliant approach angles, issuing real-time alerts when necessary.

Finally, the system integrates transcribed ATC communications and ADS-B data into electronic pilot logbooks, providing a robust solution for auditing and regulatory compliance. By incorporating geographic location data of the aircraft, the system determines a subset of valid ATC frequencies based on the aircraft's flight path. It can anticipate upcoming frequency changes based on the geographic zone, ensuring that the aircraft and ATC remain in continuous communication. As the aircraft progresses through different airspace sectors, the system updates its frequency predictions in real-time, adjusting for any deviations from the flight plan or changes in airspace, ensuring uninterrupted communication throughout the flight.

Military Operations

In modern aviation, Automatic Dependent Surveillance-Broadcast (ADS-B) data plays a crucial role in tracking aircraft, improving safety, and ensuring efficient air traffic control (ATC) operations. ADS-B technology provides real-time position, speed, altitude, and heading information by broadcasting this data to ground stations and other aircraft equipped with ADS-B receivers. For civilian aircraft, broadcasting ADS-B data is mandatory in many parts of the world, allowing air traffic controllers to have a clear picture of the aircraft's position, even in areas where radar coverage is limited or absent.

However, in military aviation, the situation is significantly different. Many military aircraft are exempt from the requirements to squawk or transmit ADS-B data, primarily for security, operational, and tactical reasons. Military operations often need to conceal the precise location, identity, or mission of aircraft to avoid detection by adversaries, prevent interference with operations, and maintain a strategic advantage. As a result, military aircraft may selectively disable ADS-B transmissions or limit the amount of information they share publicly, broadcasting only essential Mode 3 transponder codes when necessary.

This exemption from mandatory ADS-B broadcasting creates significant challenges for air traffic control, flight tracking, and operational oversight, particularly in scenarios where military aircraft are flying in coordination with civilian traffic or when they are conducting flight operations in shared or congested airspace. To address these challenges, the present invention offers a computer-implemented method that compensates for the absence of full ADS-B data by leveraging ATC communications and other available data sources to extrapolate the position, performance, and identity of military aircraft, especially in formation flights.

The Role of Lead Aircraft in Military Formation Flights

In military aviation, it is common for a group of aircraft to fly together in a formation, often led by a designated lead aircraft that is responsible for coordinating communications and managing the overall flight. The lead aircraft typically carries the Mode 3 transponder and, when needed, transmits a limited set of ADS-B data, such as squawk codes, to ensure compliance with ATC regulations in civilian airspace. The other aircraft in the formation, known as "wingmen" or "accompanying aircraft," generally do not transmit individual ADS-B data, leaving their identity, position, and performance metrics largely obscured from the public ADS-B system.

In this scenario, the present invention becomes particularly valuable. By focusing on the lead aircraft's communications and limited ADS-B transmissions, the system can infer or extrapolate critical information about the accompanying aircraft in the formation. This is achieved by analyzing the ATC voice communications with the lead aircraft and correlating it with the available ADS-B data. The lead aircraft's transcribed communications, which typically include instructions from ATC about altitude, heading, speed, and frequency changes, are used as a basis for determining the performance and movements of the entire flight, including the wingmen.

Correlating ATC Communications and ADS-B Data

The system processes the real-time or archived ATC communications between the pilot of the lead aircraft and air traffic controllers. These communications are converted into text using a speech-to-text engine specifically trained on aviation phraseology. The transcribed text is then correlated with any available ADS-B data broadcast by the lead aircraft. Even though the wingmen are not broadcasting their ADS-B data, the transcribed communications provide valuable context for the system to infer their positions and performance metrics.

For example, if the lead aircraft receives an ATC instruction to descend to 10,000 feet or to change heading by 15 degrees, it can be reasonably inferred that the entire flight formation will follow the same instruction, as the accompanying aircraft are operating under the direction of the lead aircraft. By capturing and analyzing these communications, the system extrapolates the positions and performance data for the wingmen based on the lead aircraft's known movements, even in the absence of direct ADS-B transmissions from the other aircraft.

Extrapolation of Performance Metrics and Accountability

A key feature of this system is its ability to generate performance metrics for the entire flight formation, despite only receiving detailed data from the lead aircraft. This is particularly important for military operations where maintaining accountability for all aircraft in the flight is critical, both for safety and operational purposes. The system can calculate and record metrics such as speed, altitude, heading, and position for each accompanying aircraft by referencing the lead aircraft's data and applying known military flight patterns and formation tactics.

In military aviation, certain formation patterns are standard, meaning that the relative positions of the accompanying aircraft can often be inferred based on the lead aircraft's trajectory and performance. By leveraging this knowledge, the system can generate a comprehensive set of data that accounts for the entire flight, even if the individual wingmen are not broadcasting ADS-B data.

This extrapolated data is useful not only for real-time flight monitoring and air traffic control coordination but also for post-flight analysis and auditing. By maintaining a record of both the lead aircraft's communications and the inferred data for the wingmen, the system provides a detailed, auditable log of the flight, which is essential for military operations where accountability and mission debriefing are critical.

Addressing Gaps in Military ADS-B Data

The invention also addresses situations where military aircraft may turn off their ADS-B broadcasts altogether, a common practice during sensitive missions or operations that require a low radar signature. In these cases, the system can still provide valuable data by relying on ATC communications, flight plans, and other sources of information such as FAA System Wide Information Management (SWIM) data.

SWIM data, which integrates information from various air traffic control systems, can provide additional context for military operations by filling in gaps left by the absence of ADS-B transmissions. For instance, when a civilian pilot observes unidentified aircraft at an unknown altitude and asks ATC for clarification, ATC may provide additional details, such as confirming that the unidentified aircraft are military jets flying at a specific altitude. The system can capture and incorporate these ATC communications into the overall data set, allowing it to infer the movements and performance of the military aircraft even when they are not broadcasting ADS-B data.

In this way, the system leverages multiple data streams—including ATC communications, SWIM data, and the limited ADS-B data from the lead aircraft—to create a comprehensive and accurate picture of the entire flight. This capability is particularly useful in shared airspace where military and civilian aircraft are operating concurrently, as it ensures that ATC and other stakeholders have a clear understanding of the military aircraft's position and performance, even when direct ADS-B data is unavailable.

Mode A Transponder and Non-Squawking Aircraft

To further enhance the invention's applicability in scenarios where military or civilian aircraft are not squawking ADS-B data or transmitting full Mode 3 signals, another embodiment addresses aircraft squawking only Mode A or not squawking at all. This scenario introduces a significant challenge for air traffic control (ATC) and flight tracking systems, particularly in congested airspaces or during sensitive military operations. To overcome this, the invention is designed to map aircraft positions based on VHF communications and ATC transcribed position reports, effectively reverse-engineering the aircraft's position and trajectory by using procedural control data.

Mode A transponder systems, which are still in use in certain areas of the world, are more basic than modern ADS-B technology. While ADS-B provides detailed aircraft information such as position, altitude, heading, speed, and identity, Mode A transponders transmit only a four-digit squawk code without altitude data. This squawk code is assigned by ATC and helps controllers identify the aircraft on radar. In this context, aircraft squawking Mode A provide only minimal information to ground stations, leaving critical variables such as the aircraft's precise position, altitude, and velocity unreported.

Additionally, in certain military operations or in specific civilian situations (such as aircraft that have lost their transponder capabilities), an aircraft may not squawk any code at all. In such scenarios, aircraft are effectively invisible to standard radar systems that rely on transponder signals to track their position. This creates a challenge for ATC and air traffic management systems to safely control and track such aircraft in real-time.

In this embodiment, the invention utilizes ATC transcribed VHF communications to map the position, heading, and altitude of the aircraft based on verbal position reports provided by the pilot. This methodology draws on procedural air traffic control methods, which are often used in areas with limited radar coverage (known as non-radar or procedural control), allowing controllers to maintain separation and provide clearances based on position reports rather than radar surveillance.

Transcribing VHF Communications and Reverse-Engineering Position Reports

When an aircraft is squawking Mode A or not squawking at all, the system compensates by relying heavily on VHF communication between the pilot and ATC. This communication is essential in providing position reports that can be reverse-engineered to calculate the aircraft's current position, trajectory, and velocity. In procedural air traffic control, pilots provide regular reports to ATC regarding their position, altitude, and other relevant flight parameters, often in relation to landmarks, waypoints, or navigational aids.

For example, a pilot may report: "Approaching the initial approach fix, 10 miles southeast of the airport, descending through 6,000 feet," or "Cleared to land on runway 12, 5 miles out on final." By transcribing and processing such communication exchanges, the system can determine where the aircraft is at any given moment, despite the absence of a transponder signal. This process of reverse-engineering aircraft position involves a few key components.

Transcription of VHF Communications: The system uses a speech-to-text engine trained specifically on aviation phraseology to transcribe all ATC and pilot communications. These communications contain important details about the aircraft's location, such as the distance to a waypoint, runway, or navigational aid, as well as information about altitude, direction, and velocity.

Mapping the Geographic Layout of Runways, Waypoints, and Airspace: The system integrates geographic and positional data related to the airspace, including runway layouts, navigational aids (such as VORs and waypoints), and ATC sector boundaries. For example, if the pilot reports "on a 5-mile final for runway 12," the system can translate this into a geographic position and vector by referencing the precise location of runway 12 and calculating a 5-mile radius along the aircraft's reported heading.

Extrapolation of Position and Vector Data: By correlating the transcribed position reports with known geographic data, the system can calculate key flight parameters such as position, heading, and speed. For example, a report such as "aircraft cleared for takeoff, runway 12 at Charlie intersection" gives enough information for the system to deduce the aircraft's starting position (Charlie intersection on runway 12) and initial direction (runway 12 heading). As additional position reports are transcribed, the system continuously updates the aircraft's position and trajectory, even in the absence of ADS-B or Mode C altitude data.

Logical Engine for Procedural Control: A core part of the system is a logic engine that interprets these position reports and ATC instructions in real time. This engine uses a set of procedural control rules to track aircraft movement and ensure that the reported positions align with ATC instructions and the expected flight trajectory. By analyzing these reports in conjunction with ATC clearances (e.g., clearance to enter airspace, descent instructions, or landing clearances), the system can reconstruct the flight path and correlate it with expected operational performance.

Filling Gaps in Aircraft Tracking Using Procedural Control

In scenarios where an aircraft is flying without a transponder signal (e.g., Mode A squawking without altitude or no squawk at all), the system's reliance on VHF communication becomes even more critical. This is particularly applicable in areas of procedural control, where radar coverage may be limited or non-existent, and ATC relies on verbal reports from pilots to maintain separation and coordinate aircraft movements.

For example, a military aircraft might not squawk any transponder code for operational security reasons. The system, by continuously monitoring VHF communications, would still be able to reverse-engineer the aircraft's position based on the transcribed ATC communications. If the pilot reports, "holding at 3,000 feet, 10 miles east of the VOR," the system can cross-reference this report with the known position of the VOR and update the aircraft's position accordingly.

This process is particularly valuable in congested or contested airspaces where civilian and military aircraft share the same airspace. For instance, if a civilian pilot observes unidentified aircraft at an unknown altitude, ATC could provide a verbal confirmation such as, "those are USAF T-38s at 3,000 feet." The system would transcribe this communication and automatically map the position of the T-38 formation relative to the civilian traffic, even if the T-38s are not squawking any transponder code. By integrating these reports into the system's flight monitoring and transcription processes, the invention ensures that the position of all aircraft in the airspace is continuously updated, providing ATC and other stakeholders with real-time situational awareness.

Benefits for ATC and Air Traffic Management

This embodiment has significant implications for air traffic management and procedural control. By transcribing VHF communications and reverse-engineering position reports, the system fills in the gaps left by aircraft not squawking full transponder signals. This is particularly useful for tracking military aircraft, which may disable ADS-B transmissions or squawk only Mode A for security reasons. The system allows air traffic controllers to maintain safe separation and operational control over these aircraft, even in the absence of radar-based position data.

For military operations, this capability ensures that even when transponder data is limited, the system can accurately track aircraft movements and provide post-flight analysis for debriefing or auditing purposes. In civilian airspace, where procedural control is often required, the system enhances safety by ensuring that aircraft without transponder signals are still tracked and mapped based on verbal reports.

BRIEF DESCRIPTION OF THE DRAWINGS

For a fuller understanding of the invention, reference should be made to the following detailed description, taken in connection with the accompanying drawings, in which:

For a fuller understanding of the invention, reference should be made to the following detailed description, taken in connection with the accompanying drawings, in which:

FIG. 6 shows a prototype GUI with imported pilot logbook data.

FIG. 7 shows pilot data in JSON format retrieved from an API.

FIG. 8 shows prototype GUIs for selecting matching criteria and an output of missed and found logbooks.

FIG. 9 shows a GUI comparing API-validated logbook entries to pilot records.

FIG. 10 shows a GUI identifying missed logbooks with unvalidated flight data.

FIG. 11 shows a flowchart converting ATC voice communications into text and ADS-B data validation.

FIG. 12 shows an ATC-pilot dialog with frequency transitions during a flight.

FIG. 13 shows a JSON output of ATC communications mapped to ADS-B data.

DETAILED DESCRIPTION OF THE PREFERRED EMBODIMENT

Figure 1:
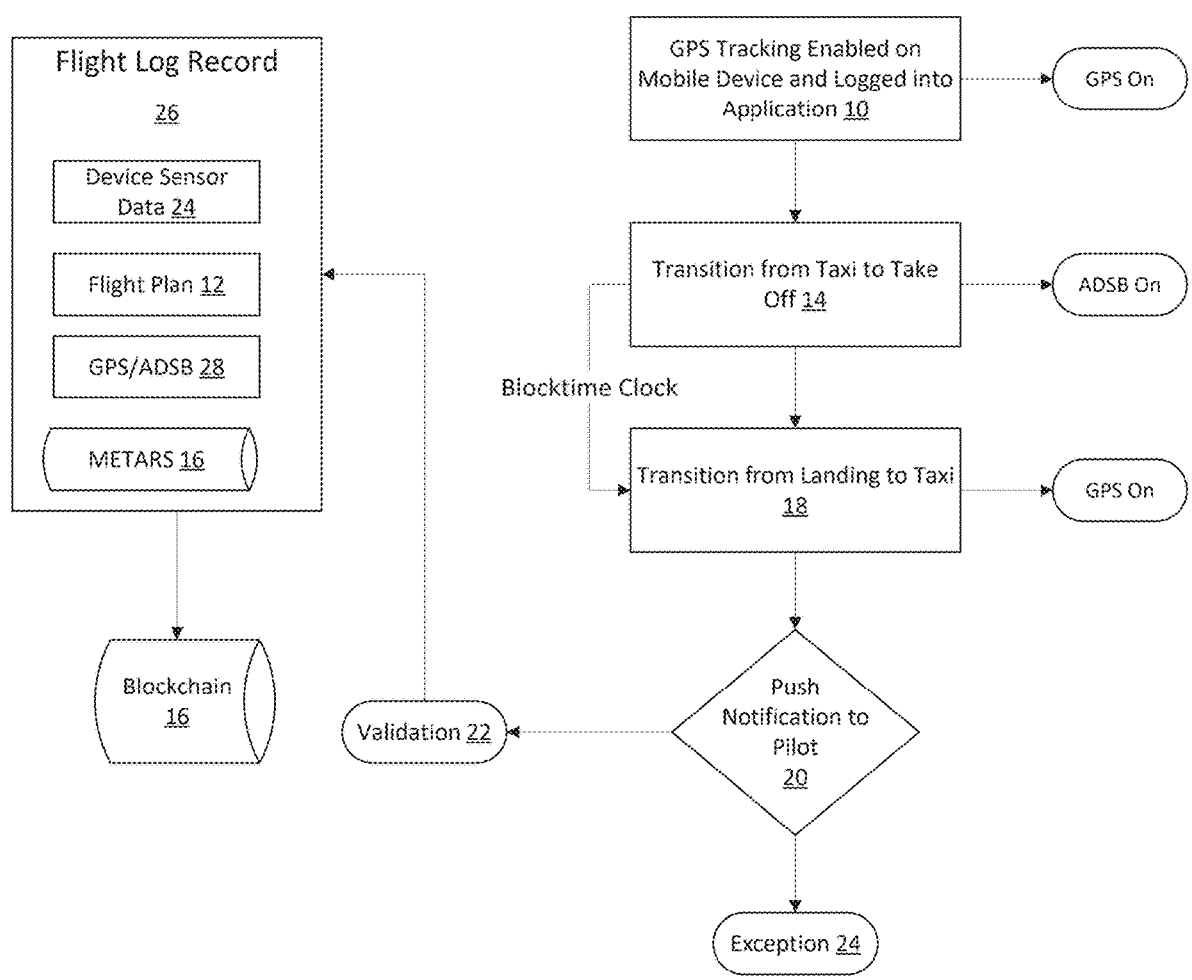
FIG. 1 is a flow chart process of an embodiment of the invention.

In the aviation industry, precise flight data recording stands as a significant requirement. To cater to this, a digital solution has been developed, resident on a mobile device fortified with a Global Positioning System (GPS) module. This tool combines GPS data, cross-referencing with Federal Aviation Administration (FAA) flight plans, and the Automatic Dependent Surveillance-Broadcast (ADSB) system, forging a rigorous process for recording and verifying flight data.

Central to this is the mobile application's capability to utilize positional data from the GPS module. The integral functionality hinges on "gates," or positional checkpoints. As an aircraft progresses, these gates are strategically triggered based on the aircraft's movement, essentially transitioning the monitoring from one medium to another. The consecutive progression through these gates crafts a holistic picture, bolstered further by incorporating integrated weather conditions and almanac data. The outcome is a thorough and validated logbook entry, which becomes indispensable for pilots and aviation authorities.

Another distinctive feature is the application's capability to track aircraft performance metrics via ADSB. This includes monitoring parameters such as airspeed, vertical speed indicator (VSI), altitude, and even the aircraft's touchdown G-forces using the mobile device's inbuilt accelerometer.

A crucial security measure employed is the "Zero Gate": a facial recognition feature integrated via services such as those under the brand ANIMETRICS. Pilots upload a copy of their license, allowing the system to cross-verify their identity by comparing the license image with real-time facial data. In addition to facial verification, a supplementary verification layer is a push notification sent to the pilot's registered phone number with the FAA.

The flow for general aviation pilots according to an embodiment of the invention is described herein. Beginning with the breach of a geo boundary, GPS interrogation intensifies in stages: entering the ramp area, commencing taxi based on GPS speed, and positioning relative to the taxiway. Taking the runway and take-off roll based on speed and location are followed by an ascent which the phone's accelerometer and vertical GPS positioning detect. At a pre-set altitude, there is an ADSB signal handoff, harmonizing the device's GPS with the ADSB signal, validating the flight for logging. The flow is reversible during landing.

Each aircraft possesses a unique identifier, the N Number, which corresponds to a distinct ADSB signal. This N Number is also integral to both IFR and VFR flight plans. By cross-referencing the FAA's aircraft registry—a comprehensive database cataloging details of all aircraft in the United States—the system can efficiently automate the logging process. This registry provides vital data, such as the aircraft's specifications (number of engines, gear type, engine type, land/sea categorization), enhancing the logging accuracy.

The flow remains largely analogous, from the initial geo boundary breach to the ADSB signal handoff during ascent, and reversibly during descent and landing. The system's capability extends to detecting any discrepancies concerning aircraft type ratings. If a pilot is operating an aircraft requiring a specific type rating, the system cross-references the pilot's license against the aircraft's specifications. Discrepancies are flagged, ensuring pilots operate only aircraft they are certified for, maintaining the integrity of their user profile.

Conditions during a flight are integral to the logbook. Cloud decks, part of the METAR at departure and destination, are incorporated. Enroute cloud decks, discerned via adiabatic lapse rate and temperature gradients relative to ground temperature, provide valuable data on instrument meteorological conditions (IMC), as stipulated in FAR part 61.51. These metrics allow pilots to correct any discrepancies, fine-tuning the system's algorithm concerning weather reports from API providers.

An aspect of the system is its use of GPS/ADSB triggers for monitoring accelerometer readings. Factors such as GPS speed beyond 40 KTs, indicative of flight intent, or altitude above terrain, inform the system's accelerometer monitoring during landing and take-off. Evaluating safety during these phases is vital. Hard landings, bouncing, or landing outside of the defined touchdown zone are detected and logged, given their implications for safety. Similarly, extended take-off rolls could signify overweight conditions, another safety concern.

Flight performance data, accessed from platforms like FLIGHT AWARE, provides insights into speed, course, altitude, lat/long, and timestamps. Comparing these metrics with METAR winds and density altitude data allows the calculation of indicated airspeeds, aiding in constructing a model of "normal" approach speeds. Additionally, ADSB's course data relative to runway heading helps establish the final line-up, while published winds facilitate computing the crosswind component. The Vertical Speed Indicator (VSI) and altitude data ascertain glideslope.

Unstable approaches, indicated by erratic glideslope and airspeed readings, are red flags. The system can discern forced landings from safe aborts, flagging potential unsafe conduct. This is vital for stakeholders like insurance companies or air carriers to intervene, possibly necessitating retraining or policy cancellations.

GPS to ADS-B Handoff

In FIG. 1, the system workflow for creating a flight log record begins when GPS tracking is enabled on a mobile device logged into the application, shown in block 10. GPS tracking is critical during taxi operations, enabling the system to monitor the aircraft's ground movements prior to takeoff. The system relies on GPS data during this phase to ensure that ground movements are accurately logged, differentiating them from in-flight operations. By using GPS, the system captures the precise position and speed of the aircraft while it navigates runways and taxiways, offering detailed data during pre-flight activities.

As the aircraft transitions to takeoff, depicted in block 14, the system automatically switches from GPS to ADS-B (Automatic Dependent Surveillance-Broadcast). This transition occurs when the aircraft reaches a threshold speed, signaling the beginning of flight. ADS-B is optimized for airborne tracking and provides comprehensive real-time data, including altitude, speed, heading, and positional updates within the broader airspace. This transition is essential because ADS-B enhances the system's ability to track the aircraft's position not just in isolation but in relation to other aircraft and ground controllers, offering a more complete view of the flight's progression.

During flight, the system continues to rely on ADS-B, which communicates real-time positional data to ensure compliance with ATC instructions. ADS-B broadcasts critical information to nearby aircraft and air traffic control, enhancing situational awareness and operational safety. The system follows the flight plan from takeoff to the approach phase, continuously logging data as the aircraft travels through different airspace sectors. This ensures a rich and accurate dataset for post-flight analysis and logbook integration.

As the aircraft approaches landing, shown in block 18, the system detects a decrease in speed as the aircraft touches down, automatically switching back from ADS-B to GPS for ground-based tracking. GPS is once again used during taxi operations post-landing, providing the detailed positional accuracy needed for ground movements such as taxiing to the gate or terminal. This transition back to GPS is critical for maintaining precise logs of ground activities, where ADS-B is less effective due to the limited spatial range and surface-level tracking.

The system integrates various data sources to generate a comprehensive flight log record, as shown in block 26. This includes device sensor data, gathered from the aircraft's onboard systems (depicted in block 24), as well as flight plan data from block 12 and GPS/ADS-B data from block 28. This integration ensures that all relevant aspects of the flight, both in the air and on the ground, are captured and logged accurately.

Additionally, the system incorporates METAR reports, shown in block 16, which provide real-time weather information essential for flight operations. METAR reports include data such as visibility, wind speed, temperature, and barometric pressure. These weather conditions are synchronized with the flight log to give a complete picture of the environmental factors impacting the flight. The integration of METARs with GPS, ADS-B, and flight plan data enhances the completeness of the log record, allowing for more precise post-flight analysis.

After data collection is completed, the system sends a notification to the pilot, shown in block 20, indicating that the flight log has been generated and is ready for validation. The validation process, represented in block 22, cross-references the captured data with expected flight parameters, ensuring accuracy and completeness. If any discrepancies are found, such as deviations from the flight plan or unexpected altitude changes, the system logs these issues as exceptions in block 24, allowing for further review and correction if necessary.

Once the data has been validated, the system stores the flight log record in an immutable blockchain ledger, depicted in block 16. This ensures the long-term security and integrity of the flight log, preventing unauthorized modifications and ensuring that the data is available for auditing, regulatory compliance, and post-flight investigations. The blockchain storage system guarantees that the recorded data is tamper-proof, offering a secure and reliable method for maintaining pilot logbooks and other flight-related records.

Figure 2:
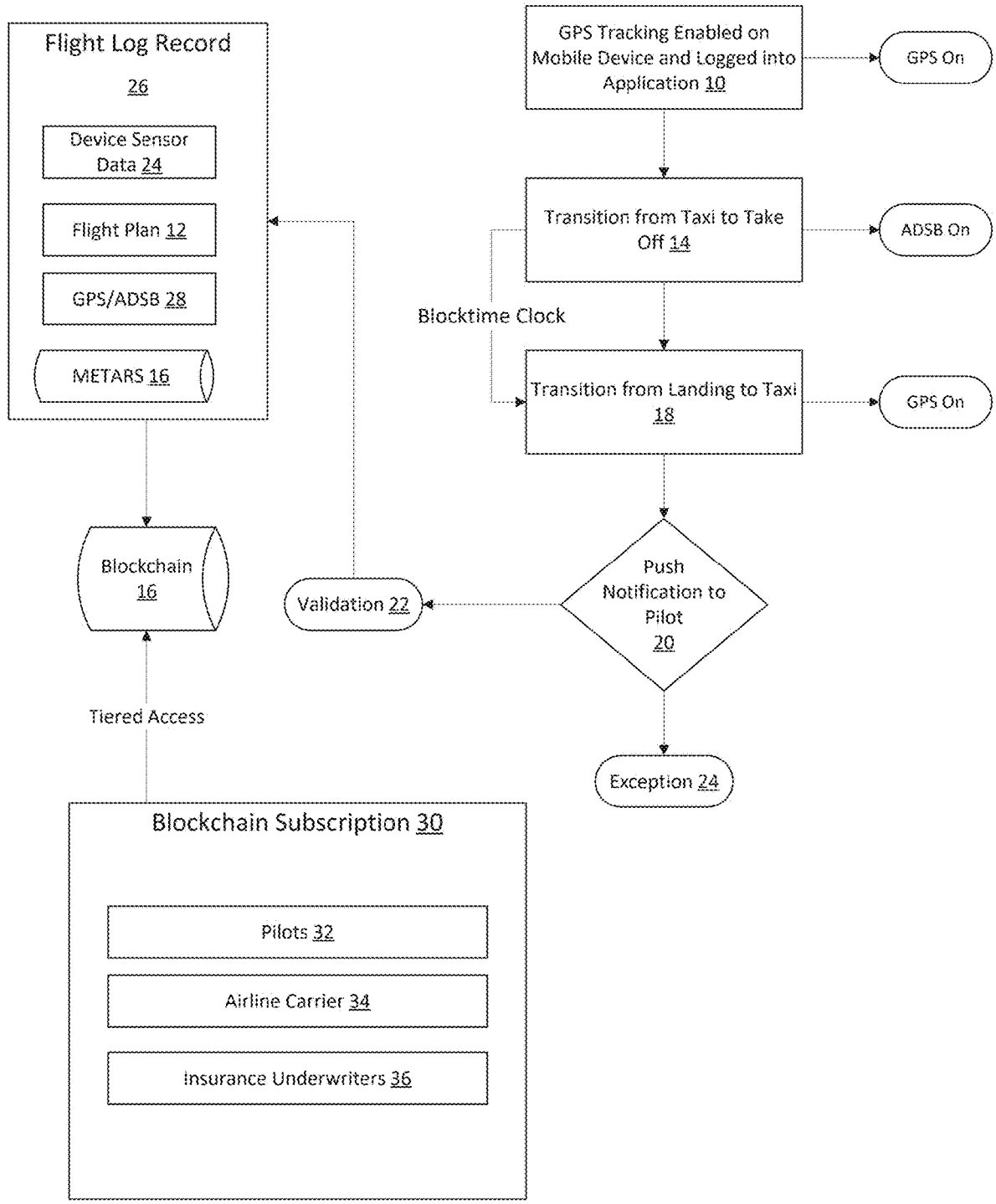
FIG. 2 is a flow chart process further enumerating a subscription to the blockchain ledger.

In FIG. 2, the process mirrors that of FIG. 1, but introduces the concept of a blockchain subscription in block 30, allowing different stakeholders to access the securely stored flight data. The blockchain serves as an immutable ledger for the flight log record in block 26, ensuring that the data is tamper-proof and verifiable. This tiered access model ensures that different groups—pilots at block 32, airline carriers at block 34, and insurance underwriters at block 36—can access the data relevant to their roles, while maintaining security and privacy. The system grants different levels of access based on the subscription level, ensuring that confidential or proprietary information is protected.

The pilots (block 32) can access their own flight records for verification, compliance, and regulatory reporting. This ensures that they have a reliable and immutable log of their flight history, which can be used for personal or regulatory purposes, such as maintaining accurate logbooks or verifying qualifications. Airline carriers (block 34) have access to aggregated data on flight performance and operational metrics for their fleet. This data can be used for internal audits, compliance with aviation regulations, and performance monitoring. The data provided to carriers is essential for tracking fleet utilization, verifying pilot performance, and conducting operational analyses.

Insurance Underwriting

Insurance underwriters, such as those represented in block 36, rely on accurate, real-time data to assess the risk associated with insuring aircraft. This data includes details about operational safety, pilot performance, aircraft maintenance, and any recorded anomalies during flight. Having verifiable data from systems such as the flight log and performance monitoring allows underwriters to accurately determine the risk profile of each aircraft and adjust insurance premiums accordingly.

Oversight is critical in the aviation industry because the cost of insuring airliners is substantial, often ranging from hundreds of thousands to millions of dollars per aircraft, depending on its value, operational history, and the safety record of the pilots and airline. For example, the annual premium for a typical commercial airliner can be in the range of $200,000 to $500,000, but this cost can increase significantly for high-risk operations or airlines with a history of incidents. Factors such as the aircraft's age, the routes it operates on, and historical safety data heavily influence insurance premiums.

When an aircraft is involved in an accident or incurs operational damage, insurance claims can be extremely costly. For example, hull insurance, which covers damage to the aircraft itself, might result in claims totaling tens of millions of dollars for a single incident. Liability insurance, which covers damages to passengers, third parties, or property, can push potential claim costs even higher, depending on the severity of the incident. Comprehensive data that tracks the aircraft's adherence to safety protocols, as recorded in the system, enables underwriters to minimize risks by adjusting coverage and premiums according to well-founded data rather than estimates or historical trends alone.

In some cases, data on flight operations and pilot compliance with ATC instructions can be used to lower premiums, as underwriters can assess that an aircraft operating under optimal conditions presents a lower risk. On the other hand, if repeated deviations or exceptions are logged by the system, insurers may increase premiums or adjust coverage to reflect the higher perceived risk.

This system allows insurance underwriters to adopt a more dynamic approach to aviation insurance, where premiums can be adjusted based on real-time operational data. This not only benefits the insurance companies but also the airlines, which can potentially lower their premiums by adhering to strict safety protocols, maintaining their aircraft properly, and ensuring that pilots are fully qualified for each flight. The tiered access provided by the blockchain subscription system enables insurers to securely access the data they need, while protecting sensitive information that is not relevant to their risk assessments.

Figure 3:
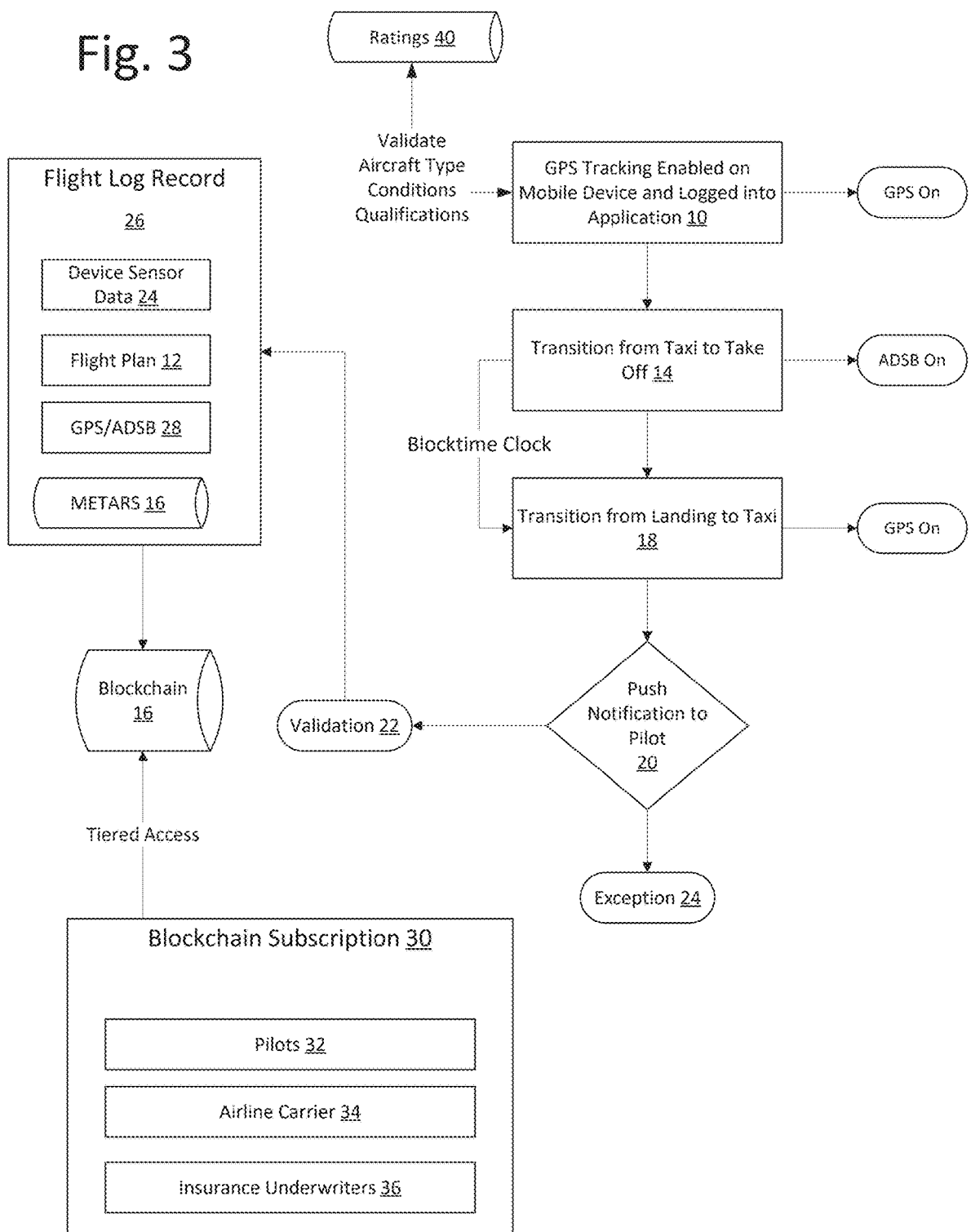
FIG. 3 is a flow chart process further enumerating a rating validation check for pilot qualifications.

In FIG. 3, the system enhances the flight logging process by incorporating pilot qualification validation, as shown in block 40. This validation is critical to ensure that pilots have the necessary qualifications for the aircraft type and conditions under which they are flying. Pilot certifications vary widely depending on the complexity and size of the aircraft. For example, a pilot flying a small regional aircraft, such as a Bombardier CRJ200, may require a Commercial Pilot License (CPL) with a multi-engine rating, whereas a pilot flying a large, heavy aircraft like the Boeing 777 must hold an Airline Transport Pilot (ATP) certificate, which is the highest level of certification in civil aviation.

To achieve an ATP certification for a heavy jet like the Boeing 777, a pilot typically requires at least 1,500 flight hours, including significant time in multi-engine, instrument-rated aircraft. In contrast, pilots flying smaller aircraft may only need around 250 hours for a commercial license, though additional time will be required for multi-engine ratings or instrument ratings. The system in block 40 ensures that a pilot's ratings and qualifications are cross-referenced against the specific aircraft type, flight conditions, and operational environment, validating the appropriateness of their certifications. For instance, it verifies whether the pilot is authorized to fly under Instrument Flight Rules (IFR) conditions or Visual Flight Rules (VFR), or whether they are certified to fly at night or in challenging weather conditions.

The system continuously checks whether the pilot meets the training requirements for specific aircraft types. For example, pilots of large aircraft like the Boeing 777 must complete specialized training programs, including type-specific simulators and recurrent training sessions. These programs may take weeks to complete and require pilots to demonstrate proficiency in handling emergency situations, complex systems, and high-altitude operations. The system also ensures that pilots have undergone the necessary recurrent training, which typically occurs every 6 to 12 months, depending on the regulations of the specific airline or regulatory authority.

In the event of a discrepancy, where the pilot's qualifications do not meet the necessary standards for the recorded flight conditions, the system flags the issue for review. This is critical for compliance and safety, ensuring that pilots operate within their certified limits. For example, if a pilot who is only certified for VFR conditions is found flying in IFR weather, the system will immediately detect this inconsistency and alert the airline or regulatory authority for corrective actions.

Additionally, the system tracks the type of aircraft rating required for different categories of aircraft. For example, regional jets like the Embraer E175 require a type rating specific to that model, while larger aircraft like the Boeing 777 or Airbus A380 require separate and highly specialized type ratings, typically requiring 40 to 50 hours of simulator time and rigorous evaluations by a certified examiner. These ratings are specific to each aircraft and must be validated every time a pilot operates an aircraft within that category.

By integrating these checks into the flight logging system, the invention ensures real-time validation of pilot qualifications, preventing unauthorized flights and providing an additional layer of operational safety. This system is particularly valuable to airlines and regulatory authorities, as it provides a reliable mechanism to ensure that all flight operations comply with the stringent safety and certification standards required in commercial aviation. The automatic cross-referencing of pilot qualifications against aircraft type and conditions enhances compliance efforts and helps to maintain the highest safety standards within the aviation industry.

Figure 4:
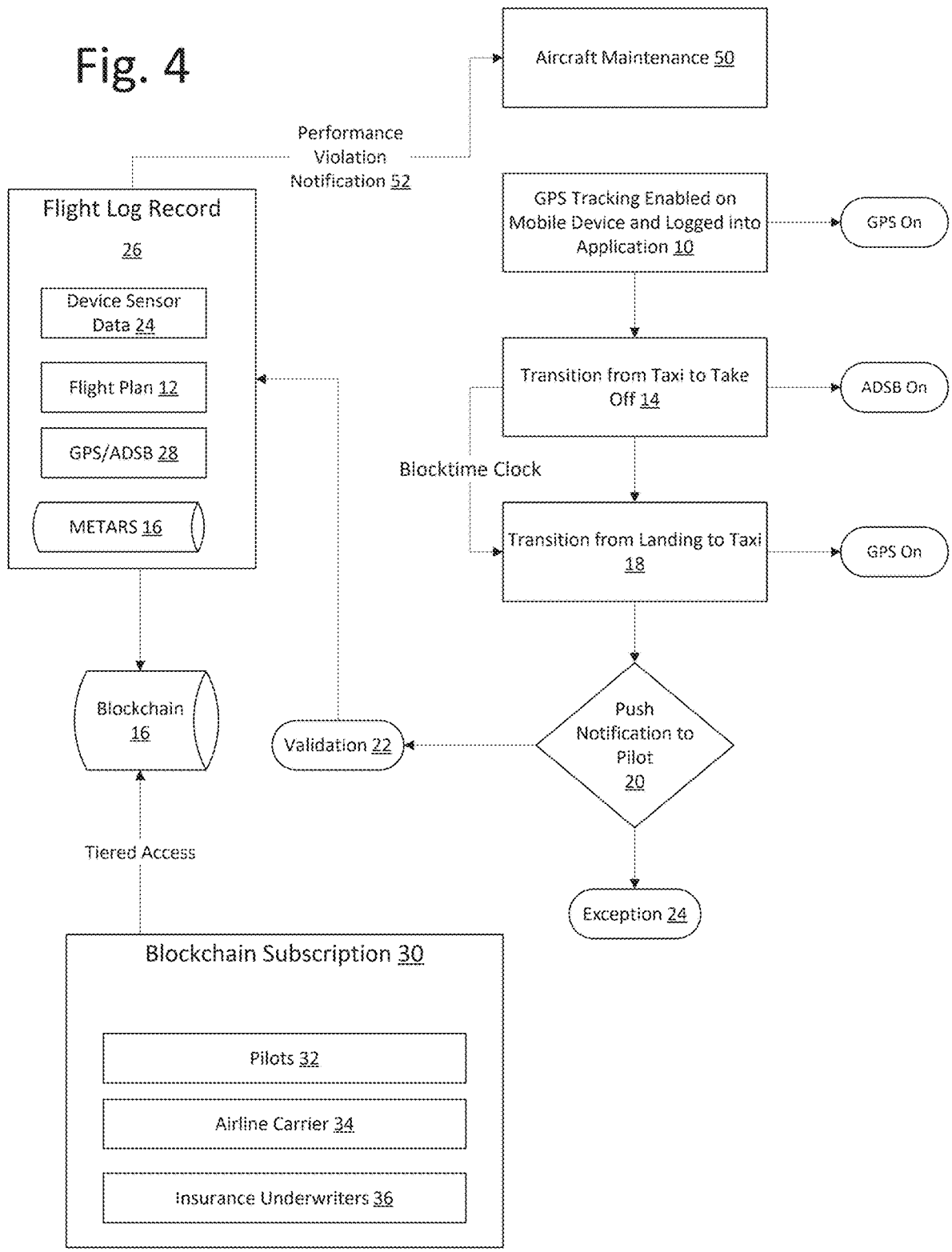
FIG. 4 is a flow chart process further enumerating a performance violation notification sent to aircraft maintenance based on the flight log record exceeding threshold values.

In FIG. 4, the system introduces a robust functionality by integrating aircraft performance monitoring and maintenance scheduling, which can be applied to both large commercial airliners and smaller general aviation aircraft. In block 50, the system tracks key performance metrics, including landing forces, G-forces, and deviations from flight norms. When any performance violations are detected—such as hard landings or excessive G-forces—the system logs the event in block 52 and automatically schedules a maintenance inspection to ensure the aircraft remains in optimal condition.

For large commercial aircraft, such as the Boeing 777, a hard landing is typically defined by a landing force exceeding 2.3 g. For a Boeing 737, the hard landing threshold is slightly lower, at 2.1 g. When these thresholds are surpassed, the system will immediately trigger a maintenance flag, prompting inspections of critical components such as the landing gear, fuselage, and wing structures. For such large aircraft, hard landings may lead to significant structural stress, including microfractures that could escalate into more serious issues if not addressed in a timely manner. As a result, these aircraft are often temporarily removed from service for inspections, typically requiring several hours or up to a day, depending on the severity of the violation and the depth of inspection required. Ensuring that hard landings are flagged and handled promptly is essential in commercial aviation, where the safety of hundreds of passengers and the financial implications of delayed flights or accidents are at stake.

Exceeding G-force limits during flight is another critical performance metric monitored by the system. For large commercial aircraft, standard operational limits typically range between +2.5 g to −1.0 g. If an aircraft exceeds these limits due to turbulent weather or aggressive maneuvers, the system logs this as a performance violation and schedules an inspection to assess potential structural damage. Components such as the wings, control surfaces, and fuselage are particularly susceptible to G-force-related stress, and immediate inspection can prevent long-term damage or catastrophic failure.

This proactive performance monitoring and maintenance scheduling have significant benefits for airline operations, especially with large aircraft where the cost of repairs and the risks of undetected damage can be immense. For instance, a single unaddressed structural flaw could lead to increased stress on an aircraft during future flights, raising the potential for more serious damage that could result in costly repairs or, in the worst-case scenario, an in-flight emergency. The ability to address these issues before they become major safety risks contributes to the overall reliability of the fleet and enhances safety for passengers and crew.

For smaller aircraft operations, such as those involving a Cessna 172 used in flight schools, the system can utilize a mobile device (e.g., smartphone or tablet) to track flight performance and log critical data. In smaller aircraft, hard landing thresholds are lower. For instance, in the Cessna 172, a hard landing is typically characterized by a vertical descent rate exceeding 600 feet per minute. This system's use of mobile devices to monitor landing forces and other flight metrics provides an affordable and portable alternative to installing expensive avionics systems, making advanced safety monitoring accessible for general aviation aircraft and flight schools. By detecting hard landings or excessive G-forces, the system prompts maintenance inspections for small aircraft in the same way it does for larger jets, ensuring safety without the need for advanced onboard systems.

For flight schools, the system offers additional advantages by providing detailed feedback on student pilot performance. Repeated hard landings or exceeded G-force limits can trigger performance notifications that instructors can use to adjust training programs, ensuring that students improve their technique. For instance, if a student frequently lands too hard, instructors can focus on refining approach and landing techniques to prevent further issues. Additionally, the system's ability to flag aircraft for inspections after such violations ensures that training aircraft remain in safe, operable condition, reducing the risk of accidents due to unnoticed damage.

The preemptive maintenance scheduling capabilities of the system offer significant value in both commercial and general aviation. In large commercial fleets, reducing unplanned downtime is essential for maintaining profitability. Aircraft that are grounded unexpectedly for repairs can lead to costly delays, missed flights, and lost revenue. By utilizing performance data to schedule maintenance only when necessary, based on actual operational data rather than arbitrary intervals, airlines can reduce unnecessary inspections and keep their fleets operational for longer periods. For example, a Boeing 777 flagged for a hard landing might require just a short downtime period for a focused inspection, rather than a more intrusive inspection that could sideline the aircraft for an extended period.

In smaller aircraft operations, such as those in flight schools, preemptive maintenance ensures that the fleet remains safe and operational without subjecting the aircraft to unnecessary repairs that might increase costs. The system allows flight schools to address only the necessary issues when they arise, optimizing both safety and operational readiness. This is particularly important in smaller operations where margins are tighter, and minimizing downtime can directly impact the school's financial health.

The value of real-time performance monitoring extends beyond reducing maintenance costs. For both large and small aircraft, maintaining high levels of safety through preemptive maintenance also provides long-term benefits for insurance underwriting. By presenting verifiable data on aircraft performance and maintenance history, airlines, flight schools, and general aviation operators can potentially reduce their insurance premiums. Insurance underwriters prefer operations where proactive safety measures are in place, as this lowers the risk of accidents or mechanical failures. For example, an airline that consistently addresses hard landings or G-force violations through timely inspections and repairs is less likely to experience costly insurance claims, which in turn makes them a lower-risk client for insurers.

Additionally, the system benefits regulatory compliance efforts by providing detailed records of performance violations and subsequent maintenance actions. This data can be used for audits or to demonstrate compliance with aviation safety standards, reducing the administrative burden for both airlines and general aviation operators. For flight schools, detailed logs of student pilot performance and aircraft maintenance ensure that they can demonstrate adherence to safety protocols, which is especially important when working with new pilots who are still learning the intricacies of safe flight operations.

The integration of performance monitoring with preemptive maintenance scheduling is a key differentiator for this system, as it enhances both the safety and efficiency of aircraft operations. Whether it is a Boeing 777 experiencing a hard landing or a Cessna 172 used by a student pilot exceeding G-force thresholds during flight, the system ensures that potential safety issues are flagged and addressed before they lead to larger problems. By reducing the likelihood of undetected damage, the system helps operators maintain a high level of operational readiness, improve overall safety, and minimize costs associated with downtime or unplanned repairs.

Figure 5:
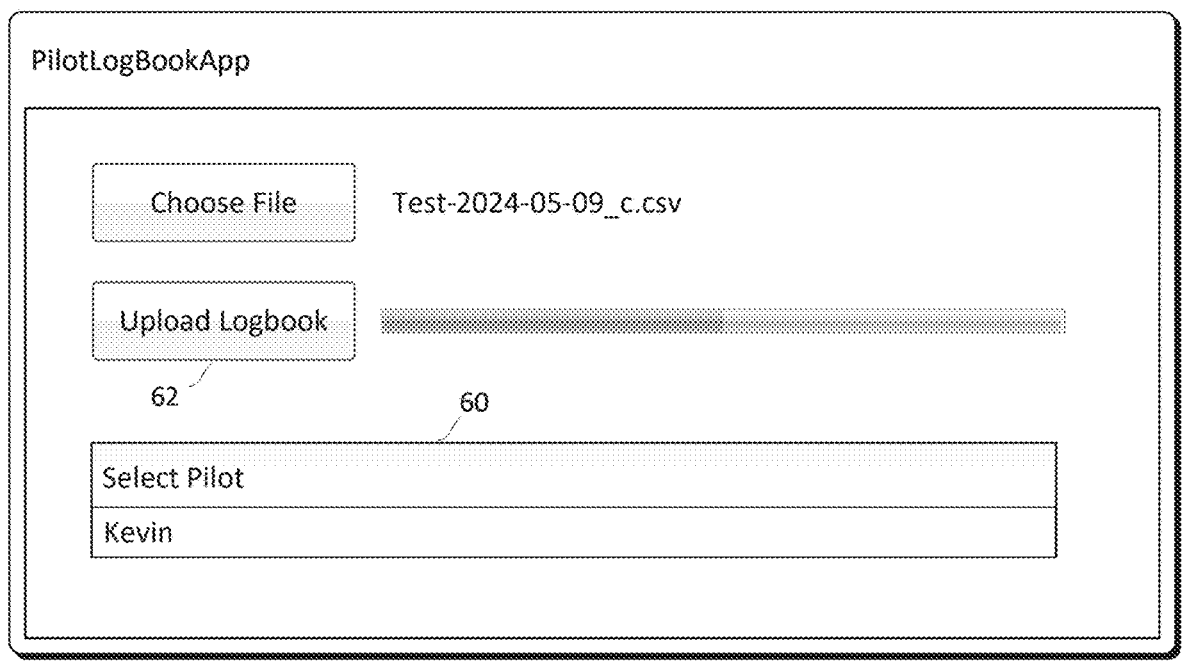
FIG. 5 shows prototype GUIs for importing pilot flight records.

In FIG. 5, interfaces for another embodiment of the invention are provided. A pilot is selected at block 60, and a comma-separated-value (CSV) file of the pilot's logbook is uploaded at block 62. This interface allows users to efficiently upload and manage flight data.

In FIG. 6, the GUI at block 64 displays the pilot-uploaded records, which are to be audited against a third-party, extrinsic source. This display provides a clear and organized view of the recorded information, facilitating the auditing process.

FIG. 7 shows the enumerated pilot data at block 66 in JSON format, which is used for auditing. This format allows for seamless integration and processing of external data sources, ensuring that all relevant flight data is accurately captured and incorporated into the logbook. The ident ("N992MG") refers to the aircraft's registration number, while ident_icao and ident_iata (both null here) would represent standardized aircraft identification codes if available. The actual_runway_off ("29") and actual_runway_on ("25") represent the runway numbers the aircraft used for takeoff and landing, respectively. fa_flight_id is a unique identifier assigned to the flight, incorporating a timestamp. The origin_code and destination_code fields use the ICAO and IATA codes to denote the departure airport (KPWM for Portland Intl Jetport) and destination (KSBA for Santa Barbara Muni). The origin_name, origin_city, destination_name, and destination_city provide further detail on the departure and arrival locations. Departure_delay and arrival_delay show delays in seconds (4607 and 4787), indicating how much time the flight was delayed. The filed_ete (19680) refers to the estimated time en route in seconds (about 5.5 hours). Fields like codeshares and codeshares_iata (empty here) would normally list codeshare flight numbers. The blocked, diverted, cancelled, and position_only fields confirm whether the flight experienced operational issues, such as blocking, diversions, or cancellations (all false).

In FIG. 8, the selection at 68 illustrates the fields being chosen to cross-reference third-party flight data, such as from FLIGHTWARE, with a pilot's digital logbook entries. This selection enables a detailed comparison and validation of flight records. FlightAware is a widely used provider of real-time and historical flight tracking data, leveraging Automatic Dependent Surveillance-Broadcast (ADS-B) technology to collect key flight information such as aircraft position, altitude, speed, and flight path. The company's AeroAPI is a RESTful API that allows third-party systems, including aviation applications, to access detailed flight information from a variety of data sources, including ground-based ADS-B receivers and space-based ADS-B systems through partnerships like Aireon.

In the context of the present invention, FlightAware's AeroAPI can be used to retrieve both real-time and historical ADS-B data to cross-reference with pilot logbooks and verify flight operations. The ADS-B data includes flight status, aircraft position updates, and operational details such as takeoff and landing times. By integrating AeroAPI into the system, the invention can automatically correlate this external data with a pilot's recorded logbook entries, ensuring consistency between the actual flight data and the logbook records.

A key functionality provided by AeroAPI that is relevant to the present invention is its ability to provide historical flight data for a specific aircraft. This allows for post-flight analysis and validation, confirming that the logged details, such as flight path, altitude, and departure/arrival times, match the actual flight data recorded through ADS-B.

The AeroAPI also supports real-time tracking, which could enable the system to monitor ongoing flights and flag any deviations from expected flight operations. This capability allows the invention to provide real-time alerts if there is a discrepancy between what was planned (or logged) and what is being observed through the ADS-B data, enhancing safety and ensuring the accuracy of the logbook.

For instance, ident, registration, and actual_runway_on fields allow the system to verify aircraft registration and match runway usage with logbook data. Fields like logbook_origin, logbook_total_time, and logbook_timeoff help cross-check takeoff times, origin, and total flight duration. Performance-related metrics, such as logbook_night_landings_full_stop, logbook_night_takeoffs, and logbook_actual_instrument, allow the system to validate specific operational conditions logged by the pilot.

Additional fields like logbook_pic, logbook_sic, and logbook_cross_country provide further insight into crew roles and flight types, ensuring that detailed operational data is correctly captured and compared against third-party records. The inclusion of fields such as logbook_instructor_name and logbook_instructor_comments is crucial for flight training operations, validating student progress and instructor feedback in pilot development programs.

Finally, timing fields such as calculated_api_total_time and calculated_time_delta allow the system to automatically calculate any discrepancies between the third-party data and the pilot's logbook, ensuring that flight records are accurate, verifiable, and compliant with aviation regulations.

In FIG. 9, the graphic user interface (GUI) represents a system for cross-referencing and validating flight logbook entries using external ADS-B data. The various fields and elements within the interface are designed to facilitate the comparison between the pilot's self-reported flight times and the actual times derived from ADS-B data retrieved via an external API. The field labeled 72 represents the pilot name, identifying the individual whose logbook is being cross-referenced with external data. This allows for a clear association between the pilot's records and the data being validated.

The 74 field corresponds to the reported time from the pilot's logbook, which is the duration or timestamp manually entered by the pilot, typically reflecting their recorded flight time from takeoff to landing. This field displays the logbook entry that the pilot has entered for the specific flight being validated. The 76 field shows the validated time from the ADS-B data, which is the actual time calculated using external ADS-B information. ADS-B data includes precise timestamps such as actual_off (the time the aircraft physically left the ground) and actual_on (the time the aircraft touched down), providing an objective measure of flight duration. The system uses this information to calculate the actual flight time, eliminating any discrepancies that may result from manual logbook entry errors.

The 78 field displays the delta between the reported and validated time, which represents the difference between the pilot's manually recorded time and the time derived from ADS-B data. This value highlights any discrepancies between the two, providing a clear indication of potential errors in the manual logbook entry. A positive delta may indicate that the pilot reported more time than was actually flown, while a negative delta could suggest the pilot under-reported the time.

The 80 field introduces a custom calculation, showing the validation as a percentage of reported over validated time. This percentage gives a quick visual representation of how accurate the pilot's reported logbook time is in comparison to the validated ADS-B time. A percentage closer to 100% indicates high accuracy, while values significantly above or below 100% suggest discrepancies.

On the left side of the interface, the panel labeled 70 displays logbooks found in the API ADS-B data, which shows a list of available flight records retrieved from the ADS-B data source. This provides the user with an overview of flights that match or are relevant to the pilot's logbook entries, offering a mechanism to cross-reference multiple flights at once. This list is populated with logbook data identified through external API calls and is displayed in a structured manner, showing key flight details such as the origin airport (origin_code) and destination airport (destination_code) in ICAO or IATA format, helping to identify the flight.

Logbooks 1233 and 4421 represent specific matching logbooks. The first matching logbook and the second matching logbook each display individual flights identified from the ADS-B data that match the logbook entry being validated. These fields allow for the comparison of multiple potential matches, in cases where more than one flight might fit the criteria for validation, or in cases where flights overlap in time. The matching logbooks are evaluated based on criteria such as the actual_off (the time the aircraft departs the runway) and actual_on (the time the aircraft lands), the origin and destination airport codes (such as KJFK for John F. Kennedy International Airport or KLAX for Los Angeles International Airport), and the associated timestamps.

This system and GUI provide a systematic approach to ensuring the accuracy of pilot logbook entries by leveraging objective ADS-B data. The interface enables real-time validation, cross-referencing external flight data against a pilot's manual records to ensure compliance with regulatory requirements, enhance record-keeping accuracy, and identify any discrepancies between reported and actual flight times. By presenting both the reported and validated times alongside calculated discrepancies, the system offers a transparent mechanism for flight validation, critical for pilot logbook audits, insurance verification, and operational compliance.

In FIG. 10, panel 71 displays a list of "Missed Logbooks," which are entries reported by the pilot but cannot be matched to historical ADS-B data retrieved from the API. This suggests that these flight entries were either not captured by the ADS-B system or there were discrepancies that prevented the system from aligning them. The system presents nine logbook entries, each displaying the Aircraft ID, Origin, Destination, Date, Time Off, Time On, Total Time, and whether the ADS-B data is blocked.

For Logbook 3557, the Aircraft ID is listed as N992MG. The origin airport is KSUN, which corresponds to Friedman Memorial Airport. The destination field is omitted, meaning there is a null value. The date of the flight is recorded as 2022-09-23, but both the Time Off and Time On fields are null, indicating that the takeoff and landing times were not recorded in the pilot's logbook. The Total Time for the flight is listed as 0 hours, and the Is Blocked field is marked as false, meaning that the ADS-B data for this flight is not blocked but still does not match any known ADS-B records.

Logbook 9247 shows another entry with Aircraft ID N992MG. The origin airport is KAVL, which stands for Asheville Regional Airport, and the destination is KMSO, Missoula International Airport. The date of the flight is again 2022-09-23. This entry provides more detailed time information, with the Time Off listed as 16:49:00 and Time On as 20:36:00, indicating a flight duration of 4 hours. The Is Blocked field is marked as false, which means the flight's ADS-B data should be available, but no matching ADS-B record was retrieved from the API.

In Logbook 3217, the Aircraft ID is once again N992MG. The origin is KAVL (Asheville Regional Airport), and the destination is KMSO (Missoula International Airport). The date is recorded as 2022-09-23, but both the Time Off and Time On fields are missing (null values), suggesting that the logbook entry lacks detailed time data. The Total Time is listed as 0 hours, and the Is Blocked field is set to false, indicating that the ADS-B data is not blocked.

Similarly, Logbook 7752 shows Aircraft ID N992MG with an origin of KAVL (Asheville Regional Airport) and a destination of KMSO (Missoula International Airport). The date is again 2022-09-23, but there are null values for both Time Off and Time On, leading to a Total Time of 0 hours. The Is Blocked field is marked as false, meaning the ADS-B data is not restricted but could not be matched.

Logbook 1277 introduces a different Aircraft ID, N992GH. The origin airport is KOPF, Opa-locka Executive Airport, and the destination is also KOPF, indicating that this was a local flight within the same airport. The date is listed as 2022-08-26, and the Total Time is recorded as 0.8 hours. The Is Blocked field is marked as false, so there is no restriction on accessing the ADS-B data, though no matching ADS-B record was found.

In Logbook 4343, the Aircraft ID is again N992GH. The origin is KPHX, Phoenix Sky Harbor International Airport, and the destination is KPHX, implying another local flight. The date is 2022-08-02, and the Total Time is recorded as 5 hours. The Is Blocked field is set to false.

Logbook 2733 shows Aircraft ID N992GH, with an origin of KBVY, Beverly Regional Airport, and a destination of KTEB, Teterboro Airport. The date is 2022-07-20, and the Total Time is 1.3 hours. The Is Blocked field is false.

For Logbook 8333, the Aircraft ID is N75B, originating from KDAL, Dallas Love Field, and the destination is KTYS, McGhee Tyson Airport. The date of the flight is 2024-03-13, and the Total Time is listed as 1.6 hours. The Is Blocked field is marked true, meaning that this flight's ADS-B data has been intentionally blocked, likely due to privacy concerns or operator restrictions, which may explain why the ADS-B record could not be found.

Finally, Logbook 3458 lists Aircraft ID N474ME, with an origin of KJYO, Leesburg Executive Airport, and a destination of KORL, Orlando Executive Airport. The date is 2023-05-20, with Time Off recorded as 15:12:00 and Time On as 17:00:00, resulting in a Total Time of 2 hours. The Is Blocked field is true, meaning the ADS-B data for this flight is restricted, preventing a match from being made with the pilot's logbook entry.

The Is Blocked field indicates whether the aircraft's ADS-B data has been restricted from public viewing, which can occur for privacy reasons or at the request of the aircraft owner or operator. When the data is blocked, it becomes inaccessible via standard ADS-B tracking systems.

Turning now to FIG. 11, the flowchart depicts a computer-implemented method for generating a continuous transcription of an aircraft's communications. The system is designed to handle both real-time voice communications during live flight operations and pre-recorded audio from archived flight data, allowing for real-time monitoring or post-flight validation. The process begins at 82, where the system receives a digital stream or binary file containing two-way communications between ATC and the aircraft. These communications could either be from a live connection during the flight or retrieved from previously recorded flight archives for review. The digital file serves as the basis for processing the audio and validating flight operations, whether the aircraft is currently in the air or the flight occurred in the past.

At 84, the system converts the voice communications into text using a speech-to-text engine that has been trained on aviation-specific phraseology. The engine is designed to handle the complexities of ATC communication, ensuring accuracy in transcription even in cases where the language used is highly technical. This speech-to-text conversion can be performed in real-time during live communications, or it can process pre-recorded audio from flight logs and archives to transcribe past communications for validation purposes.

Following the transcription, the system moves to 86, where it detects transitions between different radio frequencies by identifying instructions to switch frequencies, as well as verbal acknowledgments from the pilot confirming the change. This step is critical, especially during handoffs between different air traffic sectors. At 88, the system checks for the detection of these transitions. If a transition is detected, the system proceeds to 90, where the specific frequency-switching instructions and acknowledgments are processed to ensure the proper handoff of communication between ATC and the aircraft.

Next, at 92, the system stitches together the communications from multiple radio frequencies to ensure a continuous and cohesive communication thread. This step is important both in real-time flight operations, where communications may be segmented as the aircraft moves through different airspace regions, and for archived audio, where the same frequency transitions need to be captured and pieced together to reconstruct a full communication history. The stitching process includes overlap handling, ensuring that any discrepancies in the timing of frequency switches are accounted for, maintaining the integrity of the communication thread. This provides a complete narrative of the flight, particularly during crucial phases like takeoff, landing, and transitions through controlled airspace.

At 94, the system correlates the transcribed communications with ADS-B data. The ADS-B data provides critical information about the aircraft's real-time operational metrics, including position, altitude, heading, and speed.

Whether the data is processed in real-time during the flight or afterward using archived data, the correlation ensures that the system can cross-check the instructions given by ATC with the aircraft's actual movements. For example, when ATC instructs the pilot to ascend or descend to a specific altitude, the system checks the corresponding ADS-B data to verify whether the aircraft followed the instructions. Timecode metadata is used to synchronize the communications with the aircraft's operational metrics, providing an accurate timeline of events.

The final step at 96 involves generating a digital file that contains the continuous transcription of the communications and the correlated ADS-B data. This file is generated regardless of whether the system is processing live data or archived data from past flights. The file preserves timecode metadata for both the transcription and the ADS-B data, ensuring that all elements of the communication and flight data are accurately recorded and can be referenced later. The digital file can be used for compliance verification, training, post-flight analysis, or accident investigations. Additionally, the file can be securely stored using various technologies, such as blockchain, to ensure the integrity and immutability of the data.

The process concludes at 98, where the generation of the digital file marks the finalization of the data correlation. In both real-time and post-flight contexts, this digital file provides a comprehensive view of the flight, capturing both the communication between ATC and the aircraft and the aircraft's corresponding operational behavior.

Turning now to FIG. 12, the interaction between Tampa Tower 100 and Delta 1234 102 is depicted, showing the communication exchanges that occur during the aircraft's takeoff and ascent phases. The ATC at Tampa Tower initially communicates with Delta 1234 on frequency 119.50, as shown in the communication at 104, instructing the aircraft to take off from runway 19L, climb to 5,000 feet, and contact Departure on 119.90. The ATC instructions are critical for the initial phase of flight and must be acknowledged by the pilot to ensure proper coordination.

At 106, Delta 1234 acknowledges the instructions by repeating the key directives. This is a standard requirement in ATC communications, where the pilot must confirm the instructions, including the clearance for takeoff, altitude assignment, and frequency change. This acknowledgment is critical in confirming the pilot's understanding and intent to follow the instructions. Both communications are logged in the system and analyzed by the speech-to-text processing engine to verify the consistency between the ATC's instructions and the pilot's acknowledgment.

Upon completion of the acknowledgment, the system detects the frequency change as shown by 108, where the aircraft transitions from 119.50 to 119.90. This step is necessary for maintaining the continuous flow of communication as the aircraft leaves the control of Tampa Tower and is handed over to Departure control. In the context of the invention, this handoff between frequencies is detected and stitched together within the communication transcript, ensuring that the communications between the ATC and Delta 1234 remain uninterrupted.

On 119.90, as shown in 110, Departure issues further instructions to Delta 1234, instructing the aircraft to climb and maintain flight level (FL) 180 and turn to a heading of 110 degrees. Additionally, the ATC at Departure informs the aircraft to switch to the Miami Center frequency 132.45 for further communications. These instructions cover the critical aspects of flight beyond the initial takeoff phase, guiding the aircraft into its enroute portion. The system again logs the communication, verifying that the pilot has received the directives.

At 114, Delta 1234 acknowledges the climb to FL 180, the heading adjustment to 110 degrees, and the further frequency change to 132.45. This acknowledgment is crucial as it indicates the pilot's intent to comply with the new altitude, heading, and frequency instructions. Like the previous acknowledgment, the system processes this communication and cross-references it with the instructions received from Departure control.

The system subsequently detects the second frequency transition at 116, where the aircraft moves from 119.90 to 132.45, as instructed by the Departure ATC. The system ensures that this second transition is correctly recorded and linked to the previous communications to maintain the continuity of the ATC communications with the aircraft. The process continues, as represented by 118, which indicates that further communication exchanges, frequency changes, and operational directives between ATC and Delta 1234 will be similarly handled throughout the remainder of the flight.

In FIG. 13, the JSON output structure is used to map ATC and pilot communications to ADS-B data in a machine-readable format. This JSON is designed to facilitate a logic engine that cross-references verbal ATC-pilot communications with real-time aircraft actions, helping ensure alignment between instructions and performance.

The Tampa Tower (ATC), designated by its frequency 119.50, begins communication at UTC 14:30:00. The ATC instructs Delta 1234 to take off from runway 19L, climb to an altitude of 5,000 feet, and switch frequencies to 119.90 to contact Tampa Departure. These instructions are parsed into the JSON with distinct key-value pairs for "runway", "altitude", and "handoff" (indicating the next communication frequency and entity). The "clearance" node within the "instructions" hierarchy contains the directive "cleared for takeoff", and another node tracks the details of the upcoming handoff to 119.90. These structured data elements allow the system to isolate different aspects of the ATC's communication for independent verification against the ADS-B data.

The pilot's acknowledgment, timestamped three seconds later at 14:30:08 UTC, repeats the instructions verbatim, confirming they were received and understood. The "pilot" node captures this response, including the "callsign" "Delta 1234", ensuring the response matches the aircraft that received the initial instructions. The time difference between the end of the ATC transmission and the pilot's acknowledgment is within an acceptable 0-10 second window for communication validation, a key part of verifying that the exchange is relevant and in context.

To validate these communications, the ADS-B data provides real-time information about the aircraft's status. The "adsb" node includes fields for the aircraft's identifier ("icao24": "A4F45B", corresponding to the tail number "N1234D"), along with "position", "altitude", and "groundspeed". For this particular moment, the altitude is logged as "0", confirming that the aircraft is still on the runway preparing for takeoff, while the groundspeed of "15" knots indicates slow movement, likely taxiing on the runway. The "latitude" and "longitude" are mapped to Tampa International Airport (IATA code "TPA"), further aligning the ADS-B data with the ATC instructions.

The JSON structure includes the "timestamp" for each key event: ATC communication, pilot acknowledgment, and ADS-B status report. These synchronized timestamps ensure that every action and communication is aligned temporally, providing an exact correlation between what the ATC instructs, how the pilot responds, and what the aircraft is doing. This time-coded structure enables precise comparisons to detect any deviations in pilot performance or communication misalignment. For instance, if the ADS-B data showed an unexpected altitude or groundspeed during the instruction to remain on the runway, the system would flag this as a potential issue.

In this case, no discrepancies are found: the ADS-B data confirms that the aircraft is correctly positioned on the runway, maintaining the appropriate groundspeed for taxiing, with no altitude (indicating it has not yet taken off). Additionally, the "handoff" node in the JSON provides clear details about the next frequency switch to 119.90, where Tampa Departure will take over communication. This smooth transition is reflected both in the JSON structure and in the verbal communication between ATC and pilot.

The logic engine uses this JSON output to verify that instructions were followed correctly. For example, the engine checks that the pilot switched to the appropriate frequency within the expected time window, using both the "handoff" node and the subsequent "adsb" data to ensure that the altitude, speed, and heading changes align with ATC instructions. If any discrepancies are detected—such as the aircraft failing to climb to the instructed altitude of 5,000 feet—the system flags these for review, providing actionable data for real-time operational corrections or post-flight analysis.

Conforming Communications to Structured Data

To effectively process variations in the language used during ATC communications and map those instructions to ADS-B data, it is necessary to employ advanced natural language processing (NLP) models that are capable of recognizing the diversity in how ATC instructions are conveyed. Despite variances in phrasing, the core instructions issued by ATC must always be distilled into structured data fields, which can then be cross-referenced with real-time or historical ADS-B data for validation.

One of the fundamental challenges in processing ATC communications is the variability in how commands are delivered. For example, the instruction to climb to a specific altitude can be phrased in multiple ways: "Climb and maintain 5,000 feet," "Maintain five thousand," or "Ascend to five thousand." These variations are all semantically equivalent but differ syntactically. This requires training a model to recognize different language patterns while extracting the same underlying data, such as the assigned altitude. NLP tools such as spaCy, BERT, or OpenAI's GPT can be employed for this purpose. These tools are trained on large datasets of ATC communications, allowing them to detect common aviation phraseology and map it to structured fields.

Once verbal instructions are processed by the NLP model, they are converted into a structured format. For example, "Climb and maintain 5,000 feet" would be converted into the following JSON structure:

```
{
  "command": "climb",
  "altitude": 5000,
  "unit": "feet"
}
```

The system also needs to account for the possibility of errors in transcription or recognition, which can occur due to background noise, radio interference, or accents. By using a confidence scoring mechanism based on how closely the transcribed communication matches known patterns, the system can flag low-confidence segments for further review.

To ensure accurate mapping to ADS-B data, the system monitors the aircraft's altitude over time, using real-time ADS-B data to track whether the aircraft is following the instruction. ADS-B data typically provides updates at intervals of 1 to 12 seconds, depending on the system. For critical flight phases such as taxi, takeoff, and landing, it is important to increase the sampling rate of ADS-B data to capture more granular information. For example, during a climb, at least two or three ADS-B samples should be taken within a short window (e.g., 5 seconds) to confirm whether the aircraft's altitude is increasing as instructed.

Suppose ATC directs the pilot to "climb and maintain 5,000 feet." In response, the system expects to see a sequence of ADS-B data points showing a steady increase in altitude:

Timestamp 14:30:05: Altitude=1,200 feet
Timestamp 14:30:10: Altitude=2,500 feet
Timestamp 14:30:15: Altitude=4,000 feet The data shows the aircraft climbing as expected. If the altitude does not increase as directed, the system can flag this as a potential non-compliance event, alerting relevant authorities for further investigation.

Another aspect of this system is handling frequency transitions, where ATC instructs the pilot to switch to a different frequency, such as from 119.50 MHz to 119.90 MHz. Once ATC issues the instruction, the system monitors both the communication and ADS-B data to ensure that the switch is acknowledged and executed. The following JSON output may represent such an instruction:

```
{
  "command": "frequency_change",
  "from_frequency": "119.50"
  "to_frequency": "119.90",
  "next_contact": "Tampa Departure"
}
```

To process and map these transitions, the system listens for specific acknowledgment responses from the pilot. For example, when ATC says, "Contact Tampa Departure on 119.90," the pilot might respond with, "Switching to 119.90, Delta 1234." This acknowledgment would be parsed and verified by comparing it to the original ATC instruction. The system checks that the verbal acknowledgment matches the frequency change instruction, ensuring proper communication handoff.

Altitude Changes

In cases where altitude changes are required during flight, the system must monitor ADS-B data at higher sample rates during periods of ascent and descent. For example, if ATC instructs the pilot to "descend and maintain 3,000 feet," the system would expect the following sequence of ADS-B data to reflect a descending altitude:

Timestamp 15:00:10: Altitude=4,000 feet
Timestamp 15:00:15: Altitude=3,800 feet
Timestamp 15:00:20: Altitude=3,500 feet
Timestamp 15:00:25: Altitude=3,000 feet At least two or three consecutive data points are needed to confirm that the aircraft is following the descent profile. If the ADS-B data fails to show this descending trend, the system can flag the discrepancy as a deviation from ATC instructions.

To accommodate variations in how ATC issues instructions, the NLP model must be flexible enough to parse a wide range of phrasings while delivering a consistent output. For example, "Descend to 3,000 feet" and "Maintain three thousand feet" should both generate the following structured output:

```
{
    "command": "descend",
    "altitude": 3000,
    "unit": "feet"
}
```

The training process for such an NLP model would involve using historical data from ATC communications paired with ADS-B data from known exemplary flights. These records would include instances where pilots perfectly adhered to ATC instructions. By feeding this data into the model, the system learns to recognize the correct response patterns and correlate them with the corresponding ADS-B data.

For instance, an exemplary flight might include a scenario where the pilot is instructed to "reduce speed to 250 knots." The ADS-B data during this portion of the flight would show a gradual reduction in groundspeed:
Timestamp 15:10:10: Groundspeed=280 knots
Timestamp 15:10:15: Groundspeed=260 knots
Timestamp 15:10:20: Groundspeed=250 knots The system would recognize that this decrease in speed matches the ATC instruction and thus learn the appropriate response behavior. Over time, the model builds a database of successful communication-action pairs, which helps in evaluating future flights.

Another critical element in the system is the confidence score. When mapping ATC communications to aircraft actions, the system assigns a confidence value based on how closely the pilot's response and the ADS-B data align with ATC instructions. A perfect response—where the pilot acknowledges the instruction, and the aircraft adheres to it—would receive a confidence score of 1.0. If there are minor discrepancies, such as a slight delay in response or a marginal deviation from the assigned altitude, the confidence score may decrease, indicating that the flight did not fully comply with ATC directives.

Missed Approach

In more complex scenarios, such as a missed approach, where the pilot is instructed to "go around and climb to 3,000 feet," the system must monitor multiple parameters simultaneously. Not only is the altitude expected to increase, but the aircraft should also change heading and adjust its vertical speed. The following ADS-B data would represent compliance with this instruction:
Timestamp 15:20:10: Altitude=500 feet, Heading=90 degrees, Vertical Speed=+1,500 fpm
Timestamp 15:20:20: Altitude=1,500 feet, Heading=90 degrees, Vertical Speed=+1,500 fpm
Timestamp 15:20:30: Altitude=3,000 feet, Heading=90 degrees, Vertical Speed=+1,500 fpm The system cross-references each of these parameters with the original ATC instruction, ensuring that the aircraft is executing the missed approach as directed. Finally, the integration of this system into pilot logbook validation is key for ensuring that logbook entries reflect accurate flight data. A pilot logbook typically includes fields for total flight time, departure and arrival airports, and flight conditions. This system would cross-check these entries with ATC communications and ADS-B data, verifying that the logged details—such as takeoff time, cruise altitude, and landing—match the actual flight performance. For example, if a logbook indicates that the aircraft cruised at FL180 but the ADS-B data shows the aircraft never climbed above FL160, the system would flag this as an inconsistency, reducing the reliability of the logbook entry.

Flight Plan Integration to Frequency Stitching

A key component of this invention involves the ability to use filed flight plans to anticipate the frequency transitions as the aircraft progresses through various air traffic control (ATC) sectors. ATC communications, especially in complex airspace, require pilots to switch frequencies as they move between different ATC jurisdictions, such as from ground to departure, then from center to approach. However, these transitions are largely determined by the aircraft's location in relation to specific air traffic sectors. By parsing the geographic route information provided in the flight plan, the system can predict when and where these transitions will occur and preemptively assign anticipated frequencies based on the known regions of operation.

Standardized Flight Plan Formats

Flight plans filed with regulatory agencies, such as the Federal Aviation Administration (FAA) or ICAO, typically adhere to a structured format. For example, the ICAO flight plan format includes fields for: aircraft identification (callsign); route waypoints, including origin, destination, and enroute waypoints; altitudes; time estimates for each waypoint; departure and arrival airports; alternate airports in case of rerouting; and specific airspaces and services required (e.g., radar services, ATC contact points). These flight plans can be filed in text-based formats (often using ICAO format codes) or in more structured formats such as XML. The ICAO Flight Plan XML Schema provides a clear, machine-readable format that can be integrated with flight-tracking systems.

Using this data, the system can apply an anticipated communication chain. This involves correlating the geographical location of the aircraft with the frequencies used by the various ATC sectors. Each frequency corresponds to a different airspace sector, and by mapping the route in the flight plan against known geographic boundaries of these sectors, the system can create a predetermined set of communication channels.

Geographic Frequency Mapping and Fuzzy Logic

The invention leverages geographic mapping to predict which frequencies will be in use based on the aircraft's route. Each sector of airspace has a limited number of frequencies allocated to different ATC services such as ground control, tower, enroute center, and approach control. By correlating the aircraft's position along its route with these frequency allocations, the system can preemptively determine the appropriate frequency even before an ATC instruction to switch occurs.

Fuzzy logic can also be applied when there is ambiguity in the ATC instructions or a discrepancy in frequency handoffs. For example, if a frequency handoff instruction is missing or unclear, the system can rely on pre-determined default frequencies for a given airspace, using probabilities based on historical data and patterns from previous flights. If a frequency falls within the expected range of valid options for that sector, the system can resolve the ambiguity by defaulting to the most probable option.

Anticipating Frequency Switches

The system anticipates upcoming frequency changes based on the aircraft's flight plan and geographic location. For example, as the aircraft nears the boundary of an enroute sector, the system can preload the frequency associated with the next sector. This ensures that the aircraft remains in contact with ATC and avoids missed handoffs between frequencies. By predicting the timing of these transitions, the system can also monitor for potential failures, such as when a pilot fails to switch to the correct frequency.

Use Case Example

Consider an aircraft flying from Tampa International Airport (KTPA) to Miami International Airport (KMIA). The flight plan includes a series of waypoints and altitude changes, and as the aircraft departs Tampa, it will communicate with various ATC services at KTPA, including ground, tower, and departure control. Once it transitions into enroute airspace, it will switch to a frequency controlled by Miami Center. The system, by parsing the flight plan, can predict when the aircraft will exit Tampa's terminal airspace and enter Miami's airspace, preloading the appropriate frequencies to ensure continuity in communications. In this case, the flight plan integration allows the system to preload Tampa departure control's frequency while the aircraft is still on the ground. As the aircraft climbs and exits terminal airspace, the system switches to Miami Center's enroute frequency based on the aircraft's position relative to the waypoints in the flight plan.

Training Machine Learning Models to Anticipate Frequencies

To optimize frequency handoff prediction, machine learning models can be trained on historical flight and frequency data. These models can identify patterns in ATC instructions, common routes, and geographical sectors, learning the most likely frequencies used for specific routes. By using labeled data that includes frequency transitions for thousands of flights, the system can become proficient at predicting which frequencies will be used at different points along the route, improving the system's ability to handle ambiguous instructions or missed handoffs.

Furthermore, natural language processing (NLP) models can be trained on ATC communications to identify instructions related to frequency changes. By parsing the communication and correlating it with the aircraft's geographic position, the system can further refine its predictions. For instance, the instruction "Switch to Miami Center on 125.85" would be detected by the NLP model, and the system would know to listen for the pilot's acknowledgment and validate the frequency switch.

Integration of Fuzzy Logic for Uncertain Scenarios

In cases where frequency handoffs are unclear or instructions are ambiguous, the system can employ fuzzy logic to handle uncertainty. For instance, if an ATC instruction is incomplete, the system can rely on the preloaded communication chain, using default frequencies based on the geographic region and historical data from previous flights along the same route. By assigning a probability to each frequency based on its likelihood of being used in that sector, the system can make an informed decision about which frequency to switch to.

Real-Time vs. Historical Data Processing

This system is flexible enough to process ATC communications in real-time or retrospectively from archived data. In real-time, the system monitors flight progress and anticipates frequency changes, ensuring that the pilot receives continuous instructions. In a retrospective analysis, the system can compare actual frequency transitions with the expected transitions based on the flight plan, identifying any discrepancies that may indicate a missed handoff or an incorrect frequency selection. In both cases, the system cross-references the transcribed ATC communications with the filed flight plan, geographic location data, and ADS-B data to ensure that the aircraft is adhering to the expected communication protocol. By doing so, the system ensures compliance with ATC instructions, reduces the likelihood of communication failures, and improves overall flight safety.

Referring to FIGS. 14 through 25, these figures depict the system's capabilities in stitching communication threads for a flight, using data from FAA SWIM, flight plans, and ADS-B to manage the communication stitching process and ensure reliable transitions between control agencies throughout the flight.

Figure 14:
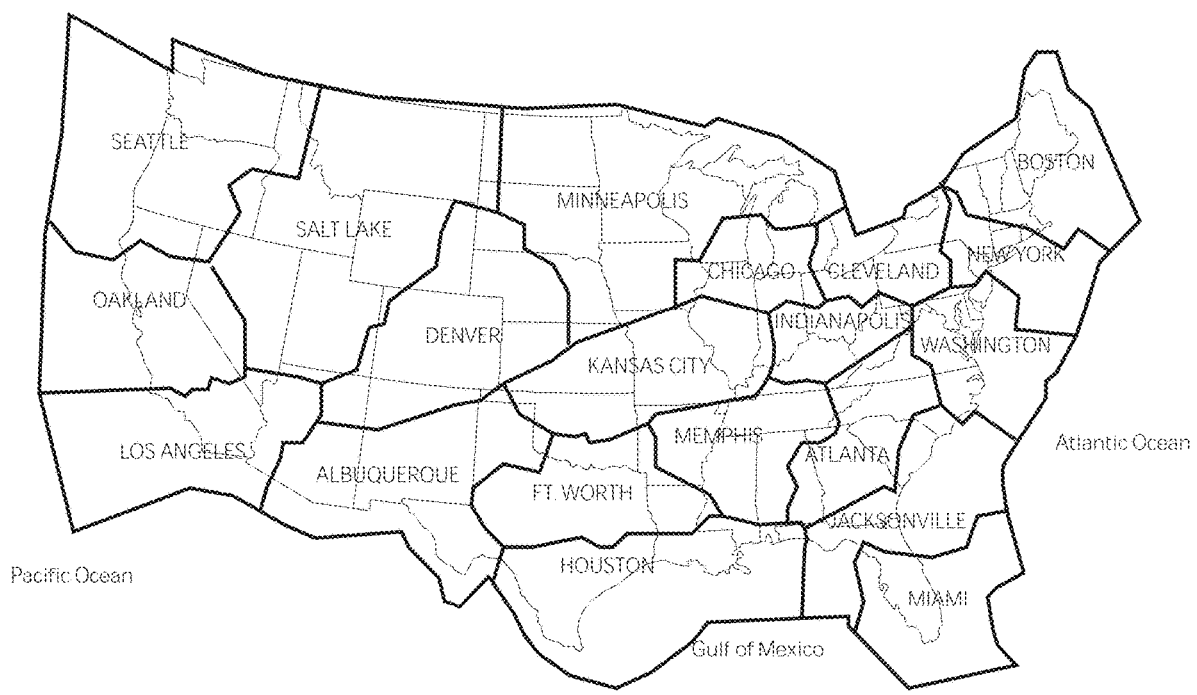
FIG. 14 illustrates the segmented geographic ATC regions across the United States, showing how different airspaces are managed by specific ATC sectors and how communication transitions occur between these regions during a flight.

As shown in FIG. 14, the system begins by stitching together communications across multiple frequencies used during a flight. The system monitors both filed flight plans and real-time ADS-B data, correlating the expected communications with the actual conversations taking place. For instance, if flight AA801 is scheduled to depart from KMCO at 08:35, the system initiates its stitching process by scanning for relevant communications starting one hour before and one hour after the scheduled departure time. Once a communication is detected, the system begins the communication stitching thread, which links subsequent communications to the correct aircraft.

Figures 15A, 15B:
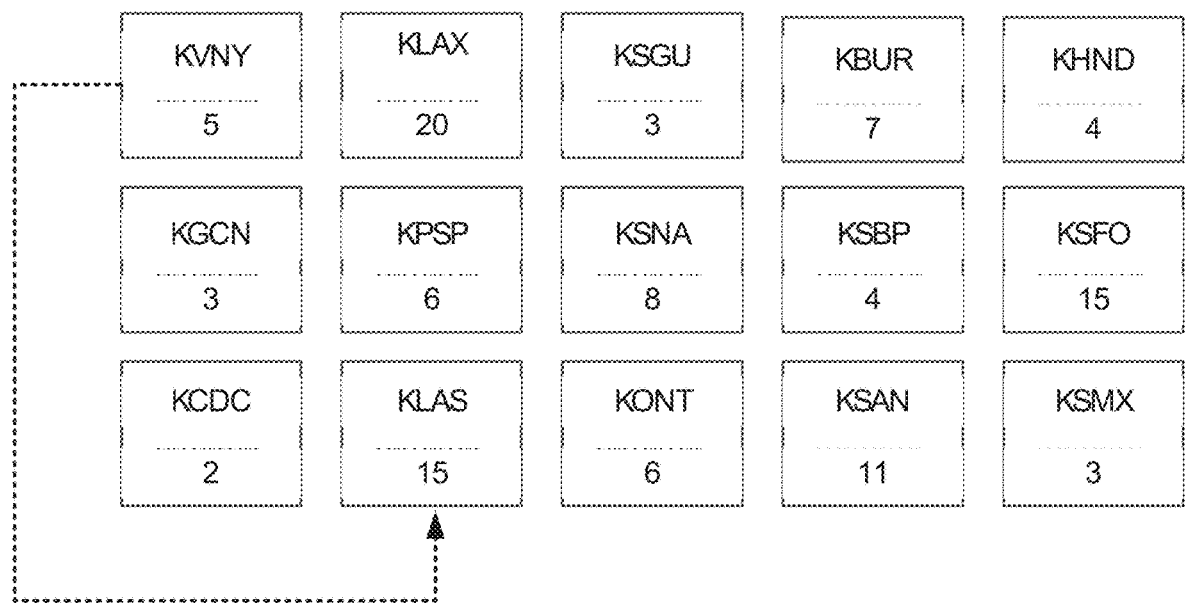
FIG. 15A illustrates the system's handling of multiple frequencies during departure and arrival to create a continuous communication thread.
FIG. 15B demonstrates the system's recovery of missing communication threads using departure and destination frequencies.

FIG. 15A illustrates how the system compiles communication threads for both departure and arrival, handling multiple frequencies at each airport or sector. For example, when TIV680 departs from KVNY (Van Nuys) to KLAX (Los Angeles), the system processes communications through all five relevant frequencies at KVNY and all 20 relevant frequencies at KLAX. The system ensures that all communications related to the departure, enroute, and approach phases are captured and stitched together into one comprehensive thread, even if communications on specific frequencies experience dead air or if frequency transitions are missed. The system uses ADS-B data to anticipate the flight's progression and search relevant frequency bands for any missed communication.

FIG. 15B expands on the system's ability to recover missing communications. If the communication thread is broken during the enroute phase, the system can perform a recovery by searching through both departure and destination frequencies. For instance, if communication was lost for TIV680, the system begins by searching all departure location frequencies at KVNY, followed by relevant frequencies at KLAX. By reversing the stitching process, the system can reconstitute the missing communication thread and recover any lost data.

Figure 16:
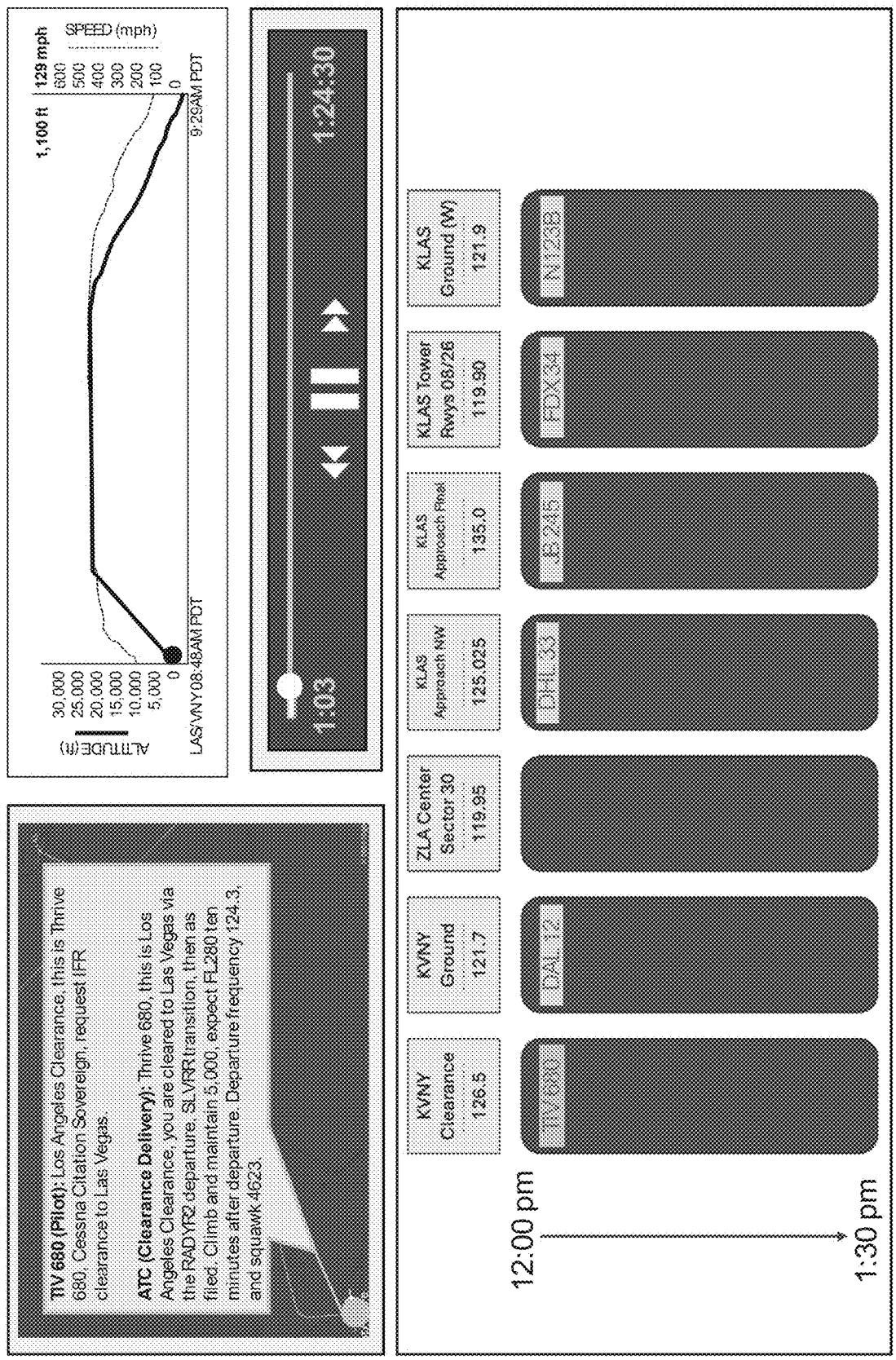
FIG. 16 shows a graphical user interface (GUI) of an embodiment of the invention monitoring the flight of a Cessna Citation Sovereign aircraft, integrating pilot, ATC, and ADS-B data at a flight time of 1:03 from initialization.

FIG. 16 shows the system monitoring multiple FAA ATC communication frequencies simultaneously as the aircraft, TIV680, prepares for departure. The system captures the communication exchange between the pilot and ATC. For this sake of clarity and brevity, the full scope of ATC-pilot communications according to best practices has been limited to focus on the enablement and utility of the claimed invention. At 1:03 into the flight sequence, TIV680 requests IFR clearance to Las Vegas. ATC responds by clearing TIV680 via the PADDR2 departure route, instructing the pilot to climb and maintain 5,000 feet with an initial squawk code of 4623. This figure illustrates the system's ability to track multiple frequencies, isolate the relevant communication, and stitch together the communication thread in real-time. The top right of the GUI displays altitude and speed information from ADS-B data, validating that the communication is synchronized with the aircraft's position and altitude. The audio track displayed in the bottom section shows the timecode position relative to the total flight communication duration of 1 hour, 24 minutes, and 30 seconds. In this example, only the necessary communications relevant to TIV680 are stitched into the timeline, filtering out unrelated transmissions or dead air from other monitored frequencies.

Figure 17:
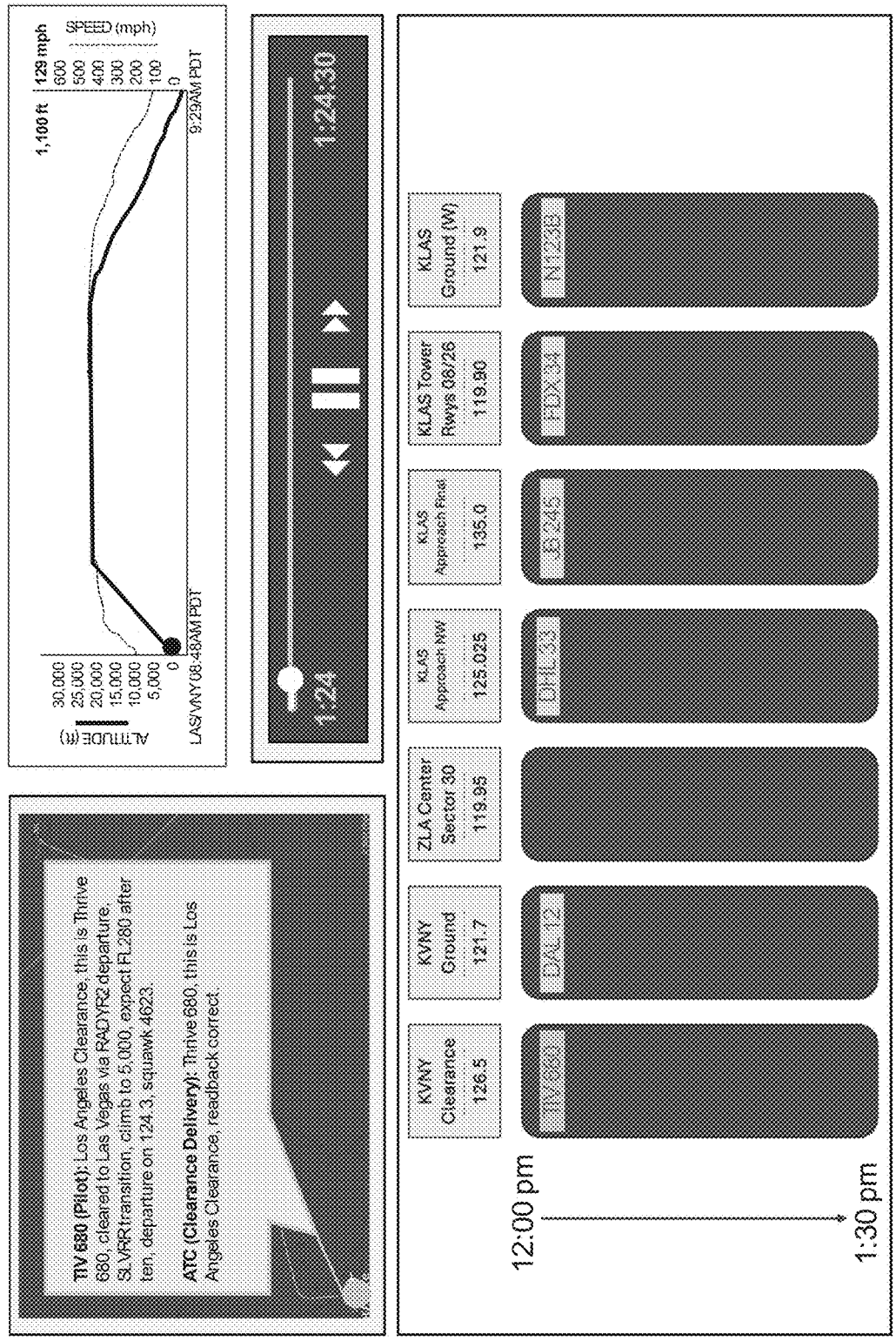
FIG. 17 shows a graphical user interface (GUI) of an embodiment of the invention monitoring the flight of a Cessna Citation Sovereign aircraft integrating pilot, ATC, and ADS-B data together at a flight time of 1:24 from initialization. The communication dialog involves clearance confirmation for departure to Las Vegas.

FIG. 17 expands on the departure phase of TIV680's flight. At 1:24 into the flight sequence, TIV680 reads back the IFR clearance received earlier. ATC confirms the clearance is correct. The GUI again illustrates the system's ability to capture and chronologically stitch the pilot's readback with ATC's confirmation. The communication events are accurately aligned on the timeline, ensuring continuity of the communication thread. Altitude and position data remain synchronized with the communication, validating the aircraft's compliance with the instructions. The GUI also demonstrates how the system effectively isolates the TIV680's transmission from other ongoing transmissions on different frequencies, ensuring only relevant communications are logged in the stitched thread.

Figure 18:
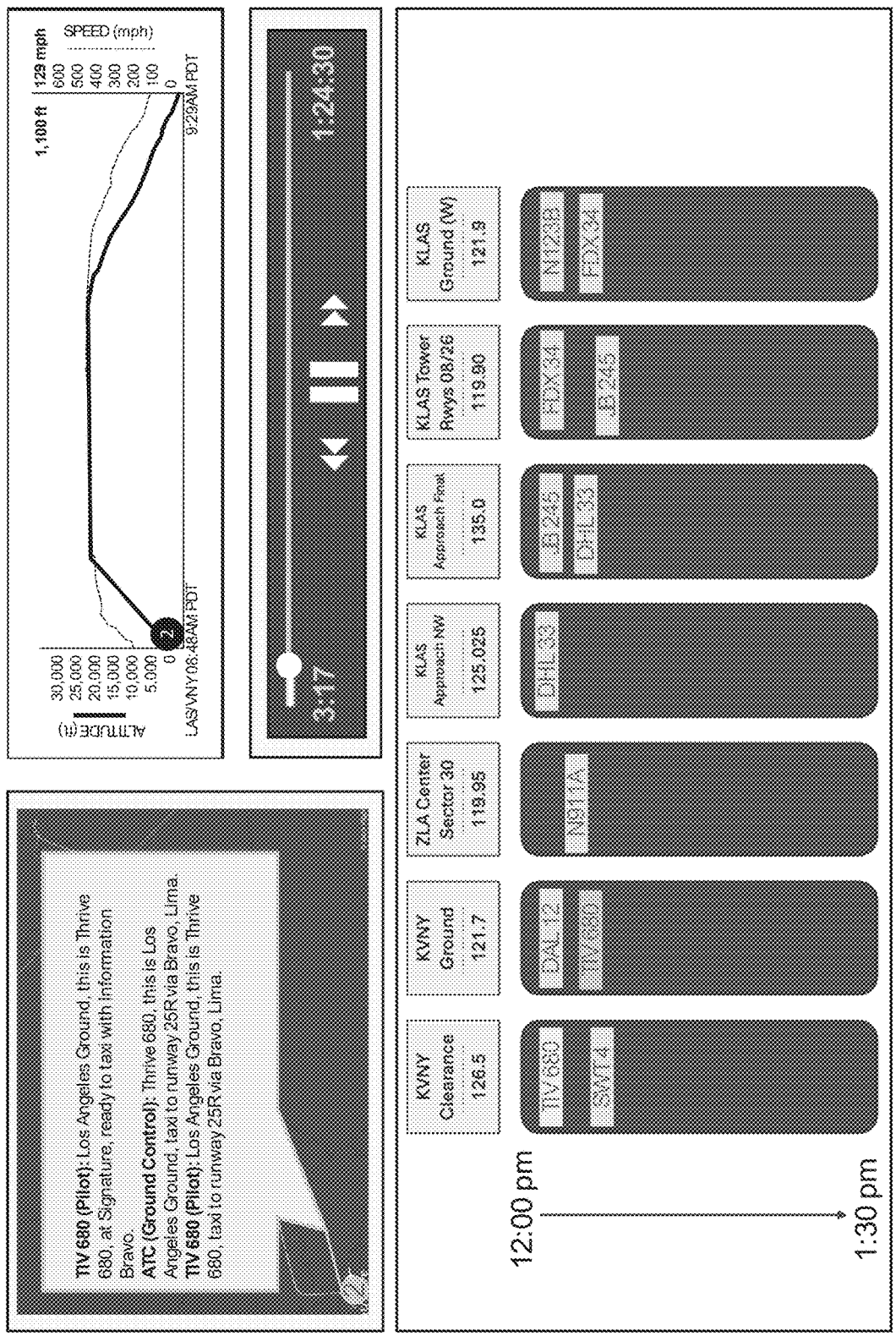
FIG. 18 shows a GUI of an embodiment of the system tracking the Cessna Citation Sovereign aircraft during taxiing at Los Angeles Airport at 3:17 from initialization. The communication dialog between the pilot and ATC involves ground clearance instructions to taxi to runway 25R via Bravo and Lima.

FIG. 18 details TIV680's taxi clearance at 3:17 in the timeline. In this phase, the pilot contacts Los Angeles Ground, stating that TIV680 is ready to taxi with information Bravo. Ground control instructs the aircraft to taxi to runway 25R via Bravo and Lima. The system captures the entire communication and logs it accurately in the communication thread. The GUI shows the frequency transition from KVNY Ground (121.7) as TIV680 moves through the taxi phase. The stitched communication thread ensures the entire interaction is captured, maintaining the chronological flow of events while also showing the transition from clearance to ground control. The system overlays this communication with the aircraft's real-time ADS-B position, ensuring the dialog aligns with the aircraft's physical movement.

Figure 19:
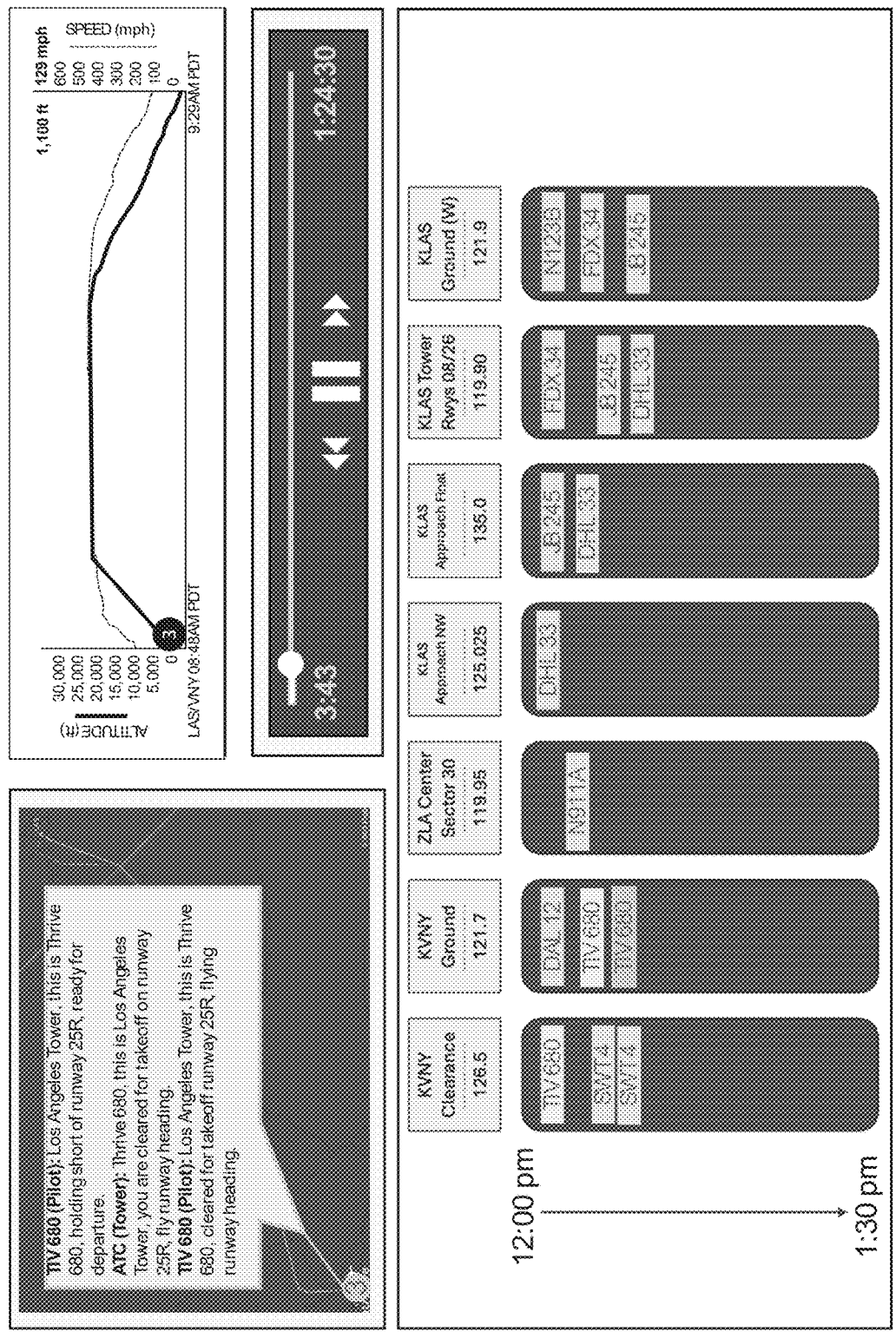
FIG. 19 illustrates a GUI of the invention monitoring the flight of a Cessna Citation Sovereign at 3:43 from initialization. The ATC clears the aircraft for takeoff from runway 25R, with the pilot acknowledging the instruction. The graphical interface includes time and altitude tracking, as well as real-time communication with ATC and ADS-B data.

FIG. 19 shows TIV680's clearance for takeoff at 3:43 in the timeline. As TIV680 approaches runway 25R, the pilot confirms readiness for departure. ATC clears TIV680 for takeoff, instructing the pilot to fly runway heading. The system captures this interaction, ensuring it is logged chronologically in the communication thread. The GUI displays the frequency transitions, showing that TIV680 has shifted from ground control to tower frequency (119.9). ADS-B data remains in sync, displaying the aircraft's altitude and heading as the takeoff clearance is issued. The timecode continues to progress, reflecting the elapsed time in the flight communication sequence.

Figure 20:
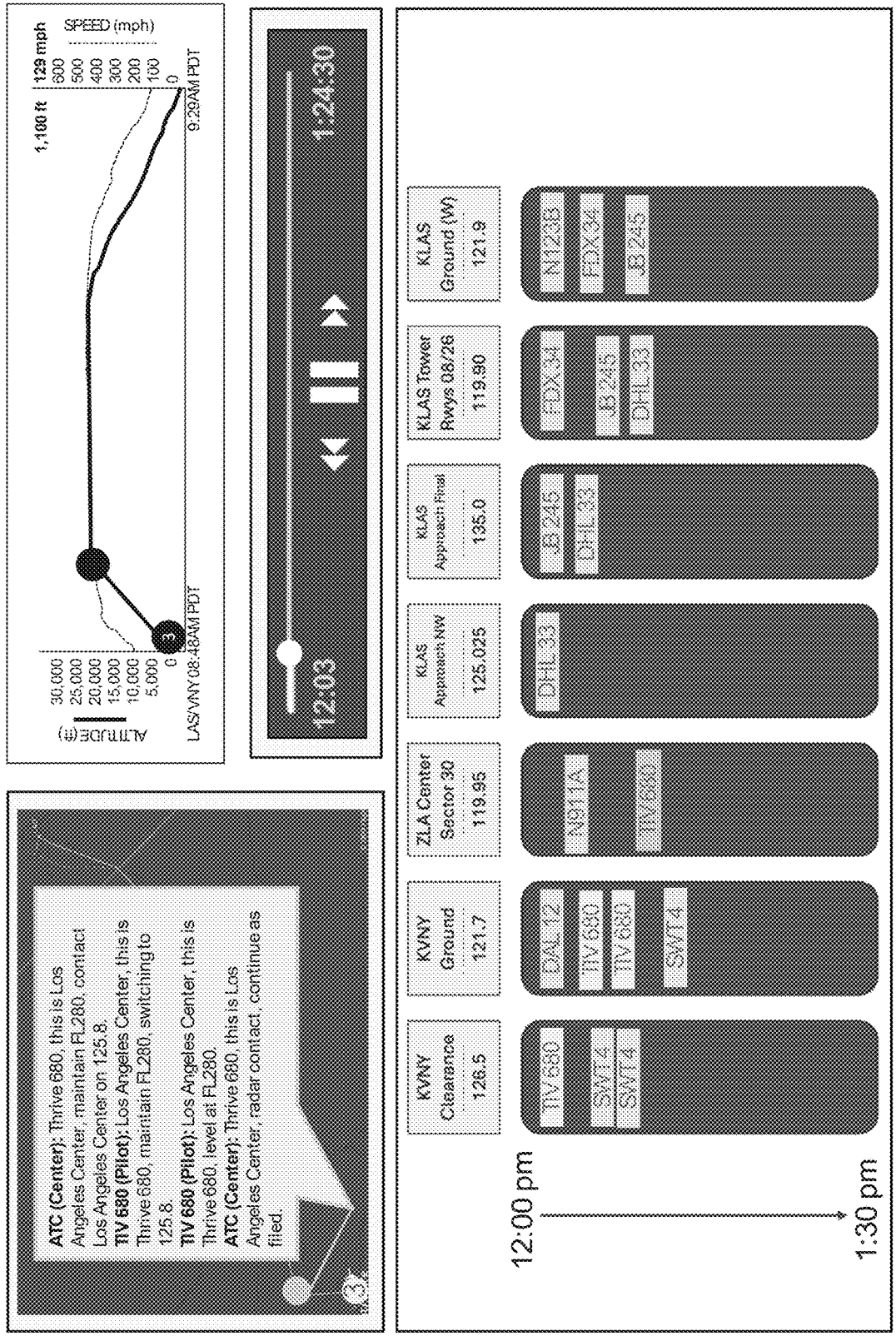
FIG. 20 shows a GUI of the system at 12:03 from initialization, tracking the Cessna Citation Sovereign aircraft in the en-route phase. ATC communication involves clearance for the aircraft to maintain FL280, and the pilot responds with acknowledgment of the altitude instructions.

FIG. 20 illustrates a series of communications between TIV680 and Los Angeles Center. At 12:03 pm in the sequence, the ATC instructs the aircraft to climb and maintain FL280, followed by a handoff to another frequency (125.8). TIV680 confirms the instruction and executes the frequency change. The system captures this interaction, ensuring the communication is stitched chronologically into the flight thread. The GUI shows the frequency transitions as TIV680 moves from ZLA Center (119.95) to KLAS Approach frequencies. The system isolates the communication, ensuring only the relevant frequencies and communications are stitched into the sequence.

Figure 21:
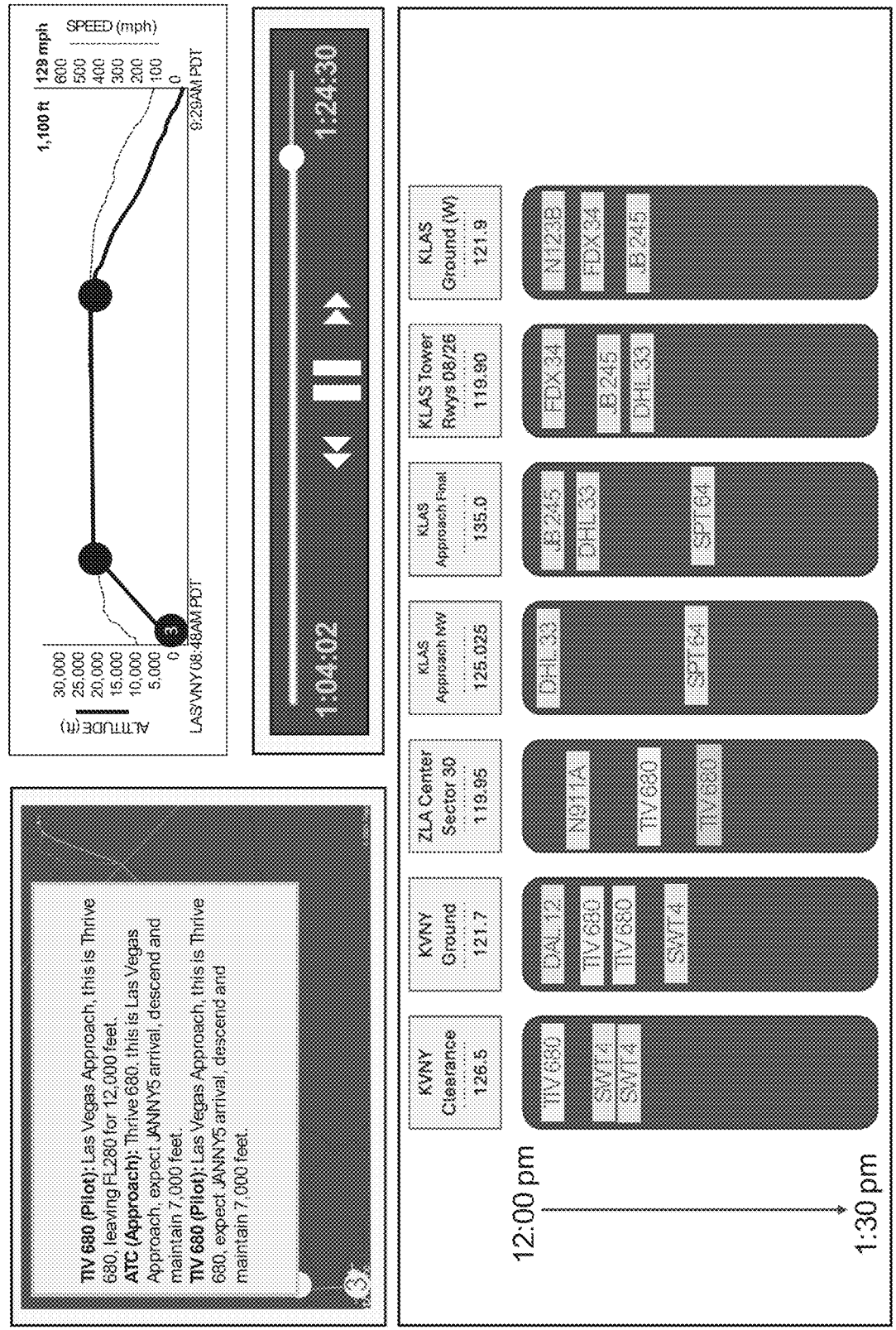
FIG. 21 provides a GUI display at 1:04:02 into the flight, showing the descent phase of the Cessna Citation Sovereign as it transitions into the Las Vegas approach. The ATC instructs the pilot to descend and maintain 7,000 feet for the JANNY5 arrival, which the pilot acknowledges.

FIG. 21 captures the approach phase of TIV680's flight. At 1:04:02 into the flight communication sequence, TIV680 contacts Las Vegas Approach and reports descending from FL280. ATC instructs the pilot to descend further to 7,000 feet for the JANNY5 arrival procedure. The system captures these instructions and synchronizes them with the descending altitude data from ADS-B, ensuring that the communication thread remains continuous and accurate. The GUI shows the system monitoring multiple frequencies but filtering out irrelevant communications, isolating only the communications between TIV680 and ATC. The stitched communication thread continues to progress, incorporating the descent phase seamlessly into the overall flight thread.

Figure 22:
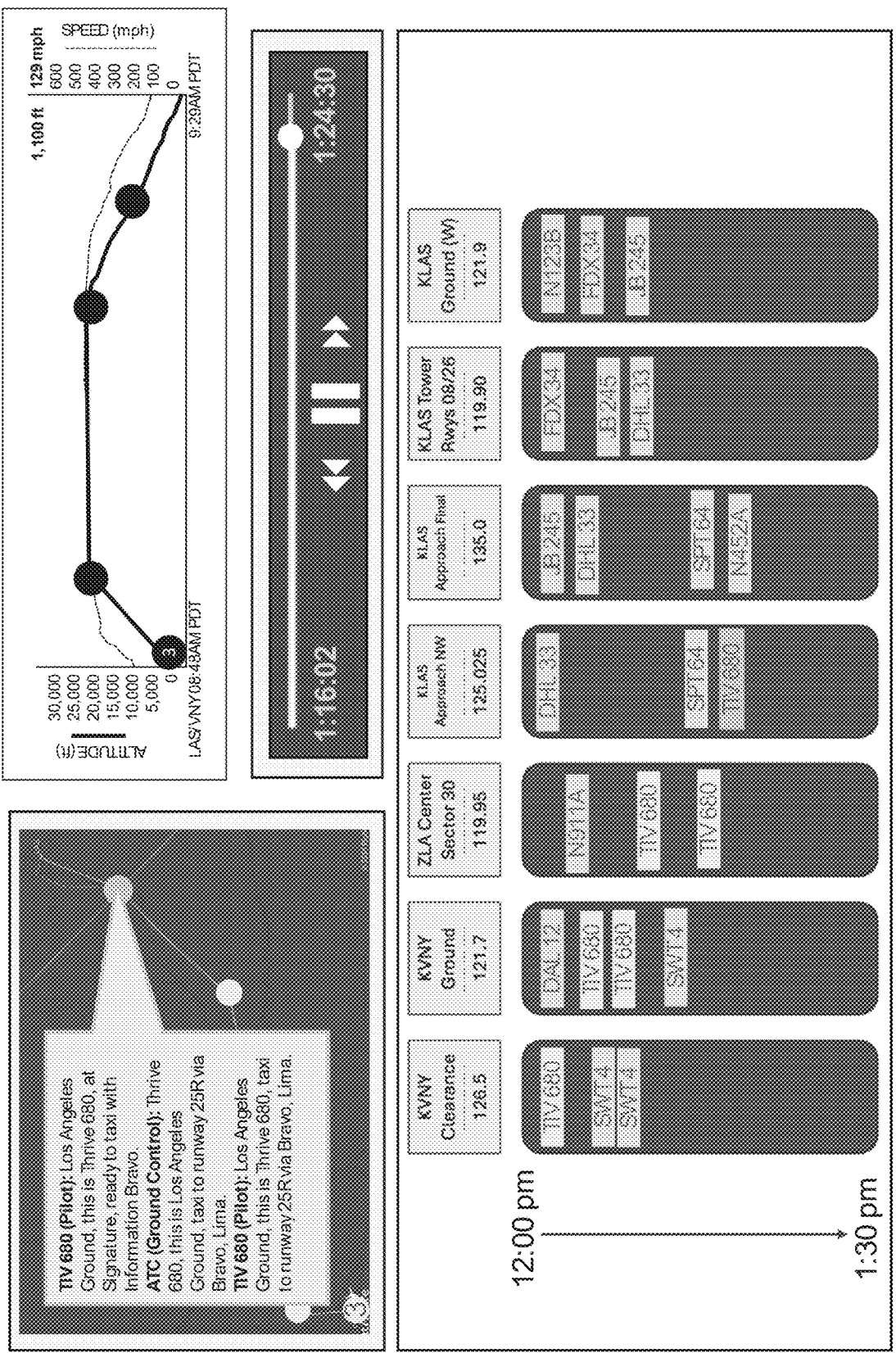
FIG. 22 displays the GUI of the system at 1:16:02 into the flight, tracking communication between the Cessna Citation Sovereign pilot and ATC as they discuss ground taxi instructions at Los Angeles Airport, taxiing via Bravo and Lima to runway 25R.

FIG. 22 revisits the taxi phase, illustrating the communication between TIV680 and Los Angeles Ground. At 1:16:02 into the sequence, TIV680 requests taxi clearance again, confirming it is ready to proceed with Information Bravo. ATC issues taxi instructions to runway 25R via Bravo and Lima. The system accurately logs this communication into the thread, capturing the taxi phase. The GUI displays the frequency in use (121.7) and the ADS-B data showing the aircraft's movement on the ground. The system filters the communication, stitching it into the appropriate place in the communication timeline.

Figure 23:
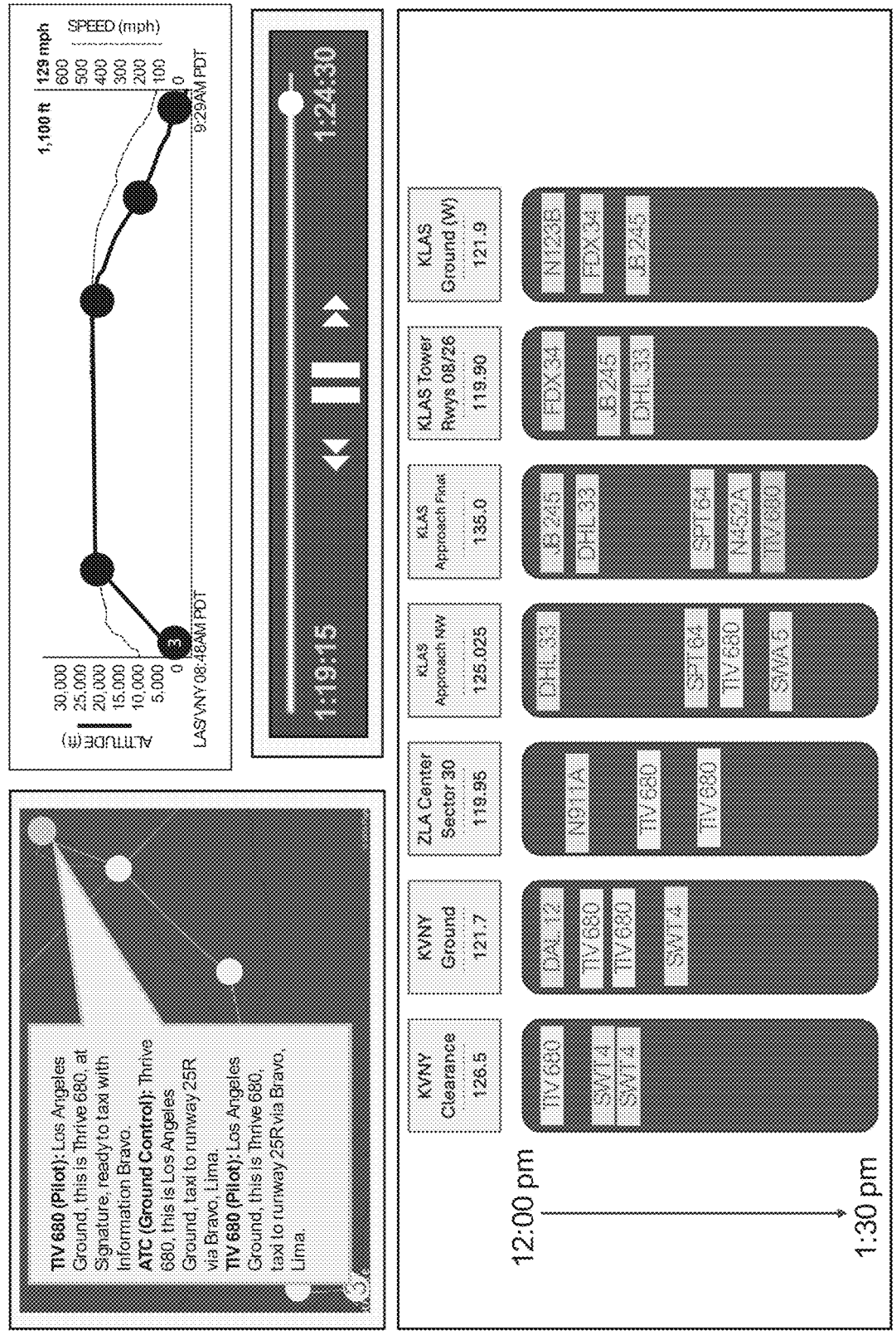
FIG. 23 shows a GUI at 1:19:15 from initialization, representing a continued sequence of ground communications at Los Angeles Airport. The pilot confirms taxi instructions with ATC while the system continues tracking time, position, and altitude.

FIG. 23 depicts TIV680's continued taxi clearance at 1:19:15. The pilot reiterates the taxi instructions, confirming movement toward runway 25R. The system captures and logs the communication into the stitched thread. The GUI shows the active frequency and aircraft position, validating that the communication aligns with the aircraft's ground movement. The system isolates the communication, ensuring that only relevant interactions between TIV680 and ATC are stitched into the flight thread.

Figure 24:
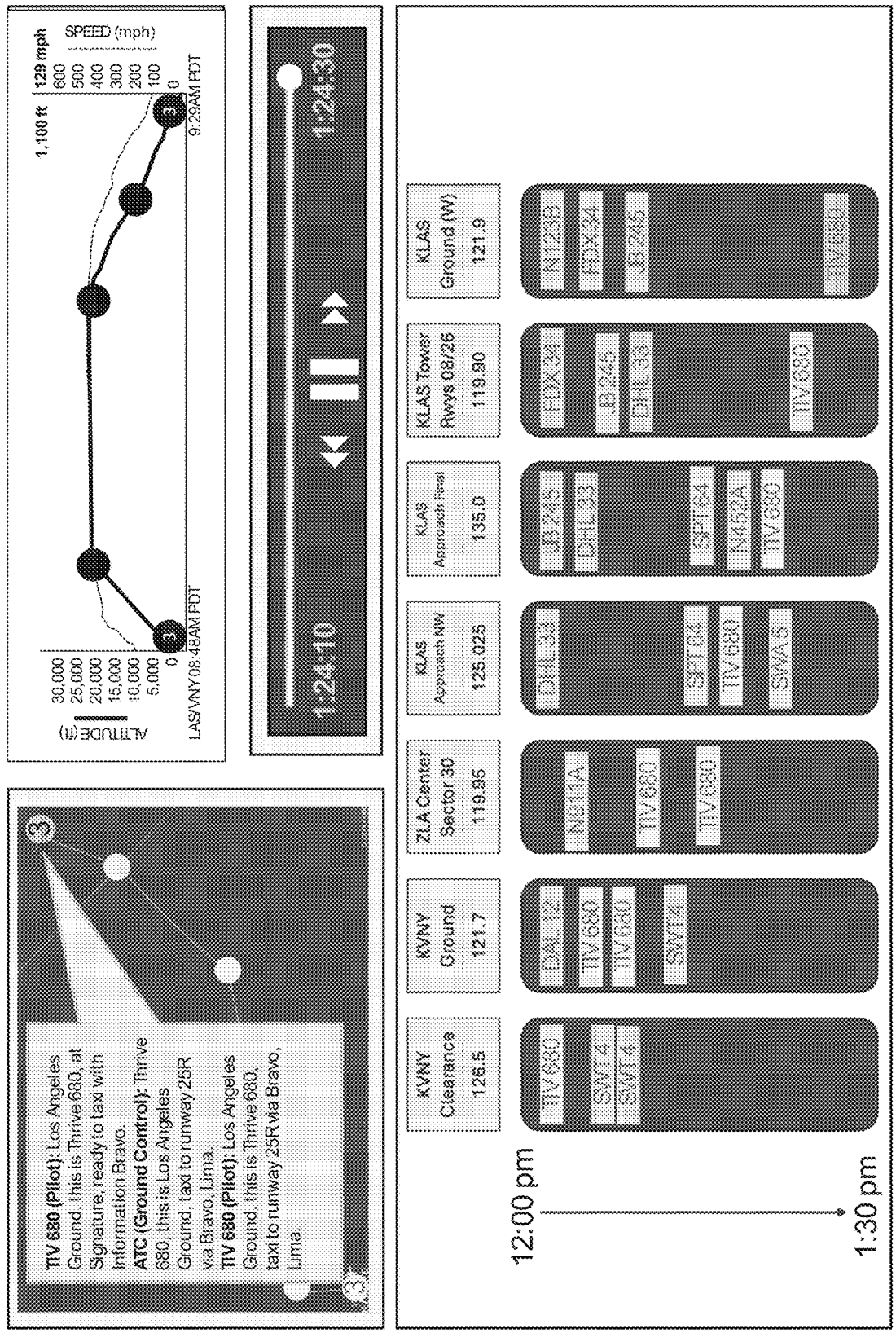
FIG. 24 provides a comprehensive GUI view of the flight nearing completion at 1:24:10, showcasing the entire communication thread stitched together from initialization to the final stages of the flight. The GUI shows chronological communication, ADS-B data, and flight path tracking as the system finalizes its monitoring and stitching process.

FIG. 24 shows the final moments of TIV680's taxi clearance at 1:24:10. The pilot repeats the instructions to taxi to runway 25R via Bravo and Lima, and the system ensures this communication is stitched into the final section of the flight thread. The GUI displays the relevant frequencies and ADS-B data, confirming the aircraft's position on the ground. The system continues to filter and stitch only the necessary communications, ensuring the thread remains complete and accurate through the taxi phase.

Figure 25:
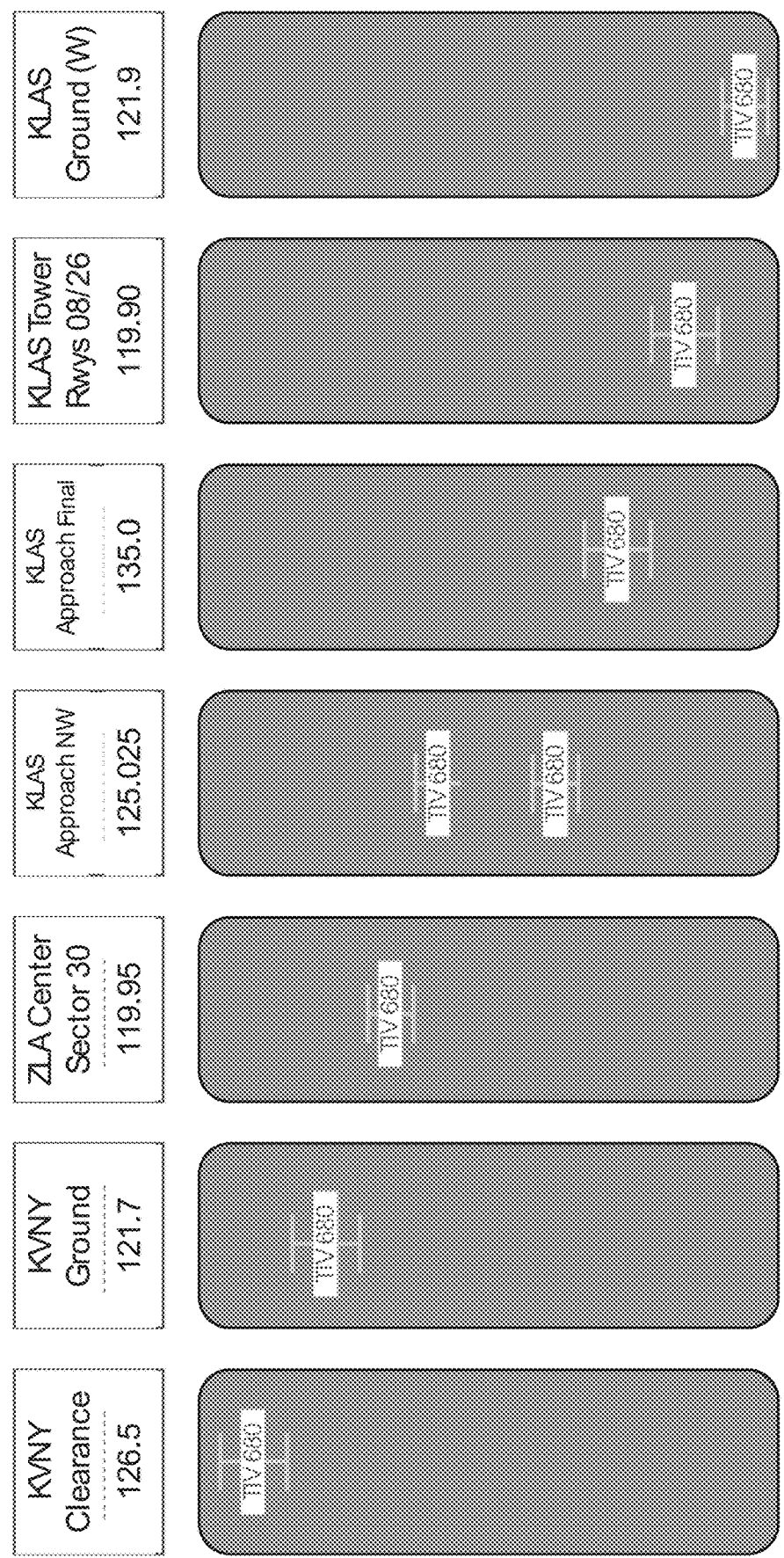
FIG. 25 shows a graphical user interface (GUI) illustrating the entire communication thread of flight TIV 680 from its clearance at KVNY to ground operations at KLAS. The figure presents the sequential communications across various frequencies, including KVNY Clearance, KVNY Ground, ZLA Center, KLAS Approach, KLAS Tower, and KLAS Ground.

FIG. 25 illustrates the system's ability to bracket communications and validate call signs to ensure accurate stitching of communication threads. TIV680's call sign is shown across multiple frequencies, and the system ensures that even if a call sign is misheard or misidentified, the communication is still correctly bracketed to the correct aircraft. The GUI shows multiple frequencies in use and the system's capability to accurately stitch and validate the communication thread across all frequencies in real-time. This process is essential for maintaining the integrity of the stitched communication sequence throughout the flight.

SBO Video Confirming Flight Termination

Figure 26:
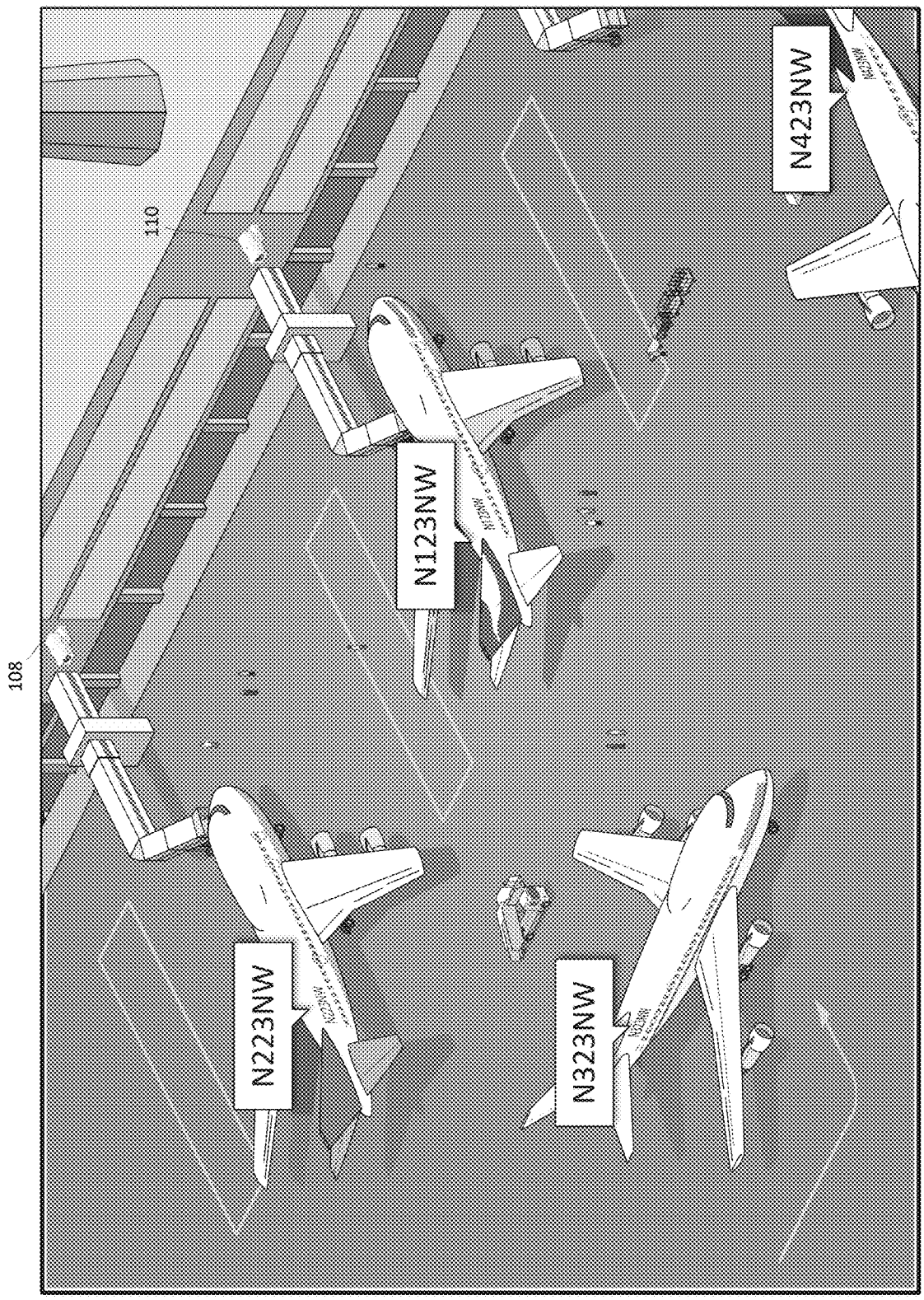
FIG. 26 is a diagrammatic isometric view of an airport ramp illustrating surface-based observation video cameras capturing aircraft identification.

FIG. 26 is a diagrammatic isometric view of an airport ramp, illustrating the integration of Surface-Based Observation (SBO) video technology for capturing and identifying aircraft. In the context of the invention, SBO video serves as a critical tool for confirming the safe completion of flights, particularly when ADS-B transmissions stop at a certain altitude, such as 500 feet. This figure visually demonstrates how cameras positioned around the ramp capture real-time video data of aircraft parked at the gate, which is then processed using advanced object detection and Optical Character Recognition (OCR) technologies to identify the aircraft.

The invention leverages this SBO video technology to provide stakeholders, including airport operators and air traffic controllers, with an additional layer of monitoring when standard surveillance methods like ADS-B (Automatic Dependent Surveillance-Broadcast) cease to function below a specific altitude threshold. While there are over 700 ground stations currently providing ADS-B coverage, gaps may still exist in areas like airport surfaces where structures or operational modes might result in the transponder being turned off. SBO video compensates for these gaps by utilizing visual identification, enabling continuous tracking and validation that the flight has reached its destination and concluded safely.

In FIG. 26, multiple aircraft are shown on the ramp, each identified by tail numbers such as N223NW and N123NW. SBO video cameras, denoted by reference numerals 108 and 110, are strategically placed to capture high-definition footage of the ramp area. These cameras are equipped with machine learning models capable of object detection, which is the process of identifying and classifying objects within the video feed—in this case, the aircraft.

Once the system identifies an aircraft within the frame, it applies optical character recognition (OCR) to detect and extract the tail number displayed on the aircraft. The extracted tail number is cross-referenced against the aircraft's known IATA-formatted identifier. This process provides real-time validation of the aircraft's identity and location on the ramp. The system can then match this information with other data sources, such as flight plans and ADS-B logs, to confirm that the flight has completed its course and is safely parked.

The use of SBO video is crucial not only for real-time monitoring but also for post-flight verification and auditing. If there are ambiguities or gaps in the data received via ADS-B or other surveillance technologies, SBO video provides a reliable secondary source to cross-check the aircraft's final movements. This redundancy ensures a higher level of accuracy in the monitoring process and is essential for confirming the safety and compliance of the aircraft's operations.

This integration of SBO video with ADS-B and other aviation monitoring systems ties directly into the broader goals of the invention, which focuses on improving situational awareness and ensuring the completeness and reliability of aviation data. By combining video surveillance, object detection, and OCR, the system is capable of addressing situations where traditional surveillance methods might fail or provide incomplete data, thus offering a more comprehensive solution for stakeholders in both real-time and archived flight analysis scenarios.

Location-Based, ADS-B Validated Conditions Observation

An embodiment of the invention provides a method for monitoring air traffic control (ATC) and pilot communications to identify a predefined subset of aviation-related words and their semantic equivalents. These keywords typically indicate conditions that can impact flight safety, efficiency, or comfort, such as "turbulence," "smooth ride," "icing," "shear," and "obstruction." Additional keywords that may be relevant include "wind gusts," "low visibility," "thunderstorms," "clear air," "downdrafts," "updrafts," "crosswinds," and "microbursts." These words are often exchanged in ATC-pilot communications to describe real-time weather conditions, flight hazards, or atmospheric phenomena encountered by aircraft. By systematically monitoring for these terms and their contextual equivalents, the system can automatically extract useful operational data from verbal exchanges.

Once identified, these keywords are reduced into structured data formats that can be processed by the system for further analysis and correlation with Automatic Dependent Surveillance-Broadcast (ADS-B) data. The structured data representation of these terms provides quantitative context, enabling the system to align the spoken observations with key flight parameters such as position, altitude, heading, and speed. For example, if a pilot reports "moderate turbulence" at 28,000 feet over a particular geographic waypoint, the system can instantly correlate this with ADS-B data to pinpoint the aircraft's exact location, altitude, and heading at the time of the report.

The invention can automatically generate comprehensive reports and visualizations, such as heatmaps, based on these structured observations. These heatmaps or other graphical outputs provide spatial representations of in-flight conditions across a geographic region, offering a visual tool to inform air traffic controllers, pilots, and other stakeholders of areas that may pose potential risks or warrant attention. This automatic translation of verbal reports into structured, actionable data allows for rapid dissemination and sharing of critical flight information across aviation systems.

For example, ATC or pilots may mention turbulence while flying through certain airways. Traditionally, such reports rely on manual relay and subjective judgment. By automating the capture and correlation of these communications with ADS-B data, the system converts these reports into precise, quantifiable data points that can be shared in real-time with other aircraft, air traffic controllers, meteorologists, and airport operations teams. This sharing mechanism is similar to how a driver might input information about a road hazard or accident into a mobile application to alert other drivers. However, in this aviation-focused application, the system captures these observations entirely without manual input, relying instead on verbal communications between ATC and pilots. Exemplary structured data:

```
{
    "communication_id": "comm_123456",
    "timestamp": "2024-09-26T14:32:00Z",
    "source": {
      "type": "ATC",
      "frequency": "125.4",
      "location": "KTPA"
    },
    "destination": {
      "type": "Aircraft",
      "callsign": "DAL1234",
      "icao24": "A1B2C3",
      "registration": "N1234D"
    },
    "transcription": {
      "text": "Delta 1234, report moderate turbulence at FL280.",
      "keywords_detected": [
        {
          "keyword": "turbulence",
          "type": "weather_condition",
          "severity": "moderate"
        }
      ]
    },
    "ADS-B_data": {
      "position": {
        "latitude": 27.9755,
        "longitude": - 82.5332
      },
      "altitude": {
        "value": 28000,
        "unit": "feet"
      },
      "heading": 150,
      "speed": {
        "value": 450,
        "unit": "knots"
      },
      "timestamp": "2024-09-26T14:31:50Z"
    },
    "correlation": {
      "status": "success",
      "confidence": 0.98
    },
    "visualization": {
```

```
            "heatmap": {
                "type": "weather_condition",
                "condition": "turbulence",
                "severity": "moderate",
                "location": {
                    "latitude": 27.9755,
                    "longitude": -82.5332
                },
                "altitude": 28000,
                "heading": 150,
                "range": "10 nm",
                "time_window": "2024-09-26T14:30:00Z to
2024-09-26T14:35:00Z"
            }
        }
    }
```

Figure 27:
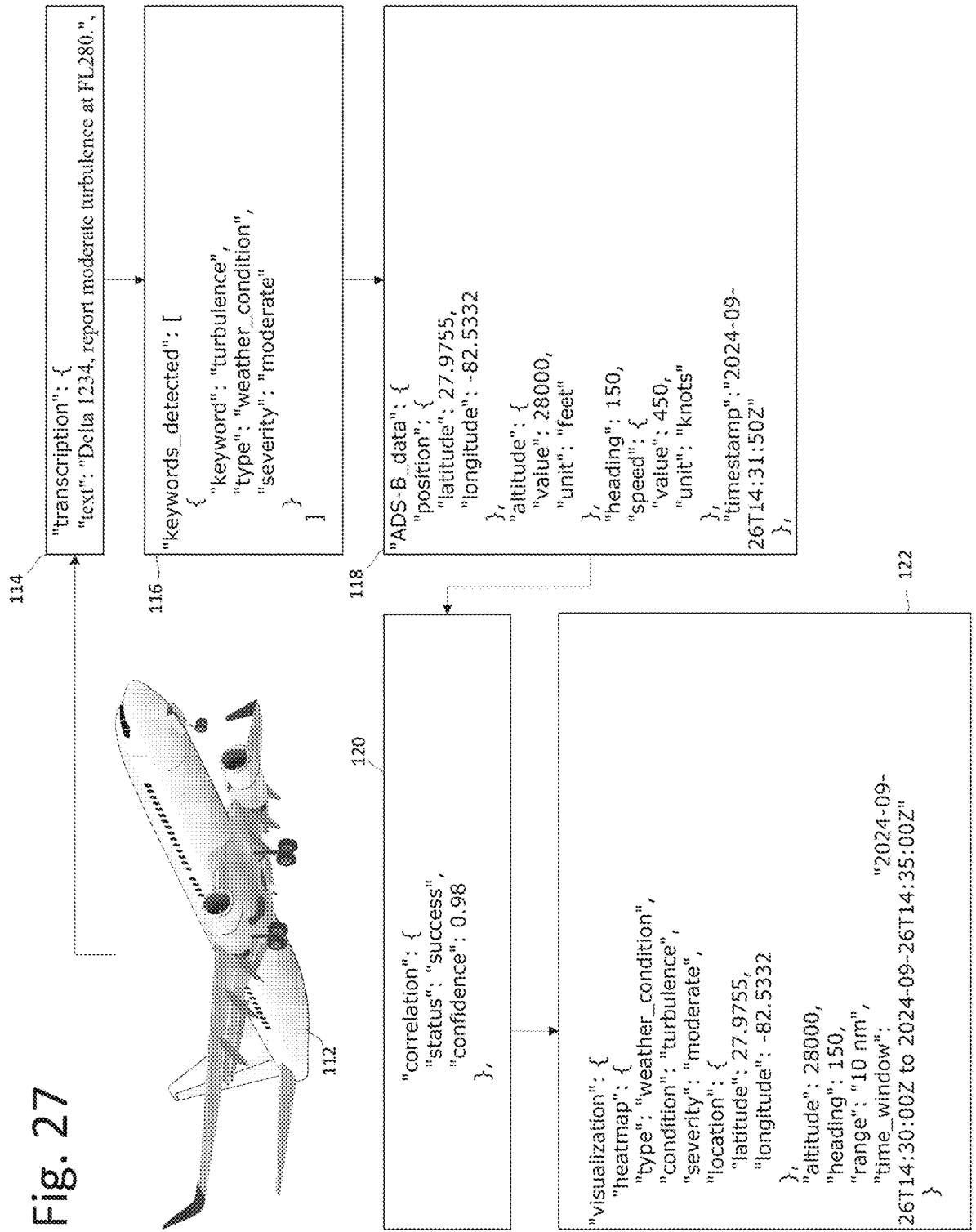
FIG. 27 is a diagrammatic view of an embodiment of the invention translating transcribed pilot communications to visualizations.
Figure 28:
FIG. 28 is an illustrative, top-down view of an embodiment of the invention translating a transcribed pilot communications of turbulence to a visualization.
Figure 29:
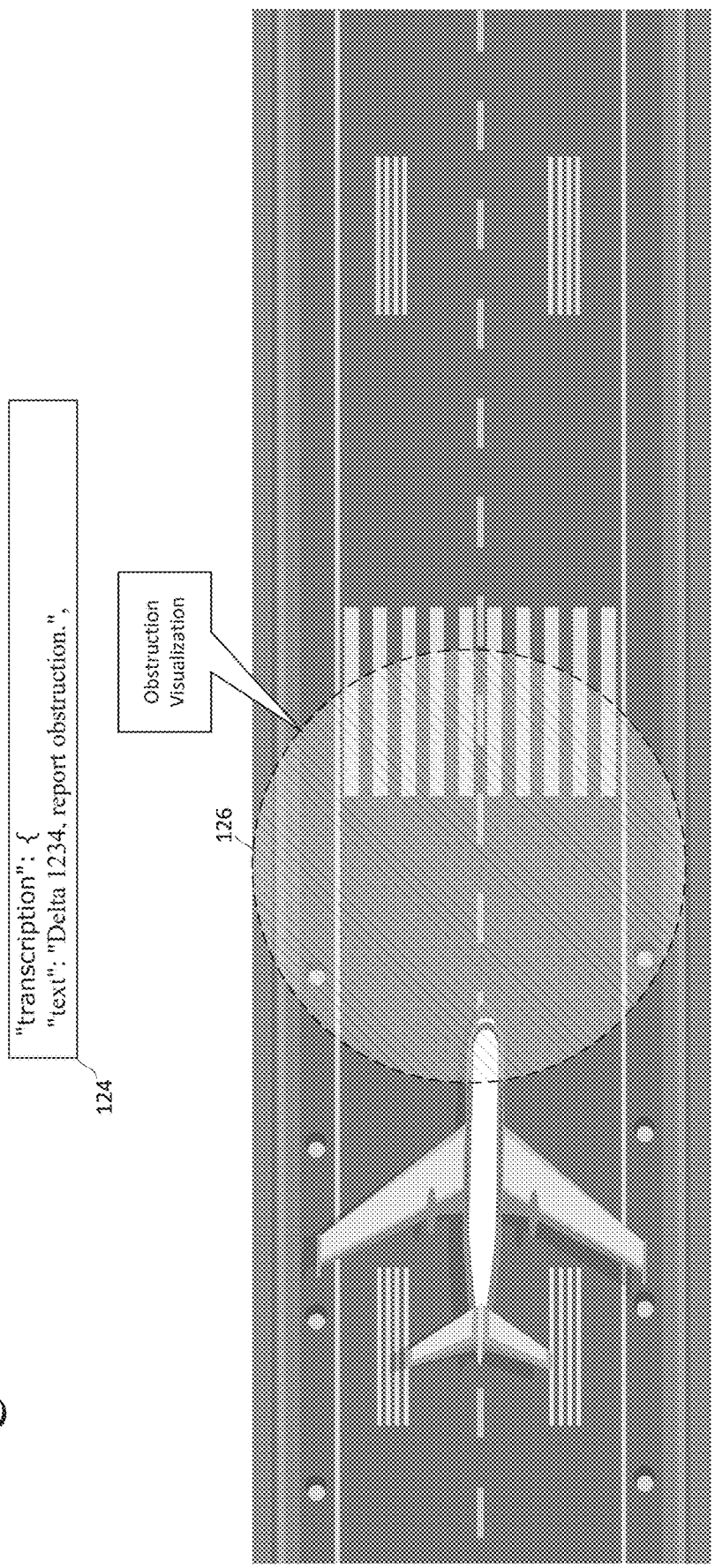
FIG. 29 is an illustrative, top-down view of an embodiment of the invention translating a transcribed pilot communication of an obstruction to a visualization.

This JSON structure captures a detailed record of ATC-pilot communication, mapping the detected keywords from the verbal exchange to corresponding ADS-B data. This is illustrated in FIG. 27 wherein aircraft 112 broadcasts the observation of moderate turbulence which is transcribed 114 for keyword detection 116 and correlated 118 with ADS-B data. This correlation is quantified 120 and then a visualization 122 is generated (see FIG. 28). As noted above, obstructions may also be noted and visualized as shown in FIG. 29. The communication_id field provides a unique identifier for each communication event, ensuring that it can be tracked or referenced in the system. The timestamp field marks the exact time at which the communication took place, ensuring that the data can be synchronized with other time-stamped flight data, such as the ADS-B feed.

The source field indicates the origin of the communication, which in this example is ATC. It specifies the type of source (ATC), the communication frequency used (125.4 MHz), and the location of the ATC facility, represented by the IATA code KTPA (Tampa International Airport). The destination field provides details about the aircraft receiving the communication. The aircraft is identified by its callsign (e.g., DAL1234 for Delta Airlines flight 1234), its unique ICA024 identifier (a hexadecimal code assigned to the aircraft by the International Civil Aviation Organization), and its registration number (e.g., N1234D). This ensures that the communication is accurately attributed to the correct aircraft, which is critical for mapping the verbal communication to the correct flight data.

The transcription field contains the transcribed text of the ATC communication as processed by a speech-to-text engine. In this example, the transcribed text includes a report of moderate turbulence at flight level (FL) 280. The system identifies specific keywords within the transcription, such as "turbulence," and classifies them based on type (in this case, "weather_condition"). The keywords_detected section also includes additional context, such as the severity of the reported condition (e.g., "moderate"). This structured format allows the system to process the verbal report in a meaningful way and prepares the data for correlation with other flight information.

The ADS-B_data section provides real-time data about the aircraft's position, altitude, heading, and speed. In this example, the aircraft is flying at an altitude of 28,000 feet, with a heading of 150 degrees and a speed of 450 knots. The position subsection includes the aircraft's geographic coordinates (latitude and longitude), which are crucial for correlating the location-specific ATC communication with the aircraft's actual position in the airspace. The timestamp within the ADS-B data section marks when this data was broadcast by the aircraft, enabling the system to synchronize the flight's operational data with the transcribed communication.

The correlation field shows the result of correlating the ATC communication with the ADS-B data. The status field (in this case, "success") indicates whether the system successfully matched the transcribed communication with the corresponding ADS-B data. The confidence score provides a quantitative measure of how closely the transcribed information aligns with the aircraft's actual position, heading, and operational parameters. A high confidence score (e.g., 0.98) suggests a strong match, meaning that the verbal report and the aircraft's ADS-B data are in close agreement.

The visualization field describes how the detected condition can be represented in graphical form, such as a heatmap. In this case, the system generates a heatmap for moderate turbulence, showing its location based on the aircraft's geographic position (latitude and longitude) and altitude (28,000 feet). The range field specifies the area affected by the reported condition (e.g., 10 nautical miles), and the time_window defines the period during which this condition was reported and observed (e.g., between 14:30:00 and 14:35:00 UTC). This visualization allows other aircraft, air traffic controllers, and relevant stakeholders to be informed about real-time flight conditions, thus improving situational awareness and decision-making in the airspace.

By automating the process of extracting keywords from ATC-pilot communications and correlating them with ADS-B data, the system provides valuable, location-specific information that can be used to enhance flight safety, generate alerts, and optimize air traffic management. Without the integration of ADS-B data, these verbal communications would lack important context. While a pilot might report "icing at 5,000 feet," the observation alone does not provide sufficient information for automated analysis or sharing. By correlating these verbal communications with ADS-B data, the system contextualizes the observation with position, altitude, heading, and speed, transforming the report into a highly valuable data point. The integration of both data types allows stakeholders to understand not only the condition being reported but also its precise location and potential impact on nearby airspace and flight operations.

Furthermore, the system's capacity to aggregate these reports over time enables it to generate historical visualizations, including heatmaps, that track patterns of reported conditions, such as persistent turbulence in a specific corridor or recurrent wind shear near certain airports. By cross-referencing multiple ATC-pilot exchanges and correlating them with ADS-B data, the system enhances its predictive capabilities. For example, if several aircraft report downdrafts over a specific waypoint during a specific time period, the system can alert upcoming flights about possible hazardous conditions in the area.

This process occurs seamlessly across all communications that are transcribed and analyzed by the system. Each verbal report is tagged with relevant ADS-B data, including the aircraft's identification, position, altitude, and heading, ensuring that every reported condition is automatically assigned its appropriate spatial and operational context. The result is a system that not only enhances real-time monitoring but also enriches post-flight analysis, supporting the overall safety and efficiency of flight operations.

Through automation, this invention streamlines the traditionally manual task of reporting flight conditions and makes the data more accessible, reliable, and actionable. Additionally, the system can log these observations into a permanent record, potentially integrating them with meteorological databases or pilot logbooks to offer a robust dataset that improves future flight planning, safety protocols, and decision-making processes.

Location-Based, ADS-B Validated Emergency Declarations

In aviation, an emergency declaration is a critical event requiring immediate attention from air traffic controllers and other relevant stakeholders. When a pilot declares an emergency, either by stating "Mayday" or "Pan-Pan" over the radio, the communication conveys urgent information about the aircraft's situation. The system described in the invention enhances the handling and analysis of these emergency declarations by automatically transcribing and processing the communication while integrating it with real-time or archived Automatic Dependent Surveillance-Broadcast (ADS-B) data.

This technology offers significant value in managing emergency situations by rapidly transcribing the communication and linking it to key flight parameters such as the aircraft's position, altitude, speed, and heading. For example, if a pilot declares an emergency with "Mayday, Mayday, Mayday, engine failure at 10,000 feet, Delta 1234," the system captures this communication and immediately extracts the relevant details using natural language processing (NLP). The engine failure, current altitude, and aircraft identification are all transcribed and placed into a structured data format.

Once the emergency is identified in the transcription, the system correlates it with ADS-B data to map the aircraft's exact location and operational status. In the example of the engine failure, the ADS-B data provides the aircraft's position (latitude and longitude), current altitude, and speed. By combining the emergency declaration with the ADS-B feed, the system can generate a precise snapshot of the aircraft's situation in real-time. The communication thread between the pilot and ATC can be continuously monitored and stitched together to form a comprehensive record of how the emergency is being handled, ensuring no critical information is lost.

In many emergency situations, quick and accurate situational awareness is essential. The system's ability to automatically align the transcribed communication with the aircraft's ADS-B data enables ATC, search and rescue teams, and other stakeholders to receive an immediate, accurate picture of the event. This is particularly valuable in emergencies such as engine failures, cabin depressurization, medical emergencies, or fire on board, where rapid responses and clear communication are vital to ensuring the safety of passengers and crew.

Moreover, the system can automatically issue alerts based on predefined emergency keywords and their semantic equivalents, including "engine failure," "fuel emergency," or "loss of pressurization." These alerts could be shared with relevant stakeholders such as nearby aircraft, emergency services, or ground personnel, providing them with critical information about the nature of the emergency and the affected aircraft's position. For example, if a pilot declares "Pan-Pan, low fuel," the system can generate an immediate alert that includes the aircraft's current altitude, position, and remaining fuel status (if available through additional sensor data).

The ability to automatically map emergency declarations to location-based data also allows the system to create visualizations that can aid in decision-making. For instance, if an aircraft declares an emergency while approaching a busy airport, the system can generate a heatmap showing the aircraft's position in relation to other traffic in the area. This enables air traffic controllers to assess potential conflicts and clear the airspace for the emergency aircraft to make an expedited landing. In the event of an off-airport landing or crash, the last known ADS-B data, correlated with the emergency communication, provides critical information for search and rescue operations.

In situations where ADS-B data may be temporarily unavailable or incomplete, the system continues to process the emergency communication and can infer the aircraft's likely position based on known geographic waypoints, ATC instructions, and the aircraft's flight plan. For example, if the pilot reports "Mayday, Delta 1234, engine failure, diverting to Runway 12 at Tampa," the system can use its knowledge of Tampa International Airport's layout, the position of Runway 12, and the aircraft's prior location to estimate the aircraft's trajectory and position.

Additionally, this system can be used in post-flight analysis of emergency situations, allowing stakeholders to review the transcription of the ATC-pilot communication alongside the recorded ADS-B data. This detailed record can provide valuable insights into how the emergency unfolded, the pilot's response, and how ATC managed the situation. This post-event analysis is crucial for improving safety protocols, training, and emergency preparedness in aviation.

In the event of an emergency declaration such as "Mayday, Mayday, Mayday, Delta 1234, we have a loss of cabin pressure at 30,000 feet," the system would process this communication through multiple steps to convert it into structured data and map it to Automatic Dependent Surveillance-Broadcast (ADS-B) data. This process involves transcribing the verbal communication, identifying keywords related to the emergency, correlating these with real-time ADS-B data, and applying additional logic to detect anomalous flight characteristics, such as rapid descent, in correlation with the emergency.

Transcription of Emergency Declaration

When the pilot broadcasts the emergency using the phrase "Mayday," the system immediately flags the communication as a high-priority event. The speech-to-text engine trained on aviation-specific terminology converts the verbal exchange into structured text data. Key elements such as "Mayday," "loss of cabin pressure," and "30,000 feet" are identified as critical information. The system recognizes the severity of the event through the "Mayday" keyword, which is an internationally recognized distress signal.

Structuring the Transcription

Once the communication is transcribed, the system generates a structured data set. Here is an example of how the structured data from the emergency declaration could appear in JSON format:

```
{
    "communication_id": "comm_789456",
    "timestamp": "2024-09-26T14:45:00Z"
    "source": {
        "type": "ATC",
        "frequency": "121.5",
        "location": "KATL"
    },
    "destination": {
        "type": "Aircraft",
        "callsign": "DAL1234",
        "icao24": "A1B2C3",
        "registration": "N1234D"
    },
    "transcription": {
        "text": "Mayday, Mayday, Mayday, Delta 1234, we have a loss of cabin pressure at 30,000 feet.",
        "keywords_detected": [
```

```
        },
            "keyword": "Mayday",
            "type": "emergency_condition"
        },
        {
            "keyword": "loss of cabin pressure",
            "type": "system_failure",
            "severity": "critical"
        },
        {
            "keyword": "30,000 feet",
            "type": "altitude",
            "value": 30000,
            "unit": "feet"
        }
        ]
    }
}
```

In this structured data, the communication_id ensures unique tracking of the emergency event, while timestamp marks the exact time of the communication. The source (ATC) and destination (the aircraft) provide context for where the communication occurred, and the transcription field captures the keywords and their associated meanings. The "Mayday" keyword signifies a distress event, and "loss of cabin pressure" indicates a system failure at an altitude of 30,000 feet.

Correlation with ADS-B Data

Once the communication has been transcribed and structured, the system retrieves real-time ADS-B data to provide critical context about the aircraft's current status. ADS-B data includes the aircraft's position, altitude, heading, and speed at the moment the communication was made. Here is an example of how the ADS-B data might appear:

```
{
    "ADS-B_data": {
        "position":
            "latitude": 33.6407,
            "longitude": -84.4277
        },
        "altitude": {
            "value": 30000,
            "unit": "feet"
        },
        "heading": 180,
        "speed": {
            "value": 450,
            "unit": "knots"
        },
        "timestamp": "2024-09-26T14:45:10Z"
    }
}
```

Logic-Based Analysis:

The system then applies a set of logic rules to interpret the ADS-B data in the context of the emergency declaration. In this case, the logic would check for anomalous flight characteristics that could accompany a loss of cabin pressure, such as a rapid descent. The system would expect the aircraft to initiate a descent after the emergency declaration, as this is a standard response to cabin depressurization. To monitor this, the system would generate anticipated ADS-B values, such as a decrease in altitude and changes in speed, and compare these to the actual data received. For example:

Expected Flight Characteristics Post-Cabin Pressure Loss

Descent: The altitude should decrease by 500-2,000 feet per minute.

Speed: Airspeed may decrease initially due to altitude loss but could stabilize as the aircraft reaches a safe altitude.

Heading: Minor heading adjustments may occur, but the overall direction should remain consistent unless rerouted.

The system applies a checklist of these expected values and cross-references the real-time ADS-B data to assess how quickly the aircraft responds. In this case, the system would check if the aircraft initiated a descent within a defined time window (e.g., 10-30 seconds) after the emergency declaration.

Timecode Evaluation

The timecode is crucial for evaluating how quickly the aircraft responds to the emergency declaration. If the pilot declares "Mayday" at 14:45:00, the system can evaluate the ADS-B data starting from that timestamp to monitor for any significant changes in altitude. Here is an example of the time-based analysis:

```
{
    "timecode_analysis": {
        "communication_time":           "2024-09-26T14:45:00Z",
        "adsb_change_time": "2024-09-26T14:45:20Z",
        "response_time": "20 seconds",
        "expected_response_time_range":     "10-30 seconds",
        "anomaly_detected": false
    }
}
```

In this example, the system evaluates the time between the communication of the emergency and the moment the ADS-B data reflects a descent, determining that it took the pilot 20 seconds to initiate a response, which falls within the expected range. If the system detected a delay outside of this range (e.g., 60 seconds or more), it would flag this as an anomaly for further investigation.

Conveying Data to Stakeholders:

After the system processes the emergency declaration and correlates it with ADS-B data, it generates reports or real-time alerts that can be shared with stakeholders such as air traffic controllers, emergency response teams, and airline operators. Here's an example of structured output for stakeholders:

```
{
    "emergency_report":{
        "communication_id": "comm_789456",
        "timestamp": "2024-09-26T14:45:00Z"
        "aircraft": {
            "callsign": "DAL1234",
            "altitude_at_declaration": 30000,
            "current_altitude": 28500,
            "rate_of_descent": "1500 feet per minute",
            "heading": 180,
            "speed": 430
        },
        "emergency_type": "loss of cabin pressure",
        "remedial_action": {
            "response_time": "20 seconds"
            "expected_response_range": "10-30 seconds"
            "action_taken": "descent initiated"
        },
        "anomaly_detected": false
    }
}
```

This structured output provides key information, such as the nature of the emergency (loss of cabin pressure), the aircraft's altitude at the time of the declaration, and how quickly the descent was initiated. It shows that the descent rate is within the expected range, and no anomalies were detected. This data can be visualized in dashboards or heatmaps, allowing stakeholders to monitor the situation in real-time.

Visualization and Data Sharing:

In addition to the structured report, the system may generate visualizations like heatmaps or altitude graphs showing the aircraft's descent in real-time. This helps stakeholders visualize the progression of the emergency response, ensuring they can act quickly and effectively. This also facilitates post-flight analysis to determine the adequacy of the response and identify areas for improvement.

Computer and Software Technology

To enable the aviation-specific functionalities of the present invention, the system architecture must integrate various aviation technologies with robust computer hardware, software, and network infrastructure. These technologies facilitate the collection, processing, and transmission of real-time and archived aviation data, including Automatic Dependent Surveillance-Broadcast (ADS-B) signals, air traffic control (ATC) voice communications, flight plans, and FAA System Wide Information Management (SWIM) data. The integration of VHF communications, real-time data retrieval, and archive storage capabilities ensures that the invention provides a comprehensive framework for monitoring and validating aircraft operations.

A critical component of the system is the ability to capture and process VHF communications between ATC and pilots. These communications are typically transmitted via dedicated VHF frequencies, using specialized hardware such as VHF receivers and antennas. In an aviation context, VHF communication operates within the 118.0 to 137.0 MHz range. To facilitate the real-time reception and archiving of these communications, the system must include VHF communication receivers capable of scanning multiple frequencies simultaneously. Such receivers may be integrated with software-defined radio (SDR) technology, which allows the system to tune into and decode VHF signals digitally. The SDR can digitize the analog radio signals and convert them into a format that is compatible with the computer's processing infrastructure, ensuring that both voice and data communications can be captured.

Once captured, the VHF communications are passed through a transcription engine based on natural language processing (NLP) techniques. This transcription engine is trained on aviation-specific phraseology, including standard ATC instructions, pilot acknowledgments, and emergency protocols (e.g., "Mayday" or "Pan-Pan"). The transcription engine may utilize open-source or proprietary models for speech-to-text conversion, with programming languages like PYTHON or C++ handling the core transcription algorithms. The transcribed communications are subsequently structured into a predefined data format, such as JSON or XML, which can be easily processed by the system's backend.

In addition to real-time VHF communications, the invention requires the ability to interface with ADS-B data streams. ADS-B is a surveillance technology in which aircraft periodically broadcast information about their identity, position, altitude, speed, and heading. The system may connect to an ADS-B ground station or use an ADS-B API, such as the one provided by FLIGHTAWARE, to retrieve real-time and historical flight data. ADS-B ground stations are located at strategic points across the globe and receive transmissions from aircraft. The data is either processed locally or relayed to cloud-based servers for further analysis. The system may also rely on FLIGHTAWARE or similar services to retrieve flight plan data and augment the ADS-B signals with additional flight information, such as airline schedules, weather conditions, and airspace restrictions.

For military aircraft, which may not consistently broadcast full ADS-B data due to operational security reasons, the invention can retrieve SWIM data from the FAA's data-sharing infrastructure. SWIM provides access to a wide variety of aviation data, including flight plans, airspace usage, and NOTAMs (Notices to Airmen), and it can be used to fill gaps in surveillance. SWIM data may include flight position updates for non-ADS-B-equipped aircraft, such as military planes operating in sensitive areas. To access SWIM data, the system must implement APIs that communicate with FAA servers using secure protocols such as HTTPS and OAuth for authentication. The SWIM data can be processed and correlated with other data streams, such as VHF communications and flight plans, to provide a comprehensive picture of air traffic.

In parallel with ADS-B and VHF communications, the system integrates flight plan data to anticipate the frequencies an aircraft will use throughout its journey. Flight plans are typically filed using the ICAO flight plan format and stored in FAA databases. These flight plans provide detailed information about an aircraft's route, cruising altitude, and waypoints, which the system can use to predict ATC frequency changes. The system parses flight plan data to determine when an aircraft will enter or exit specific ATC regions, enabling the preloading of relevant frequencies. This ensures that the system can stitch together ATC-pilot communications seamlessly as the aircraft transitions between air traffic sectors.

To manage the data collected from VHF communications, ADS-B signals, and SWIM data, the system may employ a combination of on-premise and cloud-based storage solutions. There are several third-party providers that offer access to recorded VHF communications on aviation frequencies, primarily targeting aviation enthusiasts, pilots, and researchers. One of the more prominent services is LiveATC.net, which streams live air traffic control (ATC) communications from various locations worldwide. This service captures VHF radio transmissions from both ground stations and aircraft, covering major airports, enroute control centers, and various air traffic sectors. In addition to live streams, LiveATC.net also provides archived recordings, which can be useful for post-flight analysis or review of ATC-pilot interactions.

Real-time data may be stored in RAM or flash memory for immediate processing, while longer-term data is archived in relational databases or object storage services. Cloud-based services, such as AMAZON WEB SERVICES (AWS) or MICROSOFT AZURE, provide scalable storage and processing capabilities. These platforms allow the system to store petabytes of aviation data, ensuring that archived communications and flight data are available for future analysis. Data storage is designed to comply with industry standards for redundancy and disaster recovery, with frequent backups and replication across multiple data centers to ensure data integrity.

The system's software architecture may be built on microservices, ensuring modularity and scalability. Each service, such as transcription, ADS-B processing, and SWIM data retrieval, operates independently and communicates with other services through APIs. This architecture facilitates horizontal scaling, enabling the system to handle an increasing volume of data as more aircraft are monitored. The microservices may be deployed in containerized environments, using technologies such as DOCKER or KUBERNETES, to ensure that the system can be easily updated and maintained without interrupting service. This allows continuous deployment of new features and improvements, such as more accurate transcription models or expanded SWIM data sources.

To visualize the data processed by the system, a graphical user interface (GUI) provides real-time dashboards and reporting tools. The GUI displays the transcribed ATC communications alongside ADS-B flight data, providing a clear picture of an aircraft's current position, heading, and altitude. It also generates alerts based on predefined rules, such as deviations from a flight plan or rapid altitude changes indicative of an emergency. The GUI may also provide heatmaps or other visualizations for reporting significant events, such as turbulence or emergency declarations. These visualizations are rendered using modern web technologies, such as JAVASCRIPT and WebGL, to ensure that they are responsive and accessible from any device.

The entire system relies on robust security protocols to protect sensitive aviation data. Communications between system components, such as APIs and databases, are encrypted using SSL/TLS protocols. Access to SWIM, ADS-B, and flight plan data is restricted to authenticated users through role-based access control (RBAC), ensuring that only authorized personnel can retrieve or modify the data. Logging and monitoring are implemented throughout the system to detect unauthorized access attempts or data breaches, with alerts sent to system administrators in real-time.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Smart Device Integration Technology

In embodiments of the invention related to pilot logbooks, portable smart devices such as IPHONES or ANDROID smartphones equipped with integrated technologies like accelerometers, GPS, and imaging can be used to cross-check and validate the accuracy and completeness of flight log entries. These devices, often carried by pilots, provide a real-time source of data that can be directly correlated with the recorded flight parameters in the logbook, offering an automated and reliable method to ensure that the logbook reflects accurate flight details.

The GPS functionality in devices such as IPHONES and ANDROID smartphones enables precise tracking of the aircraft's position throughout all phases of the flight, including taxiing, takeoff, cruise, and landing. The real-time GPS data collected from the smartphone can be used to verify the departure and arrival locations noted in the pilot logbook. By comparing the flight path recorded by the device with the flight path documented in the logbook, the system can detect any discrepancies between the two, ensuring that the logbook entry corresponds to the actual route flown.

In addition, accelerometers built into IPHONES and ANDROID smartphones provide detailed data on the aircraft's movement and velocity. These sensors can detect changes in speed, altitude, and other dynamic forces acting on the aircraft, such as during takeoff, landing, and any significant in-flight maneuvers. This data allows the system to verify the time of various flight phases, cross-checking logbook entries that reflect time in-flight, takeoff and landing times, and any unusual events such as turbulence or rapid altitude changes.

Smartphones also provide imaging capabilities that can be used to capture visual records of key flight information. For instance, a pilot may use the camera on their device to photograph cockpit instruments or document critical data during the flight, such as fuel levels, engine performance, or visual conditions. This photographic evidence can be integrated into the logbook cross-checking process, offering another layer of verification for the entries made by the pilot.

In addition to these features, smartphones' wireless communication capabilities allow them to access flight data from external sources such as Automatic Dependent Surveillance-Broadcast (ADS-B) and air traffic control (ATC) systems. The system can retrieve and compare ADS-B data received in real time or from archival repositories to verify the aircraft's altitude, position, and heading against the data provided by the smartphone. This comparison ensures that all information logged in the pilot's flight log is accurate and matches with actual flight operations as reported by external aviation data sources.

The invention uses the smart device's integrated GPS data to create detailed timelines of a pilot's flight activities. For example, it can automatically log the time at which the aircraft departs, climbs to cruising altitude, descends, and finally lands, enabling a cross-check of the logbook's recorded times for each flight segment. Similarly, the accelerometer's data on takeoff and landing forces can be compared against the pilot's recorded log entries to ensure that specific flight conditions are accurately documented, such as the number of takeoffs and landings in a day.

By leveraging these features in IPHONES and ANDROID smartphones, the system enhances the accuracy and reliability of pilot logbooks, automating much of the verification process by correlating smartphone-collected data with the data manually entered by the pilot. The use of these smart devices not only reduces the likelihood of errors or omissions in the logbook but also provides a more comprehensive record of the pilot's flight activities, ensuring compliance with aviation regulations and increasing the overall integrity of the flight documentation. This cross-checking method allows for a more automated and seamless integration of flight data into pilot records, benefiting both pilots and regulatory authorities in validating pilot experience and qualifications.

Proof of Concept Development in API Alignment

The proof of concept was developed to automate the auditing and reconciliation of electronic flight logbook data using SUPABASE and FLIGHTAWARE, providing a robust system for ensuring the accuracy and integrity of flight records. This system cross-references logbook entries with real-time and historical flight data, leveraging SUPABASE as the backend infrastructure and FLIGHTAWARE for flight tracking information. SUPABASE, an open-source Firebase alternative, offers backend services including a relational database, real-time capabilities, and authentication, while FLIGHTAWARE provides comprehensive flight tracking and analytics through its global aviation data services.

The implementation starts by configuring an Express.js server, which serves as the foundation for handling HTTP requests and responses. Running on port 3000, the server ensures accessibility for local development and testing. Several core libraries are imported, including express for server functionality, @supabase/supabase-js for interacting with SUPABASE, node-fetch for making external API requests, and cors for enabling Cross-Origin Resource Sharing, which is necessary to allow the server to handle requests from different origins.

SUPABASE plays a key role in this implementation by managing the relational database where flight logbook data is stored and processed. It provides the flexibility and scalability needed for the system, allowing efficient storage, querying, and real-time updates. The SUPABASE client is configured with a URL and API key to establish a secure connection to the project. SUPABASE's integration of PostgreSQL ensures that data management is both robust and reliable, while its built-in authentication and authorization mechanisms offer a secure environment for managing sensitive flight logbook data.

The server defines multiple API endpoints for managing and processing flight logbook data. The root endpoint (/) returns a simple welcome message, prompting users to use the/process-data route, which handles the core functionality of retrieving and processing flight data. The/process-data endpoint takes a pilot_id as a query parameter, allowing the system to retrieve the corresponding pilot's logbook entries from the logbooks table in SUPABASE. Each entry includes critical details such as flight date, aircraft ID, time off, and time on.

For each logbook entry, the system calculates a date range that spans 60 hours before and after the logged times to ensure comprehensive data retrieval from FLIGHTAWARE. The extended time window allows for any variations in reporting times or delays, ensuring that all relevant data is captured. A request URL is then constructed for the FLIGHTAWARE API using this calculated date range and the aircraft ID.

FLIGHTAWARE provides extensive real-time and historical flight data, which includes metrics such as flight status, departure and arrival information, and operator details. The system retrieves this data via API calls and processes it to handle any missing or invalid entries. Once the data is retrieved, it is enriched with additional details, including operator, flight status, and origin-destination information, to create a more comprehensive record. This enriched data is then inserted into a comparisondata table within SUPABASE, where it can be used for auditing and reconciliation purposes.

The/view-flight-data endpoint allows users to access cross-referenced flight data through a SUPABASE view (view_flight_data16). By providing a pilot ID, the user can retrieve detailed flight records that have been validated against FLIGHTAWARE data. The system also includes a /missed-logbooks route, which identifies logbook entries that might have been missed or overlooked. This route queries the missed_logbooks view and uses the FLIGHTAWARE API to check whether any associated flights have been blocked. By filtering out blocked flights, the system enhances the accuracy and reliability of the logbook audit. The results, including the block status, are then returned to the user.

The/pilot-summary endpoint provides a summarized overview of a pilot's flight history, retrieving data from the pilot_summary table in Supabase. This endpoint delivers high-level performance metrics, giving both pilots and administrators a quick snapshot of flight activity and performance over time.

The integration of these technologies ensures that the system processes real-time and historical data accurately, providing up-to-date and trustworthy flight records. FLIGHTAWARE's API offers detailed flight tracking, which is essential for reconciling logbook data with real-world flight operations, while SUPABASE's database capabilities ensure that all data is securely stored and managed. The server listens on the specified port, processing incoming requests and performing all the necessary data-handling tasks.

This proof of concept showcases the system's ability to automate the auditing and reconciliation of electronic flight logbooks, making the process more efficient and reliable. By integrating modern web technologies with aviation data services like FLIGHTAWARE, the system demonstrates scalability, flexibility, and real-world application in the aviation industry, where accuracy in flight records is crucial for compliance, safety, and operational efficiency. The use of APIs ensures that the system remains adaptable to real-time data changes, while the secure data handling infrastructure ensures long-term viability for auditing and analysis purposes.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

ADS-B means Automatic Dependent Surveillance-Broadcast, a surveillance technology that allows aircraft to determine their position via satellite navigation and periodically broadcast their location, velocity, altitude, and identification. This enables aircraft to be tracked without pilot input or air traffic control requests, enhancing situational awareness and safety. ADS-B provides real-time, accurate tracking, especially in areas with limited radar coverage, reducing the risk of collisions and runway incursions. The system supports various applications, including improved air traffic management, enhanced search and rescue operations, and more efficient flight operations, ultimately contributing to safer and more efficient air travel.

Air Traffic Control (ATC) means a service provided by ground-based controllers who coordinate the movement of aircraft on the ground and in the air. ATC ensures safe aircraft separation, manages traffic flow, and provides pilots with crucial information regarding weather, clearances for takeoff, altitude changes, heading adjustments, and instructions for landing. ATC communications occur across various frequencies, depending on the flight phase-ground control during taxiing, tower control for takeoff and landing, and en-route control at altitude. In software implementations, ATC communications can be captured, processed using speech-to-text engines, and cross-referenced with Automatic Dependent Surveillance-Broadcast (ADS-B) data for real-time or post-flight validation of aircraft compliance with ATC instructions. The system may use natural language processing (NLP) to convert spoken instructions into structured data that can be validated against real-time flight data for safety and compliance purposes.

Audio File means a digital file format that stores sound recordings, including voice communications between air traffic controllers (ATC) and pilots. In the context of this invention, audio files are generated from the real-time or recorded communications between ATC and aircraft. These files are processed through speech-to-text engines, which convert voice data into transcribed text that can then be further analyzed. The transcribed communications are embedded into metadata fields within the audio file or a separate digital file, allowing cross-referencing with ADS-B data for real-time validation of pilot actions. A software developer would design the system to automatically generate and tag these audio files with timecodes, frequency changes, and correlated ADS-B data to create a unified record of aircraft operations.

Auditing module means a system component designed to detect discrepancies between electronic flight logbook data and archived ADS-B data. It generates audit reports based on these discrepancies, categorizing them by severity and issuing alerts for significant issues. The auditing module ensures data integrity and accuracy, providing stakeholders with reliable information about flight logs and helping maintain compliance with regulatory standards. This module can also help identify patterns or recurrent issues in flight logs, aiding in the development of corrective actions and improvements in flight operations and safety.

Blockchain means a decentralized digital ledger technology where data is stored in blocks and chronologically linked. Every block contains a cryptographic hash of the previous block, ensuring data integrity and immutability. This technology provides a secure, transparent, and tamper-proof method for recording transactions or data entries, making it highly suitable for applications requiring high levels of trust and verification. In the context of flight logbook auditing, blockchain ensures that recorded flight data remains unaltered and verifiable, providing a reliable record for regulatory compliance and historical reference.

Cloud Decks means layers of clouds observed at distinct altitude levels. Cloud decks are significant in aviation as they can influence visibility and flight conditions. Pilots must consider cloud decks when planning and executing flights, especially under Instrument Flight Rules (IFR). Different cloud layers can affect an aircraft's approach, landing, and departure procedures. Accurate information about cloud decks helps pilots navigate safely, avoiding potential hazards such as severe turbulence or reduced visibility that could compromise flight safety.

Cross-referencing module means a system component configured to compare electronic flight logbook data with archived ADS-B data. This module uses algorithms, including machine learning, to match data accurately between the two sources. By cross-referencing data, the module identifies inconsistencies and discrepancies, ensuring that the logged information is accurate and reliable. This process helps maintain the integrity of flight records and supports the verification and validation of pilot log entries against independent data sources.

Cruising Altitude refers to the altitude at which an aircraft maintains a steady, level flight during the enroute portion of a journey. Typically assigned by ATC, the cruising altitude is crucial for ensuring safe separation between aircraft on similar flight paths. In the context of this invention, cruising altitude is an operational parameter included in ATC communications and is cross-referenced with real-time ADS-B data to ensure that the aircraft follows ATC instructions. For example, if ATC assigns a cruising altitude of 35,000 feet, the ADS-B data would be used to verify that the aircraft is maintaining that altitude throughout the enroute phase of the flight. This ensures compliance with safety standards and proper flight operations.

Data integrity module means a component that verifies the authenticity and completeness of electronic flight logbook data and archived ADS-B data before cross-referencing. This module ensures that the data being compared is accurate and has not been tampered with, maintaining the integrity of the audit process. It checks for data corruption, unauthorized modifications, and ensures that all necessary data fields are present and correctly formatted. This module plays a crucial role in safeguarding the reliability of the audit system.

FAA means the Federal Aviation Administration, the national aviation authority of the United States responsible for the regulation and oversight of civil aviation within the U.S. The FAA sets safety standards for aircraft, pilots, and airports and oversees the certification and operation of these entities to ensure compliance with federal regulations. The FAA's responsibilities include air traffic control, airport safety, and the enforcement of regulations designed to protect the safety and efficiency of air travel.

Facial Recognition means a biometric software application capable of uniquely identifying or verifying a person by comparing and analyzing patterns based on the person's facial contours. In aviation, facial recognition can be used for secure access control, pilot identity verification, and enhancing security measures. This technology reduces the risk of unauthorized access and helps maintain the integrity of flight operations by ensuring that only authorized personnel are allowed to operate aircraft or access sensitive areas.

Flight Conditions means the environmental and atmospheric circumstances encountered during a flight. These can include weather phenomena, air traffic, and operational constraints. Flight conditions play a critical role in flight planning and execution, affecting decisions such as route selection, altitude, and speed adjustments. Adverse flight conditions, such as severe weather or high traffic congestion, can pose significant challenges to pilots and air traffic controllers, necessitating careful monitoring and management to ensure flight safety.

Flight Plan means a document detailing the intended path, altitude, and duration of an aircraft's flight. Flight plans are typically filed with aviation authorities to ensure safe and coordinated use of airspace. They include critical information such as departure and destination airports, waypoints, expected flight times, and alternate airports in case of emergencies. Filing a flight plan helps air traffic controllers manage airspace efficiently and provides a reference for search and rescue operations if needed.

Frequency Stitching means the process of stitching together communications that occur across multiple radio frequencies as an aircraft transitions through various airspace sectors. As aircraft move from one air traffic control sector to another, they must switch radio frequencies to communicate with different controllers. This process creates segmented audio files tied to each frequency. The invention's frequency stitching capability ensures a continuous communication log by automatically detecting frequency-switching instructions and stitching together the audio or transcribed communications across multiple frequencies. The system monitors for ATC-issued instructions to switch frequencies and captures both the instructions and the pilot's acknowledgment. A software implementation would track these transitions using timecode metadata to preserve the continuity of the communication thread.

Geospatial correlation means the process of using geographical data to match and analyze the flight paths recorded in electronic flight logbooks with those from archived ADS-B data. This technique ensures that the spatial aspects of the flight data align accurately, providing a comprehensive validation of the recorded flight paths. Geospatial correlation is essential for detecting discrepancies and ensuring that the flight logs accurately reflect the actual paths flown by the aircraft.

Glide Slope means a reference path for a descending aircraft, typically used during the approach phase of a flight. The glide slope ensures the aircraft descends at the proper rate and angle for a safe landing. It is usually indicated by an Instrument Landing System (ILS) at airports, providing pilots with vertical guidance to maintain the correct approach angle. Adhering to the glide slope helps prevent controlled flight into terrain and ensures a smooth and safe landing.

GPS (Global Positioning System) means a satellite-based navigation system allowing the determination of precise location (longitude, latitude, and altitude) anywhere on Earth. GPS is essential for modern aviation, providing accurate position data for navigation, flight planning, and tracking. It enhances situational awareness, allowing pilots to navigate with precision and reliability. GPS data is also used in conjunction with other systems like ADS-B to improve the accuracy and safety of air traffic management.

GUI means Graphical User Interface, a visual interface that allows users to interact with the system through graphical elements such as windows, icons, and buttons. The GUI in the context of this system displays audit results and discrepancy details, making it easier for users to review and analyze the information. A well-designed GUI enhances user experience by providing intuitive and efficient access to system functionalities and data visualizations.

IFR (Instrument Flight Rules) means a set of regulations governing the flight of aircraft in conditions where flight by outside visual reference is not safe. IFR flight relies on instruments in the cockpit and navigation aids to maintain safe flight operations. These rules are essential for flying in poor visibility conditions, such as in clouds, fog, or heavy precipitation. IFR ensures that aircraft can navigate safely and avoid collisions even when visual cues are unavailable.

IMC (Instrument Meteorological Conditions) means weather conditions that require pilots to fly primarily by reference to instruments, and not by outside visual references. Under IMC, flight is typically governed by IFR regulations. IMC conditions include scenarios such as heavy clouds, fog, or storms that obscure the pilot's view outside the cockpit. Pilots must rely on their instruments and air traffic control guidance to navigate safely in IMC.

Logbook means an electronic record-keeping system that stores flight data including aircraft identification, flight path, altitude, speed, and timestamps. This logbook serves as a comprehensive record of a pilot's flight history, which can be audited and cross-referenced with other data sources to ensure accuracy and compliance. The logbook is essential for maintaining accurate records of pilot experience, qualifications, and flight operations.

Metadata refers to data that provides information about other data. In the context of the invention, metadata is attached to both audio and text files generated from ATC and pilot communications. This metadata includes information such as timecode, geographic position, aircraft identification, and frequency changes, enabling the system to synchronize transcribed communications with ADS-B data. Metadata plays a critical role in ensuring the accuracy and context of the transcription by providing the temporal and geographic markers that allow flight communications to be validated against real-time or archived flight data. Software developers would implement metadata tagging at each stage of data processing to maintain accurate and actionable records.

METAR means an international standard for reporting weather observations at airports. METAR reports typically provide information on temperature, dew point, wind speed and direction, precipitation, cloud cover, and visibility. These reports are issued regularly and are crucial for pilots and air traffic controllers in planning and executing flights. Accurate and timely METAR reports help ensure flight safety by providing up-to-date weather information.

Natural Language Processing (NLP) means a field of artificial intelligence (AI) that focuses on the interaction between computers and human language. NLP in the context of the present invention involves processing the communications between ATC and pilots by converting spoken language into text using speech-to-text engines. The system then applies NLP algorithms to analyze the structure and content of the transcribed communications, detecting key operational instructions (e.g., altitude changes, heading adjustments, frequency transitions). This processed text is used to verify the pilot's compliance with ATC instructions by mapping it against ADS-B data. Software developers would train NLP models on aviation-specific datasets to ensure accurate recognition and parsing of aviation phraseology, accents, and regional dialects in real-time.

Ramp Area means the section of an airport where aircraft are parked, loaded or unloaded, refueled, or boarded. The ramp area is a critical part of airport operations, supporting various ground handling activities essential for preparing aircraft for departure and arrival. Proper management and safety protocols are necessary in the ramp area to prevent accidents and ensure efficient ground operations.

Runway means a defined area on an airport prepared for the landing and takeoff of aircraft. Runways are typically constructed of asphalt or concrete and are designed to support the weight and speed of aircraft during these critical phases of flight. Runway markings, lighting, and signage are essential for guiding pilots during takeoff and landing operations, ensuring safety and efficiency.

Runway Exertions means the forces applied to the runway by aircraft during operations such as landing or take-off. These forces can affect the structural integrity of the runway and influence maintenance requirements. Monitoring runway exertions helps in planning maintenance and repairs, ensuring that runways remain safe and operational for aircraft use.

Sampling Rate (of ADS-B data) refers to the frequency at which data is collected from ADS-B transmissions. ADS-B broadcasts real-time information about the aircraft's position, altitude, speed, and heading. In the context of this invention, the system dynamically adjusts the sampling rate based on the flight phase. During high-activity phases like takeoff, landing, and altitude changes, the system increases the sampling rate to capture more granular data, ensuring the system accurately reflects rapid operational changes. During low-activity phases, such as level flight at cruising altitude, the sampling rate can be reduced to optimize system performance and storage capacity without compromising operational oversight. Developers would implement algorithms to modify the sampling rate based on predefined flight phase triggers.

Speech-to-Text Engine refers to the software system responsible for converting spoken words into written text. In the context of this invention, a speech-to-text engine trained on aviation-specific phraseology and terminology processes the real-time or recorded communications between pilots and ATC. The engine captures critical instructions such as altitude changes, heading adjustments, and frequency switches, converting these spoken communications into structured data for analysis. The engine's accuracy is crucial for correlating transcribed ATC instructions with real-time ADS-B data. Developers implementing this feature would need to train the engine on a robust aviation dataset, ensuring it can recognize and process specialized language, varying accents, and ambient noise levels.

SWIM means System Wide Information Management, a data-sharing infrastructure used by the FAA to facilitate the exchange of aviation information. SWIM supports the collection, processing, and distribution of data such as flight plans, weather information, and surveillance data, enhancing situational awareness and decision-making in air traffic management. SWIM enables seamless information flow among various stakeholders, improving the efficiency and safety of air traffic operations.

Take Off Roll means the phase of flight in which an aircraft transitions from ground movement to airborne status, primarily relying on the forward motion generated by its engines. The takeoff roll involves accelerating along the runway until the aircraft reaches a speed sufficient for lift-off. This phase is critical as it requires precise control and coordination to ensure a safe and successful departure.

Taxiway means a designated path on an airport connecting runways with terminals, hangars, run-up pads, and other facilities. Aircraft use taxiways to move to and from runways and parking areas. Proper taxiway management is essential for efficient ground traffic flow and minimizing delays. Taxiways are equipped with markings and lighting to guide pilots during taxi operations, ensuring safe and orderly movement on the ground.

Temporal alignment means the synchronization of electronic flight logbook data and archived ADS-B data to ensure that the time stamps of the recorded events match accurately. This alignment is crucial for comparing data sets and identifying discrepancies, as it ensures that events are correlated correctly in time. Temporal alignment helps in creating an accurate and reliable audit trail, essential for validating flight logs and ensuring regulatory compliance.

Timecode means a numerical code used to track the timing of media files. In the context of this invention, timecode metadata is applied to both audio and transcribed files of ATC and pilot communications. This timecode ensures that every segment of the communication is synchronized with corresponding ADS-B data, allowing precise temporal alignment of instructions and aircraft actions. For example, when an ATC directive is issued to change altitude, the timecode ensures the instruction is mapped to the correct moment in the flight, enabling the system to verify compliance by cross-referencing the corresponding ADS-B data. Timecodes are essential for creating an accurate, continuous record of flight operations.

Touchdown G-forces means the gravitational forces exerted on an aircraft and its occupants during the moment of landing. Excessive touchdown G-forces can be indicative of a hard landing, which can stress the aircraft's structure and potentially harm passengers. Monitoring touchdown G-forces helps in assessing landing performance and ensuring the safety and integrity of the aircraft.

Transcription means the process of converting spoken language into written text. In the invention, transcription is performed on voice communications between ATC and pilots, converting these interactions into structured text using a speech-to-text engine. This transcription is critical for validating the pilot's compliance with ATC instructions, as the text is cross-referenced with real-time or archived ADS-B data. The system ensures that key operational commands (e.g., altitude changes, speed adjustments) are accurately captured in the transcription and matched to the aircraft's real-time actions. Software developers would implement transcription as part of a larger data-processing workflow that includes natural language processing (NLP) and metadata tagging to ensure accuracy and context.

Unstable Approach means a flight condition where an aircraft does not meet predetermined criteria for a safe landing, potentially necessitating a go-around. Criteria for a stable approach include maintaining the correct flight path, speed, and configuration. An unstable approach can increase the risk of landing accidents, making it essential for pilots to recognize and correct such conditions promptly.

VFR (Visual Flight Rules) means a set of regulations under which a pilot operates an aircraft in generally clear weather conditions. The pilot must be able to operate the aircraft with visual reference to the ground and by sight, without relying primarily on instruments. VFR allows for more flexible and direct routing compared to IFR but is restricted to conditions with sufficient visibility to ensure safe flight operations.

VSI (Vertical Speed Indicator) means an instrument that indicates whether an aircraft is climbing, descending, or in level flight. The rate of climb or descent is typically displayed in feet per minute. The VSI helps pilots maintain desired flight levels and manage altitude changes safely and efficiently, especially during takeoff, climb, descent, and landing phases.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer-implemented method for visualizing aircraft-reported conditions, comprising:
   a. receiving, by at least one computer processor, digital audio streams of verbal communications transmitted by a pilot operating an aircraft, the verbal communications including real-time operational conditions encountered by the aircraft as verbalized by the pilot;
   b. converting, by the at least one computer processor, the pilot voice communications into structured textual data using a speech-to-text engine trained on aviation-specific phraseology;
   c. identifying, by the at least one computer processor, aviation-related keywords in the structured textual data converted from the verbal communications of the real-time operational conditions encountered by the aircraft as verbalized by the pilot;
   d. correlating, by the at least one computer processor, the identified keywords with contemporaneous Automatic Dependent Surveillance-Broadcast (ADS-B) data received from the aircraft, the ADS-B data including at least the aircraft's position, altitude, heading, and speed;
   e. generating, by the at least one computer processor, visual spatial representations of in-flight conditions from the correlated textual and ADS-B data; and
   f. automatically generating quantitative visualizations based on the visual spatial representations, visually representing the identified operational conditions.

2. The method of claim 1, wherein the quantitative visualization comprises a heatmap depicting the geographic location, severity, and spatial extent of a weather phenomenon reported by the pilot.

3. The method of claim 2, wherein the weather phenomenon is selected from turbulence, icing, wind shear, thunderstorms, microbursts, downdrafts, or crosswinds.

4. The method of claim 1, wherein the structured textual data further comprises metadata indicating the severity of the identified operational conditions as verbally communicated by the pilot.

5. The method of claim 1, further comprising electronically disseminating the visualizations to air traffic control, pilots, or other aviation stakeholders.

6. The method of claim 1, wherein identifying keywords comprises recognizing semantic equivalents and contextually related phrases.

7. The method of claim 1, further comprising aggregating visualizations from multiple flights to identify recurring operational conditions.

8. The method of claim 7, wherein the aggregated visualizations provide predictive analytics for anticipated future operational conditions.

9. A system for generating visual spatial representations of aircraft-reported conditions, comprising:
   a. at least one communication interface configured to receive digital audio streams of verbal communications transmitted by pilots, the verbal communications including real-time operational conditions encountered by the pilots;
   b. a speech-to-text conversion engine trained on aviation-specific phraseology, executed by at least one processor, configured to convert pilot voice communications into structured textual data;
   c. a keyword detection module, executed by the at least one processor, configured to identify aviation-related keywords from the structured textual data indicating operational conditions;
   d. an ADS-B data correlation engine, executed by the at least one processor, configured to correlate identified keywords with contemporaneous ADS-B data including aircraft position, altitude, heading, and speed;
   e. a visualization module, executed by the at least one processor, configured to generate visual spatial representations of the correlated textual and ADS-B data; and
   f. a quantitative visualization module configured to automatically generate quantitative visualizations from the visual spatial representations.

10. The system of claim 9, wherein the visualization module generates heatmaps indicating geographic locations and severities of the reported operational conditions.

11. The system of claim 9, further comprising a dissemination module configured to electronically transmit generated visualizations in real-time to aviation stakeholders.

12. The system of claim 9, further comprising a storage module for aggregating historical visual spatial representations to identify trends in operational conditions.

13. The system of claim 12, wherein the aggregated historical data provides predictive analytics capabilities.

14. A non-transitory computer-readable storage medium containing instructions that, when executed by at least one processor, cause the processor to perform operations comprising: receiving digital audio streams of verbal communications from pilots operating aircraft;
   a. converting pilot voice communications into structured textual data using a speech-to-text engine trained specifically on aviation phraseology;
   b. identifying aviation-related keywords in the structured textual data indicative of real-time operational conditions as verbalized by the pilots in the pilot voice communications;
   c. correlating the identified keywords with contemporaneous ADS-B data including aircraft position, altitude, heading, and speed;
   d. generating visual spatial representations of the correlated textual and ADS-B data; and
   e. automatically generating quantitative visualizations based on the visual spatial representations.

15. The computer-readable storage medium of claim 14, wherein the quantitative visualizations include heatmaps depicting geographic locations, severities, and spatial extents of operational conditions.

16. The computer-readable storage medium of claim 15, wherein operational conditions include turbulence, icing, wind shear, thunderstorms, microbursts, downdrafts, and crosswinds.

17. The computer-readable storage medium of claim 14, wherein the instructions further cause dissemination of the visualizations in real-time to aviation stakeholders.

18. The computer-readable storage medium of claim 14, further comprising instructions for aggregating historical visual spatial representations to analyze recurring operational conditions.

19. The computer-readable storage medium of claim 18, wherein aggregated historical data provides predictive insights.

20. The computer-readable storage medium of claim 14, wherein identifying aviation-related keywords includes recognition of semantic equivalents and contextually related terminology.

* * * * *